US012739559B2

(12) United States Patent
Chiba et al.

(10) Patent No.: US 12,739,559 B2
(45) Date of Patent: Sep. 15, 2026

(54) ACOUSTIC SIGNAL OUTPUT DEVICE

(71) Applicant: NTT, Inc.

(72) Inventors: Hironobu Chiba, Tokyo (JP); Tatsuya Kako, Tokyo (JP); Kazunori Kobayashi, Tokyo (JP)

(73) Assignee: NTT, Inc., Tokyo (JP)

( * ) Notice: Subject to any disclaimer, the term of this patent is extended or adjusted under 35 U.S.C. 154(b) by 215 days.

(21) Appl. No.: 18/705,990

(22) PCT Filed: Nov. 9, 2021

(86) PCT No.: PCT/JP2021/041129
§ 371 (c)(1),
(2) Date: Apr. 29, 2024

(87) PCT Pub. No.: WO2023/084580
PCT Pub. Date: May 19, 2023

(65) Prior Publication Data
US 2026/0164171 A1 Jun. 11, 2026

(51) Int. Cl.
*H04R 1/28* (2006.01)
*H04R 1/10* (2026.01)
*H04R 3/04* (2006.01)

(52) U.S. Cl.
CPC ......... *H04R 1/2888* (2013.01); *H04R 1/1008* (2013.01); *H04R 1/1083* (2013.01); *H04R 3/04* (2013.01)

(58) Field of Classification Search
CPC .......... H04R 1/10; H04R 1/105; H04R 1/345; H04R 3/12; H04R 1/1008; H04R 1/1075; H04R 1/403; H04R 1/1016; H04R 1/1066; H04R 1/1083; H04R 1/28; H04R 1/2846; H04R 1/2857; H04R 1/2873; H04R 1/288;
(Continued)

(56) References Cited

U.S. PATENT DOCUMENTS 8,184,821 B2 * 5/2012 Sung .................... H04R 1/1083 381/382
11,974,097 B2 * 4/2024 Zhang ...................... G10K 9/22
(Continued)

OTHER PUBLICATIONS

Bose Corporation "What Are Open-Ear Headphones?" [online] Accessed on Sep. 13, 2021, website: https://www.bose.com/en_us/better_with_bose/open-ear-headphones.html.

*Primary Examiner* — Lun-See Lao

(57) ABSTRACT

Provided is an acoustic signal output device including a first driver unit that emits a first acoustic signal to one side and emits a second acoustic signal to another side, a second driver unit that emits a fourth acoustic signal to one side and emits a third acoustic signal to another side, a first housing portion provided with a first sound hole for leading out the first acoustic signal to an outside and a second sound hole for leading out the second acoustic signal to an outside, and a second housing portion provided with a third sound hole for leading out the third acoustic signal to an outside and a fourth sound hole for leading out the fourth acoustic signal to an outside. Provided that a frequency bandwidth of the third and fourth acoustic signals emitted from the second driver unit is narrower than a frequency bandwidth of the first and second acoustic signals emitted from the first driver unit.

10 Claims, 65 Drawing Sheets

(58) Field of Classification Search
CPC ................ H04R 1/347; H04R 2460/09; H04R 2460/11; H04R 5/033; H04R 5/0335
USPC .................................................... 381/74, 312
See application file for complete search history.

(56) References Cited

U.S. PATENT DOCUMENTS

| | | | | |
|---|---|---|---|---|
| 2005/0221867 | A1* | 10/2005 | Zurek | H04R 1/323 455/575.1 |
| 2017/0353793 | A1* | 12/2017 | Sun | H04R 3/12 |
| 2019/0037293 | A1* | 1/2019 | Kim | H04M 1/026 |

* cited by examiner

ACOUSTIC SIGNAL OUTPUT DEVICE

CROSS-REFERENCE TO RELATED APPLICATIONS

This application is a U.S. 371 Application of International Patent Application No. PCT/JP2021/041129, filed on 9 Nov. 2021, the disclosure of which is hereby incorporated herein by reference in its entirety.

TECHNICAL FIELD

The present invention relates to an acoustic signal output device, and particularly relates to an acoustic signal output device that does not seal an ear canal.

BACKGROUND ART

In recent years, an increase in burden on ears due to wearing of earphones and a headphone has been a problem. As devices that reduce a burden on ears, open-ear (open) earphones and headphones that do not block ear canals are known.

CITATION LIST

Non Patent Literature

Non Patent Literature 1: "WHAT ARE OPEN-EAR HEADPHONES?", [online], Bose Corporation, [Searched on Sep. 13, 2021], the Internet <https://www.bose.com/en_us/better_with_bose/open-ear-headphones.html>

SUMMARY OF INVENTION

Technical Problem

However, open-ear earphones and headphones have a problem that sound leakage to the surroundings is large. Such a problem is not limited to the open-ear earphones and headphones, but is a problem common to acoustic signal output devices that do not seal ear canals.

The present invention has been made in view of such a point, and an object of the present invention is to provide an acoustic signal output device that does not seal an ear canal and is capable of reducing sound leakage to the surroundings.

Solution to Problem

Provided is an acoustic signal output device including a first driver unit that emits a first acoustic signal to one side and emits a second acoustic signal to another side, a second driver unit that emits a fourth acoustic signal to one side and emits a third acoustic signal to another side, a first housing portion in which a wall portion is provided with a single or plurality of first sound holes for leading out the first acoustic signal emitted from the first driver unit to an outside and a single or plurality of second sound holes for leading out the second acoustic signal emitted from the first driver unit to an outside, and a second housing portion in which a wall portion is provided with a single or plurality of third sound holes for leading out the third acoustic signal emitted from the second driver unit to an outside and a single or plurality of fourth sound holes for leading out the fourth acoustic signal emitted from the second driver unit to an outside.

Provided that, in a case where the first acoustic signal is emitted from the first sound holes, the second acoustic signal is emitted from the second sound holes, the third acoustic signal is emitted from the third sound holes, and the fourth acoustic signal is emitted from the fourth sound holes, an attenuation rate of the first acoustic signal at a second point with reference to a predetermined first point, where the first acoustic signal arrives at the first point and the second point is farther from the acoustic signal output device than the first point, is designed to be equal to or less than a predetermined value smaller than an attenuation rate due to air propagation of an acoustic signal at the second point with reference to the first point, or an attenuation amount of the first acoustic signal at the second point with reference to the first point is designed to be equal to or more than a predetermined value larger than an attenuation amount due to air propagation of an acoustic signal at the second point with reference to the first point. Also, a frequency bandwidth of the third acoustic signal and the fourth acoustic signal emitted from the second driver unit is narrower than a frequency bandwidth of the first acoustic signal and the second acoustic signals emitted from the first driver unit.

Advantageous Effects of Invention

With this structure, sound leakage to the surroundings can be reduced.

DESCRIPTION OF EMBODIMENTS

Figure 1:
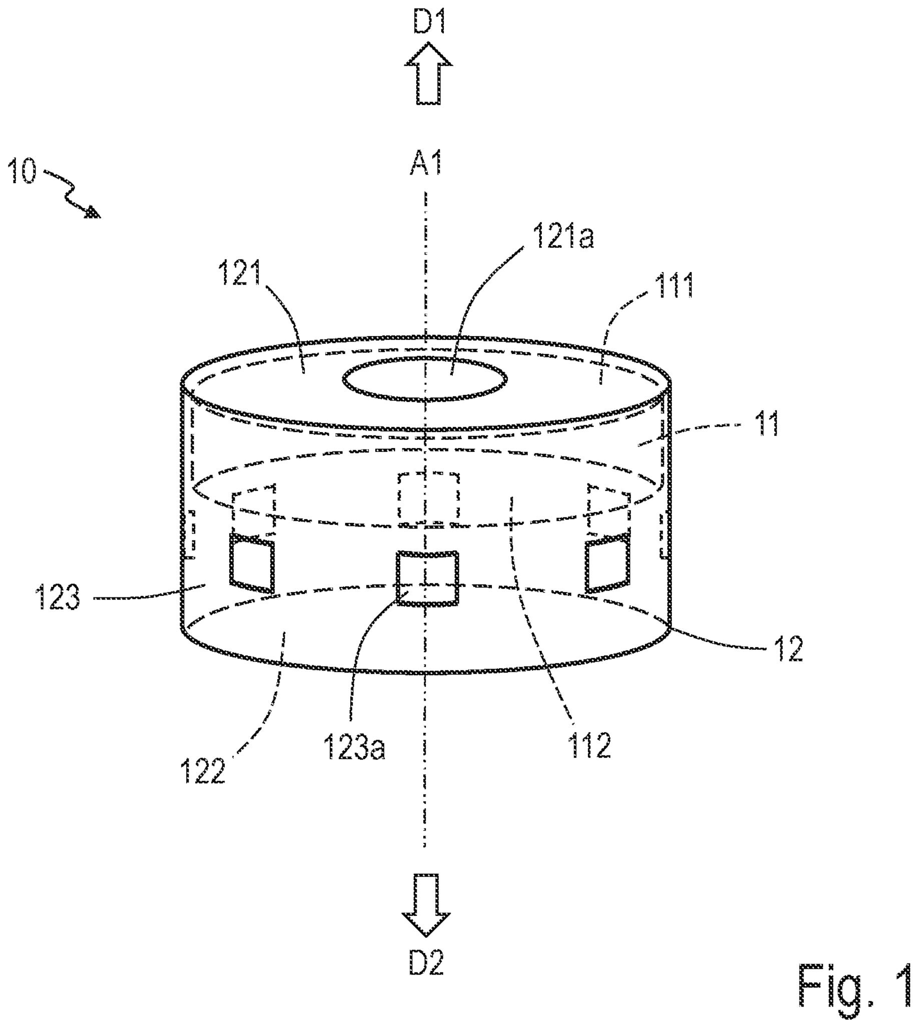
FIG. 1 is a transparent perspective view illustrating a configuration of an acoustic signal output device according to a first embodiment.

Hereinafter, embodiments of the present invention will be described with reference to the drawings.

First Embodiment

First, a first embodiment of the present invention will be described.

Configuration

An acoustic signal output device 10 of the present embodiment is a device for acoustic listening (for example, open-ear [open] earphone, headphone, or the like) that is worn without sealing the ear canal of the user. As illustrated in FIGS. 1, 2A to 2C, and 3A to 3C, the acoustic signal output device 10 of the present embodiment includes a driver unit 11 that converts an output signal (electrical signal representing an acoustic signal) output from a reproducing device into an acoustic signal and outputs the acoustic signal, and a housing 12 that internally accommodates the driver unit 11.

Driver Unit 11

The driver unit (speaker driver unit) 11 is a device (device including a speaker function) that emits (emits sound of) an acoustic signal AC1 (first acoustic signal) based on an input output signal to one side (D1 direction side), and emits an acoustic signal AC2 (second acoustic signal) that is an antiphase signal (phase inversion signal) of the acoustic signal AC1 or an approximate signal of the antiphase signal to the other side (D2 direction side). That is, an acoustic signal emitted from the driver unit 11 to one side (D1 direction side) is referred to as the acoustic signal AC1 (first acoustic signal), and an acoustic signal emitted from the driver unit 11 to the other side (D2 direction side) is referred to as the acoustic signal AC2 (second acoustic signal). For example, the driver unit 11 includes a diaphragm 113 that emits the acoustic signal AC1 from one surface 113*a* toward the D1 direction side by vibration, and emits the acoustic signal AC2 from the other surface 113*b* toward the D2 direction side by this vibration (FIG. 2B). By the diaphragm 113 vibrating on the basis of an input output signal, the driver unit 11 of this example emits the acoustic signal AC1 from a one side surface 111 to the D1 direction side, and emits the acoustic signal AC2 that is an antiphase signal of the acoustic signal AC1 or an approximate signal of the antiphase signal from the other side 112 to the D2 direction side. That is, the acoustic signal AC2 is secondarily emitted along with emission of the acoustic signal AC1. Note that the D2 direction (other side) is, for example, the opposite direction of the D1 direction (one side), but the D2 direction does not need to be strictly the opposite direction of the D1 direction, and the D2 direction is only required to be different from the D1 direction. The relationship between one side (D1 direction) and the other side (D2 direction) depends on the type and shape of the driver unit 11. Furthermore, depending on the type and shape of the driver unit 11, the acoustic signal AC2 may strictly be an antiphase signal of the acoustic signal AC1, or the acoustic signal AC2 may be an approximate signal of the antiphase signal of the acoustic signal AC1. For example, the approximate signal of the antiphase signal of the acoustic signal AC1 may be (1) a signal obtained by shifting the phase of the antiphase signal of the acoustic signal AC1, (2) a signal obtained by changing (amplifying or attenuating) the amplitude of the antiphase signal of the acoustic signal AC1, or (3) a signal obtained by shifting the phase of the antiphase signal of the acoustic signal AC1 and further changing the amplitude. The phase difference between the antiphase signal of the acoustic signal AC1 and the approximate signal is desirably less than or equal to $\delta_1$% of one period of the antiphase signal of the acoustic signal AC1. Examples of 81% include 1%, 3%, 5%, 10%, and 20%. The difference between the amplitude of the antiphase signal of the acoustic signal AC1 and the amplitude of the approximate signal is desirably less than or equal to $\delta_2$% of the amplitude of the antiphase signal of the acoustic signal AC1. Examples of $\delta_2$% include 1%, 3%, 5%, 10%, and 20%. Examples of the type of the driver unit 11 include a dynamic type, a balanced armature type, a hybrid type of the dynamic type and the balanced armature type, and a capacitor type. The shapes of the driver unit 11 and the diaphragm 113 are any shape. In the present embodiment, for simplification of description, an example in which the outer shape of the driver unit 11 is a substantially cylindrical shape including both end surfaces and the diaphragm 113 is a substantially disk shape is described, but this does not limit the present invention. For example, the outer shape of the driver unit 11 may be a rectangular parallelepiped shape or the like, and the diaphragm 113 may be a dome shape or the like. Examples of an acoustic signal are sound such as music, sound, a sound effect, and environmental sound.

Housing 12

The housing 12 is a hollow member including a wall portion on the outer side, and internally houses the driver unit 11. For example, the driver unit 11 is fixed to an end portion on the D1 direction side inside the housing 12. However, this does not limit the present invention. Although the shape of the housing 12 is also any shape, for example, the shape of the housing 12 is desirably rotationally symmetric (line-symmetric) or substantially rotationally symmetric about an axis A1 extending along the D1 direction. As a result, it facilitates providing sound holes 123*a* which reduce variation in the energy of sound emitted from the housing 12 depending on the direction (details will be described below). As a result, sound leakage can be easily reduced uniformly in each direction. For example, the housing 12 includes a first end surface that is a wall portion 121 arranged on one side (D1 direction side) of the driver unit 11, a second end surface that is a wall portion 122 arranged on the other side (D2 direction side) of the driver unit 11, and a side surface that is a wall portion 123 surrounding a space sandwiched between the first end surface and the second end surface around the axis A1 passing through the first end surface and the second end surface (FIG. 2B, FIG. 3B). In the present embodiment, for simplification of description, an example is described in which the housing 12 has a substantially cylindrical shape including both end surfaces. For example, the interval between the wall portion 121 and the wall portion 122 is 10 mm, and the wall portions 121, 122 each have a circular shape having a radius of 10 mm. However, this is an example and does not limit the present invention. For example, the housing 12 may have a substantially dome shape including a wall portion at an end portion, or may have a hollow substantially cubic shape, or may have another three-dimensional shape. The material of the housing 12 is any material. The housing 12 may be formed from a rigid body such as synthetic resin or metal, or may be formed from an elastic body such as rubber.

Sound Holes 121*a*, 123*a*

The wall portion of the housing 12 is provided with a sound hole 121*a* (first sound hole) that leads out the acoustic signal AC1 (first acoustic signal) emitted from the driver unit 11 to the outside and sound holes 123*a* (second sound holes) that lead out the acoustic signal AC2 (second acoustic signal) emitted from the driver unit 11 to the outside. The sound hole 121*a* and the sound holes 123*a* are, for example, through holes penetrating the wall portion of the housing 12, but this does not limit the present invention. As long as the acoustic signal AC1 and the acoustic signal AC2 can be led out to the outside, the sound hole 121*a* and the sound holes 123*a* may not be through holes.

The acoustic signal AC1 emitted from the sound hole 121$a$ reaches the ear canal of the user and is heard by the user. On the other hand, the acoustic signal AC2 that is an antiphase signal of the acoustic signal AC1 or an approximate signal of the antiphase signal is emitted from the sound holes 123$a$. A part of the acoustic signal AC2 cancels out a part (sound leakage component) of the acoustic signal AC1 emitted from the sound hole 121$a$. That is, by the acoustic signal AC1 (first acoustic signal) being emitted from the sound hole 121$a$ (first sound hole) and the acoustic signal AC2 (second acoustic signal) being emitted from the sound holes 123$a$ (second sound holes), an attenuation rate $\eta_{11}$ of the acoustic signal AC1 (first acoustic signal) at a position P2 (second point) with reference to a position P1 (first point) can be set to be less than or equal to a predetermined value $\eta_{th}$, or an attenuation amount $\eta_{12}$ of the acoustic signal AC1 (first acoustic signal) at the position P2 (second point) with reference to the position P1 (first point) can be set to be equal to or more than a predetermined value $\omega_{th}$. Here, the position P1 (first point) is a predetermined point where the acoustic signal AC1 (first acoustic signal) emitted from the sound hole 121$a$ (first sound hole) arrives. On the other hand, the position P2 (second point) is a predetermined point where the distance from the acoustic signal output device 10 is farther than the position P1 (first point). The predetermined value $\eta_{th}$ is a value smaller (lower value) than an attenuation rate $\eta_{21}$ due to air propagation of any or specific acoustic signal (sound) at the position P2 (second point) with reference to the position P1 (first point). The predetermined value $\omega_{th}$ is a value larger than an attenuation amount $\eta_{22}$ due to air propagation of any or specific acoustic signal (sound) at the position P2 (second point) with reference to the position P1 (first point). That is, the acoustic signal output device 10 of the present embodiment is designed such that the attenuation rate $\eta_{11}$ is less than or equal to the predetermined value $\eta_{th}$ smaller than the attenuation rate $\eta_{21}$, or the attenuation amount $\eta_{12}$ is equal to or more than the predetermined value $\omega_{th}$ larger than the attenuation amount $\eta_{22}$. Note that the acoustic signal AC1 is propagated in air from the position P1 to the position P2, and is attenuated due to the air propagation and the acoustic signal AC2. The attenuation rate $\eta_{11}$ is a ratio ($AMP_2(AC1)/AMP_1(AC1)$) of magnitude $AMP_2(AC1)$ of the acoustic signal AC1 at the position P2 attenuated due to air propagation and the acoustic signal AC2 to magnitude $AMP_1(AC1)$ of the acoustic signal AC1 at the position P1. The attenuation amount $\eta_{12}$ is a difference ($|AMP_1(AC1)-AMP_2(AC1)|$) between the magnitude $AMP_1(AC1)$ and the magnitude $AMP_2(AC1)$. On the other hand, in a case where the acoustic signal AC2 is not assumed, any or specific acoustic signal $AC_{ar}$ propagating in air from the position P1 to the position P2 attenuates not due to the acoustic signal AC2 but due to the air propagation. The attenuation rate $\eta_{21}$ is a ratio ($AMP_2(AC_{ar})/AMP_1(AC_{ar})$) of magnitude $AMP_2(AC_{ar})$ of the acoustic signal $AC_{ar}$ at the position P2 attenuated due to air propagation (attenuated not due to the acoustic signal AC2) to magnitude $AMP_1(AC_{ar})$ of the acoustic signal $AC_{ar}$ at the position P1. The attenuation amount $\eta_{22}$ is a difference ($|AMP_1(AC_{ar})-AMP_2(AC_{ar})|$) between the magnitude $AMP_1(AC_{ar})$ and the magnitude $AMP_2(AC_{ar})$. Note that an example of the magnitude of the acoustic signal is sound pressure of the acoustic signal, energy of the acoustic signal, or the like. Furthermore, the "sound leakage component" means, for example, a component that is highly likely to arrive at a region other than the user wearing the acoustic signal output device 10 (for example, person other than the user wearing the acoustic signal output device 10) of the acoustic signal AC1 emitted from the sound hole 121$a$. For example, the "sound leakage component" means a component propagating in a direction other than the D1 direction of the acoustic signal AC1. For example, a direct wave of the acoustic signal AC1 is mainly emitted from the sound hole 121$a$, and a direct wave of the second acoustic signal is mainly emitted from the second sound holes. A part of the direct wave (sound leakage component) of the acoustic signal AC1 emitted from the sound hole 121$a$ is canceled out by interfering with at least a part of the direct wave of the acoustic signal AC2 emitted from the sound holes 123$a$. However, this does not limit the present invention, and this cancellation may occur in waves other than direct waves. That is, a sound leakage component that is at least one of a direct wave or a reflected wave of the acoustic signal AC1 emitted from the sound hole 121$a$ may be canceled out by at least one of a direct wave or a reflected wave of the acoustic signal AC2 emitted from the sound holes 123$a$. As a result, sound leakage can be reduced.

An arrangement configuration of the sound holes 121$a$, 123$a$ will be exemplified.

The sound hole 121$a$ (first sound hole) of the present embodiment is provided in a region AR1 (first region) of the wall portion 121 arranged on one side (D1 direction side that is a side toward which the acoustic signal AC1 is emitted) of the driver unit 11 (FIG. 1, FIG. 2A, FIG. 2B, and FIG. 3B). That is, the sound hole 121$a$ is opened in the D1 direction (first direction) along the axis A1. The sound holes 123$a$ (second sound holes) of the present embodiment are provided in a region AR3 of the wall portion 123 that is in contact with a region AR between the region AR1 (first region) of the wall portion 121 of the housing 12 and a region AR2 (second region) of the wall portion 122 arranged on the D2 direction side (other side that is the side toward which the acoustic signal AC2 is emitted) of the driver unit 11. That is, assuming that a direction between the D1 direction (first direction) and the opposite direction of the D1 direction is a D12 direction (second direction) using the center of the housing 12 as a reference (FIG. 3B), the sound hole 121$a$ (first sound hole) is provided on the D1 direction side (first direction side) of the housing 12, and the sound holes 123$a$ (second sound holes) are provided on the D12 direction side (second direction side) of the housing 12. For example, in a case where the housing 12 includes the first end surface that is the wall portion 121 arranged on one side (D1 direction side) of the driver unit 11, the second end surface that is the wall portion 122 arranged on the other side (D2 direction side) of the driver unit 11, and the side surface that is the wall portion 123 surrounding the space sandwiched between the first end surface and the second end surface around the axis A1 along the emission direction (D1 direction) of the acoustic signal AC1 passing through the first end surface and the second end surface (FIG. 2B, FIG. 3B), the sound hole 121$a$ (first sound hole) is provided on the first end surface, and the sound holes 123$a$ (second sound holes) are provided on the side surface. In the present embodiment, no sound hole is provided on the wall portion 122 side of the housing 12. This is because if a sound hole is provided on the wall portion 122 side of the housing 12, the sound pressure level of the acoustic signal AC2 emitted from the housing 12 exceeds a level necessary for canceling out the sound leakage component of the acoustic signal AC1, and the excess is perceived as sound leakage.

Figure 2A:
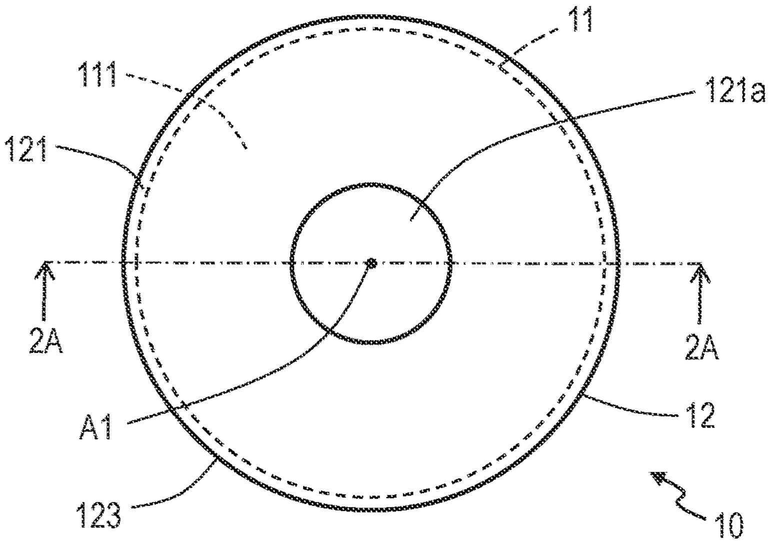
FIG. 2A is a transparent plan view illustrating the configuration of the acoustic signal output device according to the first embodiment.
Figure 2B:
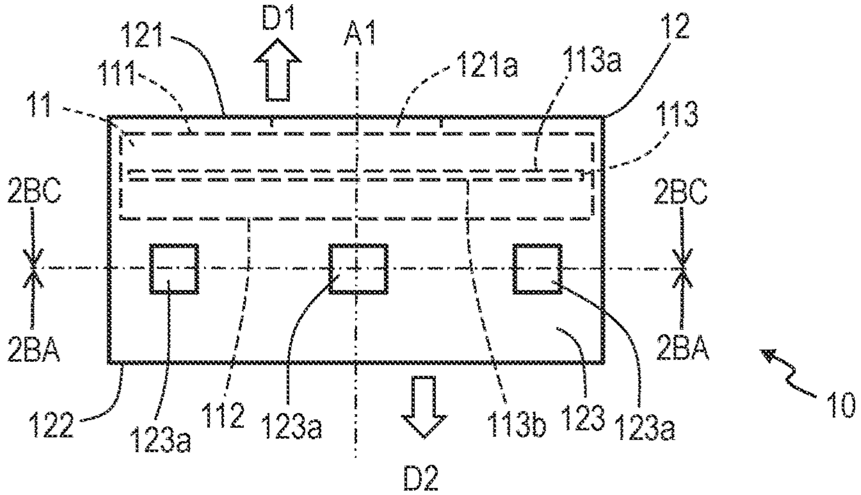
FIG. 2B is a transparent front view illustrating the configuration of the acoustic signal output device according to the first embodiment.
Figure 2C:
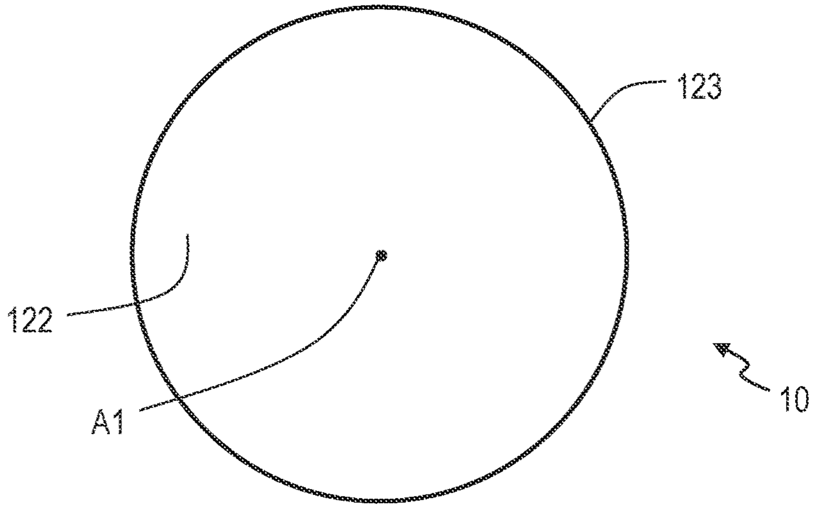
FIG. 2C is a bottom view illustrating the configuration of the acoustic signal output device according to the first embodiment.

As illustrated in FIG. 2A and the like, the sound hole 121$a$ of the present embodiment is arranged on or in the vicinity of the axis A1 along the emission direction (D1 direction) of the acoustic signal AC1. The axis A1 of the present embodiment passes through the center of the region AR1 (first region) of the wall portion 121 arranged on one side (D1 direction side) of the driver unit 11 of the housing 12 or the vicinity of the center. For example, the axis A1 is an axis extending in the D1 direction through the center region of the housing 12. That is, the sound hole 121*a* of the present embodiment is provided at the center position of the region AR1 of the wall portion 121 of the housing 12. In the present embodiment, for simplification of description, an example is described in which the shape of the edge of the open end of the sound hole 121*a* is a circle (the open end is a circle). The radius of such a sound hole 121*a* is, for example, 3.5 mm. However, this does not limit the present invention. For example, the shape of the edge of the open end of the sound hole 121*a* may be another shape such as an ellipse, a quadrangle, and a triangle. The open end of the sound hole 121*a* may have a mesh shape. In other words, the open end of the sound hole 121*a* may be formed by a plurality of holes. In the present embodiment, for simplification of description, an example is described in which one sound hole 121*a* is provided in the region AR1 (first region) of the wall portion 121 of the housing 12. However, this does not limit the present invention. For example, two or more sound holes 121*a* may be provided in the region AR1 (first region) of the wall portion 121 of the housing 12.

The sound holes 123*a* (second sound holes) of the present embodiment are desirably arranged in consideration of, for example, the following viewpoints.

(1) Viewpoint of position: The sound holes 123*a* are arranged such that propagation paths of the acoustic signal AC2 emitted from the sound holes 123*a* overlap a propagation path of the sound leakage component of the acoustic signal AC1 to be canceled out.

(2) Viewpoint of area: The propagation regions of the acoustic signal AC2 emitted from the sound holes 123*a* and the frequency characteristics of the housing 12 are different according to the opening areas of the sound holes 123*a*. The frequency characteristics of the housing 12 affect the frequency characteristics of the acoustic signal AC2 emitted from the sound holes 123*a*, that is, the amplitude at each frequency. In consideration of such propagation regions and frequency characteristics of the acoustic signal AC2 emitted from the sound holes 123*a*, the opening areas of the sound holes 123*a* are determined such that the sound leakage component is canceled out by the acoustic signal AC2 emitted from the sound holes 123*a* in a region where the sound leakage component is to be canceled out.

From the above viewpoints, for example, the sound holes 123*a* (second sound holes) are desirably configured as follows.

Figure 3A:
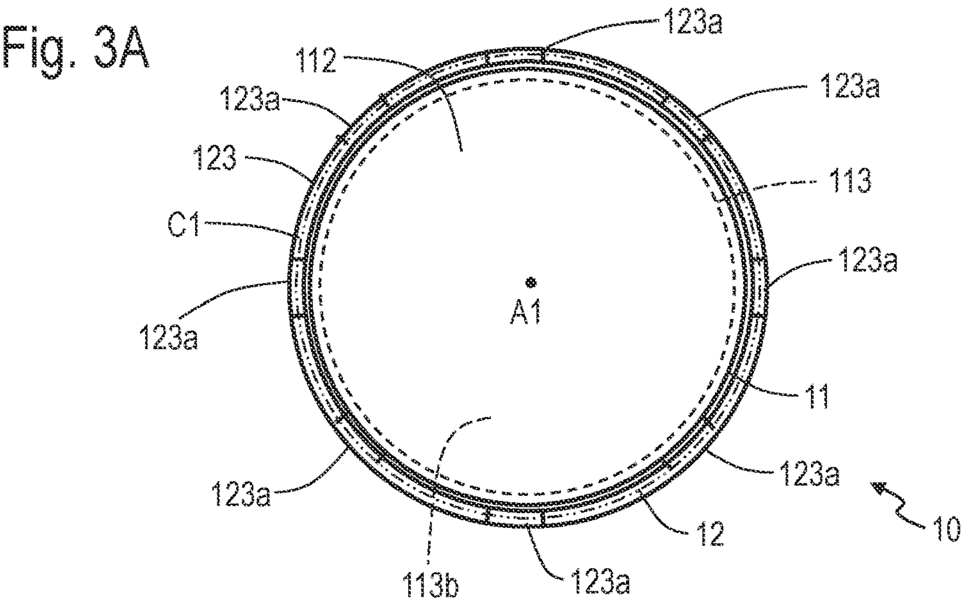
FIG. 3A is an end view taken along line 2BA-2BA in FIG. 2B.
Figure 3B:
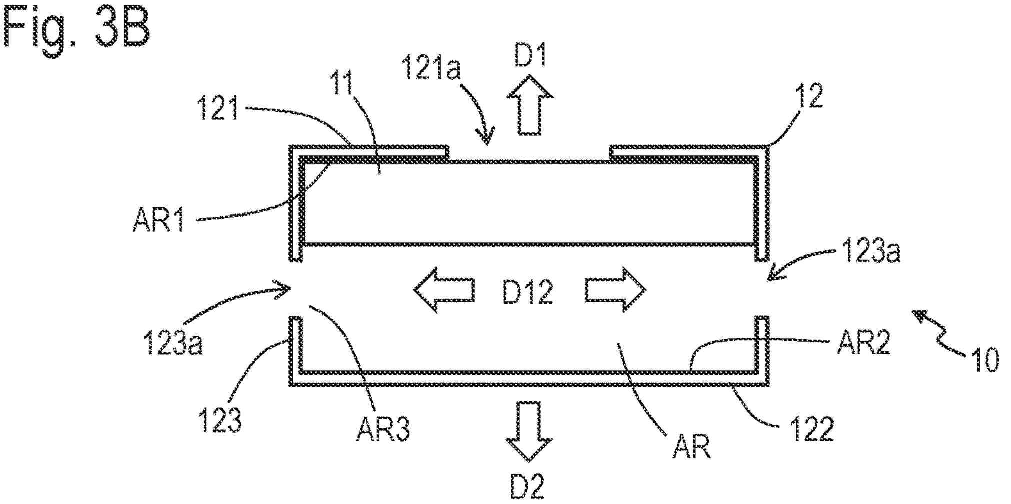
FIG. 3B is an end view taken along line 2A-2A in FIG. 2A.
Figure 3C:
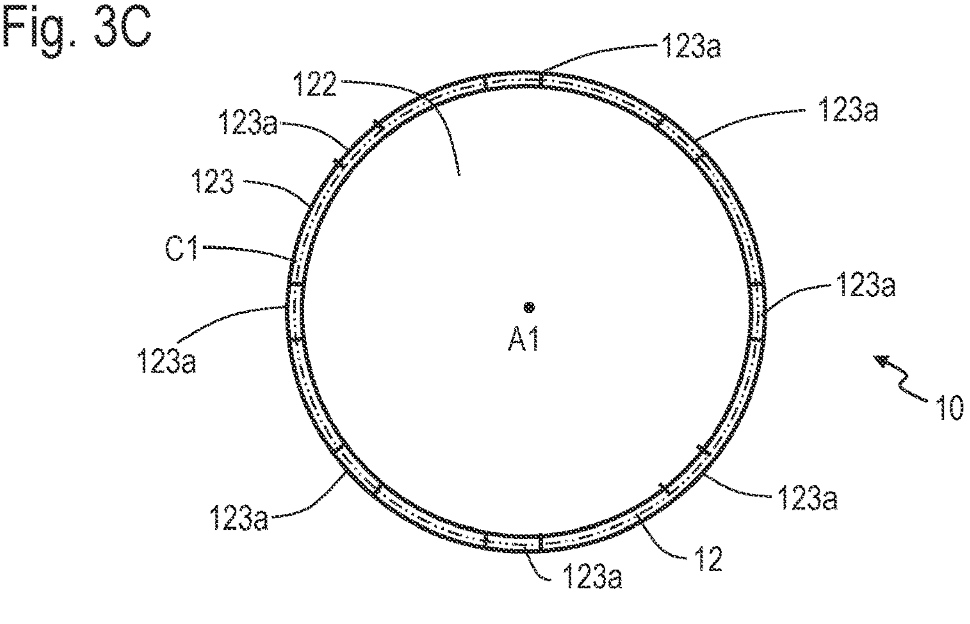
FIG. 3C is an end view taken along line 2BC-2BC in FIG. 2B.

For example, as illustrated in FIGS. 2B, 3A, and 3C, desirably, a plurality of sound holes 123*a* (second sound holes) of the present embodiment is provided along a circumference (circle) C1 centered on the axis A1 along the emission direction of the acoustic signal AC1 (first acoustic signal). In a case where the plurality of sound holes 123*a* is provided along the circumference C1, the acoustic signal AC2 is emitted radially (radially around the axis A1) from the sound holes 123*a* to the outside. Here, the sound leakage component of the acoustic signal AC1 is also emitted radially (radially around the axis A1) from the sound hole 121*a* to the outside. Therefore, by the plurality of sound holes 123*a* being provided along the circumference C1, the sound leakage component of the acoustic signal AC1 can be appropriately canceled out by the acoustic signal AC2. In the present embodiment, for simplification of description, an example is described in which the plurality of sound holes 123*a* is provided on the circumference C1. However, only a plurality of sound holes 123*a* is required to be provided along the circumference C1, and not all the sound holes 123*a* need to be strictly arranged on the circumference C1.

Figure 4:
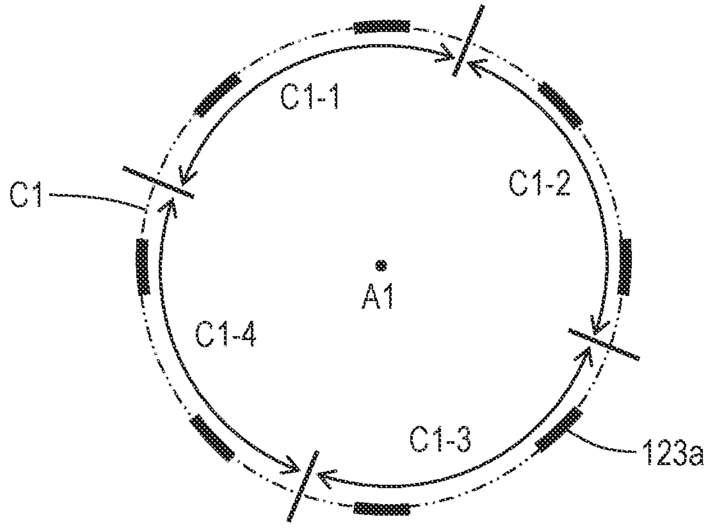
FIG. 4 is a conceptual view for illustrating arrangement of sound holes.

Preferably, in a case where the circumference C1 is equally divided into a plurality of unit arc regions, the sum of the opening areas of sound holes 123*a* (second sound holes) provided along the first arc region that is one of the unit arc regions is the same as or substantially the same as the sum of the opening areas of sound holes 123*a* (second sound holes) provided along the second arc region that is one of the unit arc regions excluding the first arc region. For example, as illustrated in FIG. 4, in a case where the circumference C1 is equally divided into four unit arc regions C1-1, . . . , C1-4, the sum of the opening areas of the sound holes 123*a* (second sound holes) provided along the first arc region (for example, unit arc region C1-1) that is one of the unit arc regions C1-1, . . . , C1-4 is the same as or substantially the same as the sum of the opening areas of the sound holes 123*a* (second sound holes) provided along the second arc region (for example, unit arc region C1-2) that is one of the unit arc regions excluding the first arc region. Here, for simplification of description, an example in which the circumference C1 is equally divided into the four unit arc regions C1-1, . . . , C1-4 has been described, but this does not limit the present invention. "$\alpha 1$ is substantially the same as $\alpha 2$" means that the difference between $\alpha 1$ and $\alpha 2$ is $\beta\%$ or less of $\alpha 1$. Examples of $\beta\%$ include 3%, 5%, and 10%. As a result, the sound pressure distribution of the acoustic signal AC2 emitted from the sound holes 123*a* provided along the first arc region and the sound pressure distribution of the acoustic signal AC2 emitted from the sound holes 123*a* provided along the second arc region are point-symmetric or substantially point-symmetric with respect to the axis A1. Preferably, the sums of the opening areas of sound holes 123*a* (second sound holes) provided along the unit arc regions for the respective unit arc regions are all the same or substantially the same. As a result, the sound pressure distribution of the acoustic signal AC2 emitted from the sound holes 123*a* is point symmetric or substantially point symmetric with respect to the axis A1. As a result, the sound leakage component of the acoustic signal AC1 can be more appropriately canceled out by the acoustic signal AC2.

More preferably, the plurality of sound holes 123*a* having the same shape, the same size, and the same interval is desirably provided along the circumference C1. For example, the plurality of sound holes 123*a* having a width of 4 mm and a height of 3.5 mm is provided along the circumference C1 in the same shape, the same size, and the same interval. In a case where the plurality of sound holes 123*a* having the same shape, the same size, and the same interval is provided along the circumference C1, the sound leakage component of the acoustic signal AC1 can be more appropriately canceled out by the acoustic signal AC2. However, this does not limit the present invention.

Preferably, the sound holes 123*a* (second sound holes) are provided in the wall portion in contact with the region AR positioned on the other side (D2 direction side) of the driver unit 11 (FIG. 3B). As a result, a direct wave of the acoustic signal AC2 emitted from the other side of the driver unit 11 is efficiently led out from the sound holes 123*a* to the outside. As a result, the sound leakage component of the acoustic signal AC1 can be more appropriately canceled out by the acoustic signal AC2.

In the present embodiment, for simplicity of description, a case where the shape of the edges of the open ends of the sound holes 123*a* is a quadrangle (case where the open ends are rectangles) is exemplified, but this does not limit the present invention. For example, the shape of the edges of the open ends of the sound holes 123*a* may be another shape such as a circle, an ellipse, and a triangle. The open ends of the sound holes 123*a* may each have a mesh shape. In other words, the open ends of the sound holes 123*a* may each be formed by a plurality of holes. Further, the number of sound holes 123*a* is any number, and a single sound hole 123*a* may be provided in the region AR3 of the wall portion 123 of the housing 12, or a plurality of sound holes 123*a* may be provided.

A ratio $S_2/S_1$ of the sum $S_2$ of the opening areas of the sound holes 123*a* (second sound holes) to the sum $S_1$ of the opening area of the sound hole 121*a* (first sound hole) desirably satisfies $2/3 \leq S_2/S_1 \leq 4$ (details will be described below). As a result, the sound leakage component of the acoustic signal AC1 can be appropriately canceled out by the acoustic signal AC2.

The sound leakage reduction performance may also depend on the ratio between the area of the wall portion 123 provided with the sound holes 123*a* and the opening areas of the sound holes 123*a*. For example, a case where the housing 12 includes the first end surface that is the wall portion 121 arranged on one side (D1 direction side) of the driver unit 11, the second end surface that is the wall portion 122 arranged on the other side (D2 direction side) of the driver unit 11, and the side surface that is the wall portion 123 surrounding the space sandwiched between the first end surface and the second end surface around the axis A1 along the emission direction (D1 direction) of the acoustic signal AC1 passing through the first end surface and the second end surface, the sound hole 121*a* (first sound hole) is provided on the first end surface, and the sound holes 123*a* (second sound holes) are provided on the side surface is considered (FIG. 2B, FIG. 3B). In such a case, the ratio $S_2/S_3$ of the sum $S_2$ of the opening areas of the sound holes 123*a* to the total area $S_3$ of the side surface is desirably $1/20 \leq S_2/S_3 \leq 1/5$ (details will be described below). As a result, the sound leakage component of the acoustic signal AC1 can be appropriately canceled out by the acoustic signal AC2. However, this does not limit the present invention.

Use State

Figure 5A:
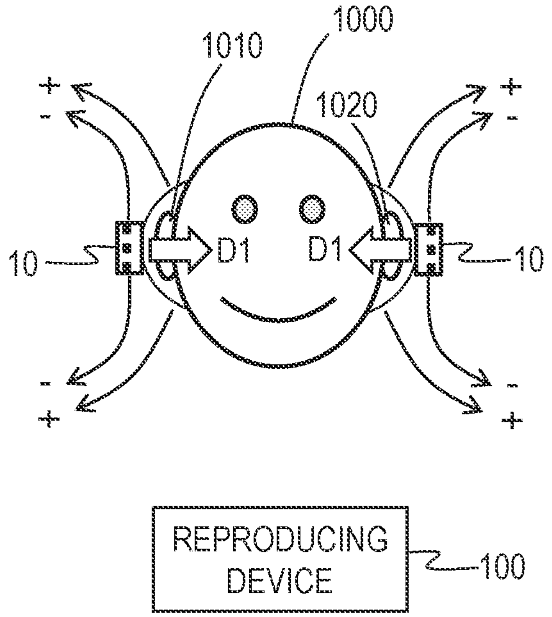
FIG. 5A is a view for illustrating a use state of the acoustic signal output device according to the first embodiment.

A use state of the acoustic signal output device 10 will be exemplified with reference to FIG. 5A. In the example of FIG. 5A, one acoustic signal output device 10 is worn on each of the right ear 1010 and the left ear 1020 of the user 1000. Any wearing mechanism is used for wearing the acoustic signal output device 10 on the ear. In each acoustic signal output device 10, the D1 direction side is directed to the user 1000 side. An output signal output from a reproducing device 100 is input to the driver unit 11 of each acoustic signal output device 10, and the driver unit 11 emits the acoustic signal AC1 to the D1 direction side and emits the acoustic signal AC2 to the other side. The acoustic signal AC1 is emitted from the sound hole 121*a*, and the emitted acoustic signal AC1 enters the right ear 1010 or the left ear 1020 and is heard by the user 1000. On the other hand, the acoustic signal AC2 that is an antiphase signal of the acoustic signal AC1 or an approximate signal of the antiphase signal is emitted from the sound holes 123*a*. A part of the acoustic signal AC2 cancels out a part (sound leakage component) of the acoustic signal AC1 emitted from the sound hole 121*a*.

Experiment Result

Figure 5B:
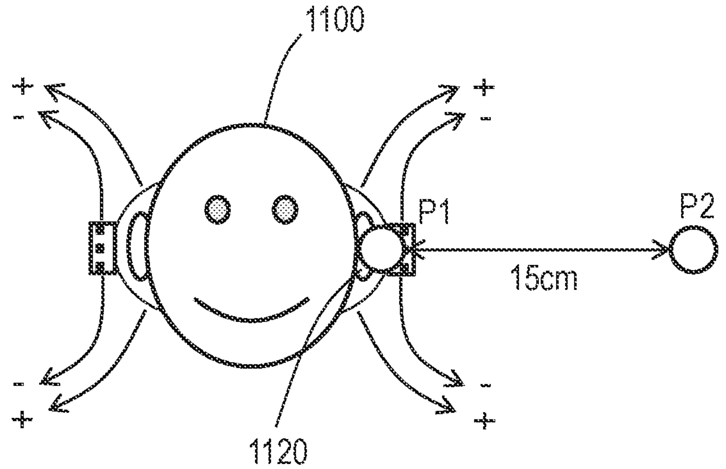
FIG. 5B is a view for illustrating an observation condition of an acoustic signal emitted from the acoustic signal output device according to the first embodiment.

An experimental result indicating a sound leakage reduction effect by the acoustic signal output device 10 of the present embodiment is indicated. In this experiment, as illustrated in FIG. 5B, acoustic signal output devices 10 were worn on both ears of a dummy head 1100 imitating a human head, and an acoustic signal was observed at positions P1 and P2. In this example, the position P1 is a position in the vicinity of the left ear 1120 of the dummy head 1100 (vicinity of an acoustic signal output device 10), and the position P2 is a position 15 cm away outward from the position P1.

Figure 6:
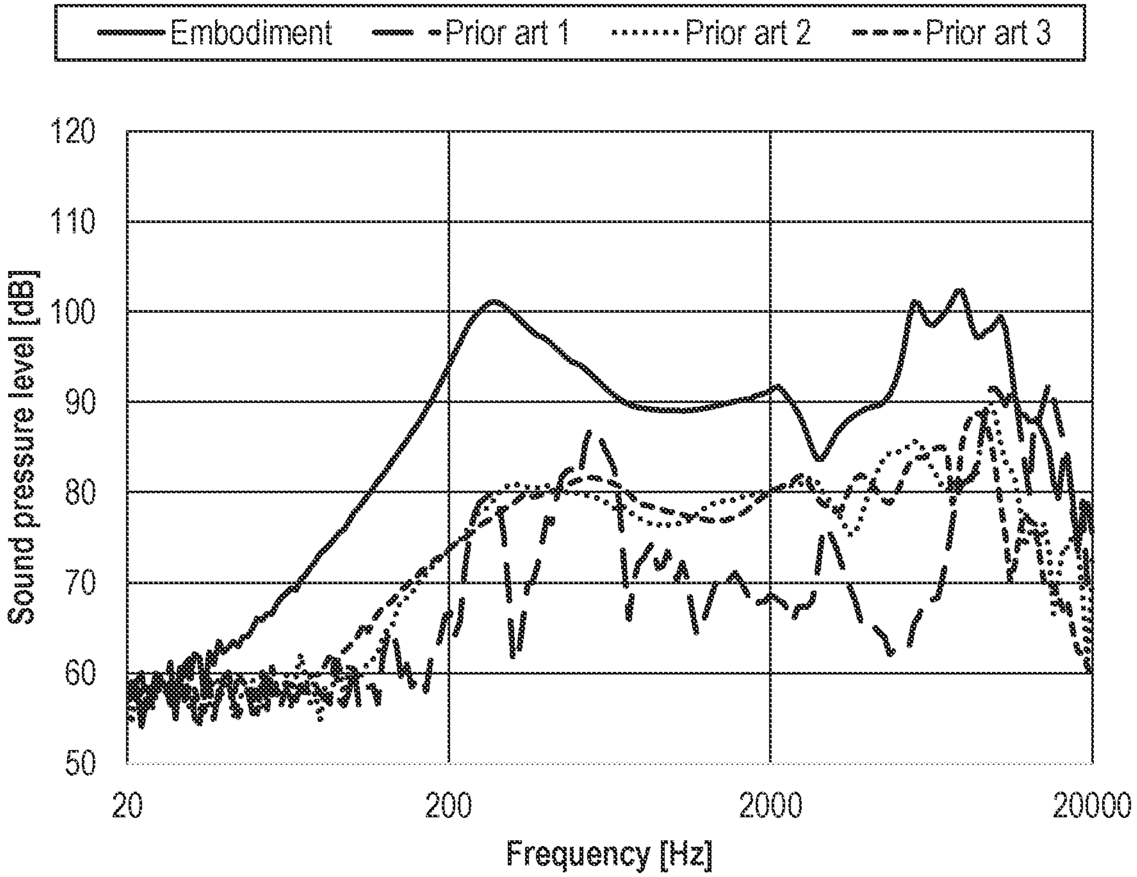
FIG. 6 is a graph illustrating frequency characteristics of acoustic signals observed at a position P1 in FIG. 5B.
Figure 7:
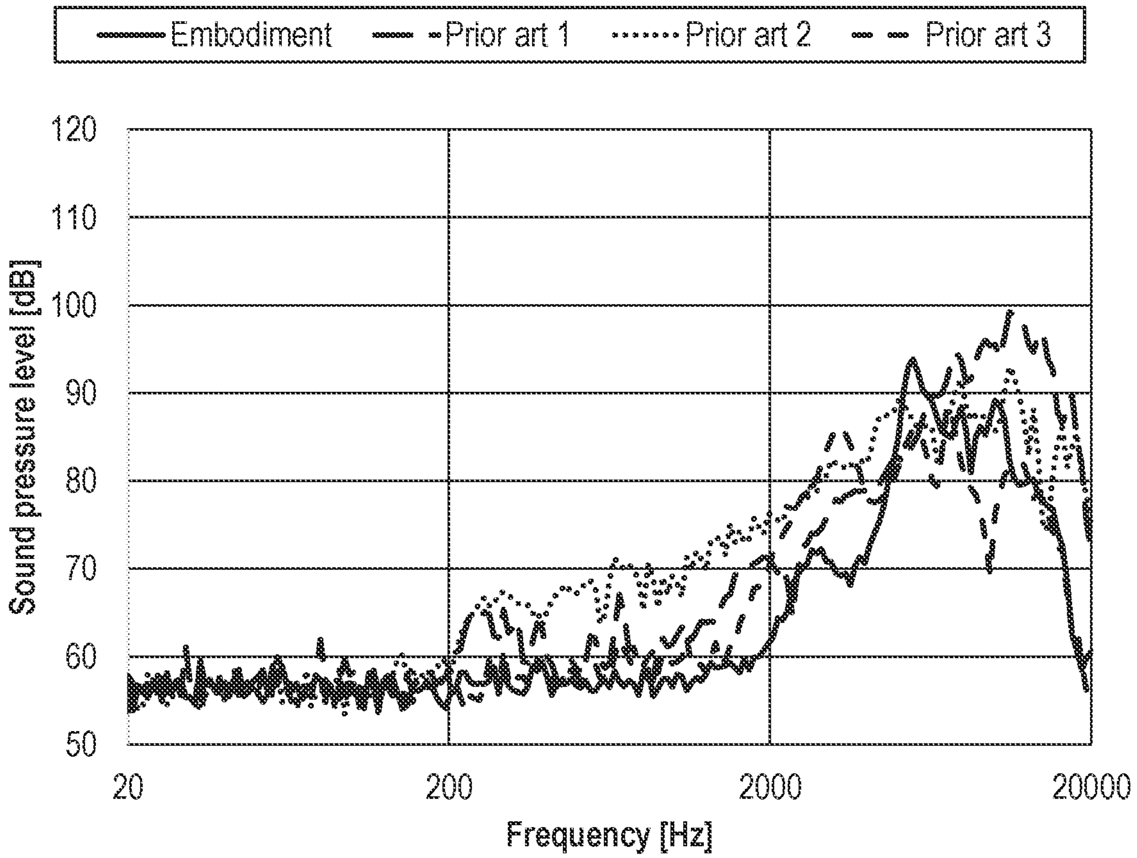
FIG. 7 is a graph illustrating frequency characteristics of acoustic signals observed at a position P2 in FIG. 5B.
Figure 8:
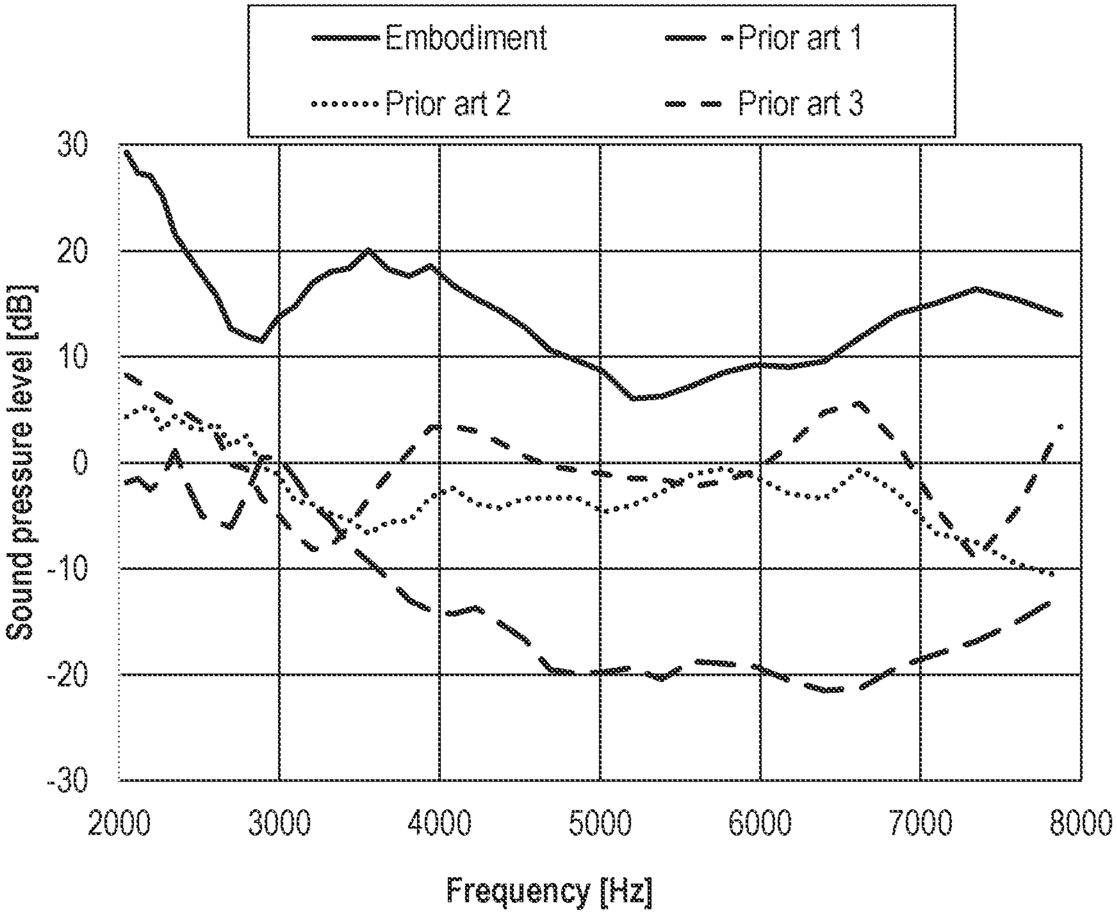
FIG. 8 is a graph illustrating differences between the acoustic signals observed at the position P1 and the acoustic signals observed at the position P2.

FIG. 6 illustrates frequency characteristics of an acoustic signal observed at the position P1 in FIG. 5B, FIG. 7 illustrates frequency characteristics of an acoustic signal observed at the position P2 in FIG. 5B, and FIG. 8 illustrates a difference between the frequency characteristics of the acoustic signal observed at the position P1 and the frequency characteristics of the acoustic signal observed at the position P2 (difference in sound pressure level of each frequency). The horizontal axis represents a frequency (Frequency [Hz]), and the vertical axis represents a sound pressure level (Sound pressure level (SPL) [dB]). A solid line graph illustrates frequency characteristics in a case where the acoustic signal output devices 10 of the present embodiment are used, and broken line graphs each illustrate frequency characteristics in a case where conventional acoustic signal output devices (open-ear earphones) are used. As illustrated in FIG. 8, it can be seen that a difference between the sound pressure of the acoustic signal observed at the position P1 and the sound pressure of the acoustic signal observed at the position P2 is larger in the case of using the acoustic signal output devices 10 of the present embodiment than in cases of using the conventional acoustic signal output devices. This indicates that the acoustic signal output devices 10 of the present embodiment can reduce sound leakage at the position P2 as compared with the conventional acoustic signal output devices.

Figure 9A:
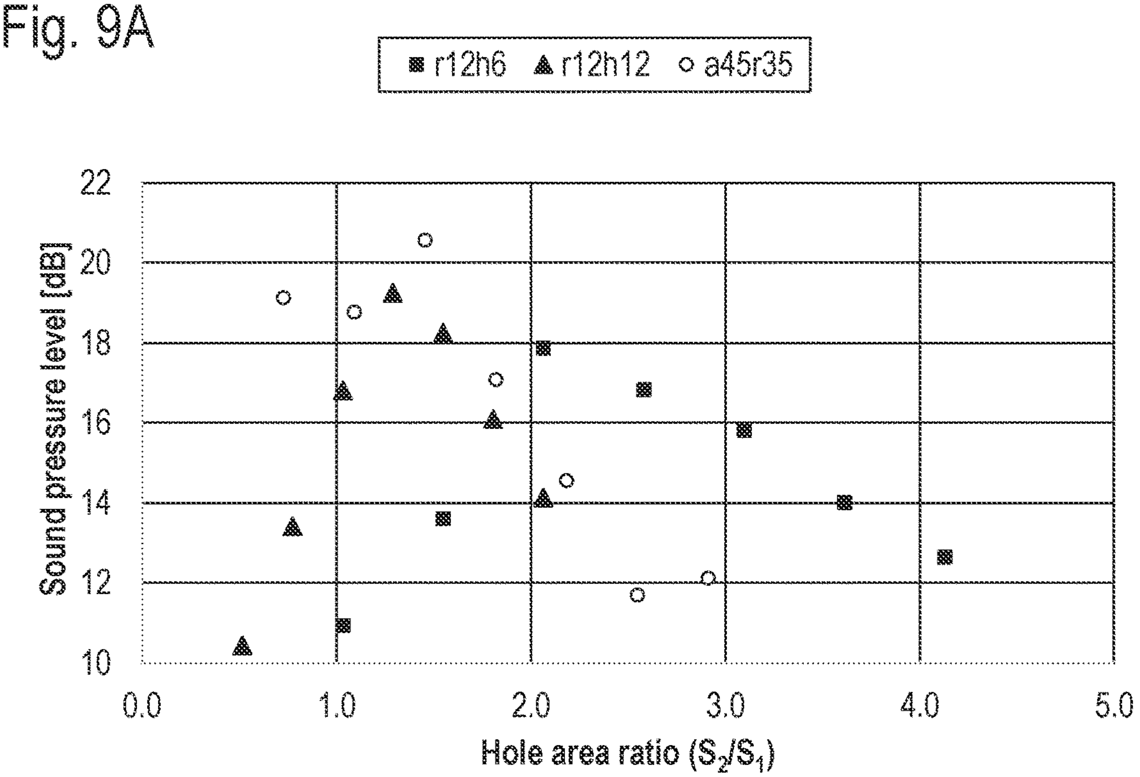
FIGS. 9A and 9B are graphs each illustrating a relationship between an area ratio of sound holes and sound leakage.

FIG. 9A illustrates a relationship between the ratio $S_2/S_1$ of the sum $S_2$ of the opening areas of the sound holes 123*a* (second sound holes) to the sum $S_1$ of the opening areas of the sound holes 121*a* (first sound holes) and the difference between the frequency characteristics of the acoustic signal observed at the position P1 and the frequency characteristic of the acoustic signal observed at the position P2. The horizontal axis represents the ratio $S_2/S_1$, and the vertical axis represents a sound pressure level (Sound pressure level (SPL) [dB]) representing the difference. r12h6 exemplifies a result in a case where the number of the sound holes 121*a* is six and the number of the sound holes 123*a* is four, r12h12 exemplifies a result in a case where the number of the sound holes 121*a* is 12 and the number of sound holes 123*a* is four, and r45h35 exemplifies a result in a case where the number of the sound holes 121*a* is 1 and the number of the sound holes 123*a* is four. As illustrated in FIG. 9A, it can be seen that, particularly in the range in which the ratio $S_2/S_1$ of the sum $S_2$ of the opening areas of the sound holes 123*a* to the sum $S_1$ of the opening areas of the sound holes 121*a* is $2/3 \leq S_2/S_1 \leq 4$, the difference between the sound pressure of the acoustic signal observed at the position P1 and the acoustic signal observed at the position P2 is large. This indicates that the sound leakage reduction effect in this range is large.

Figure 9B:
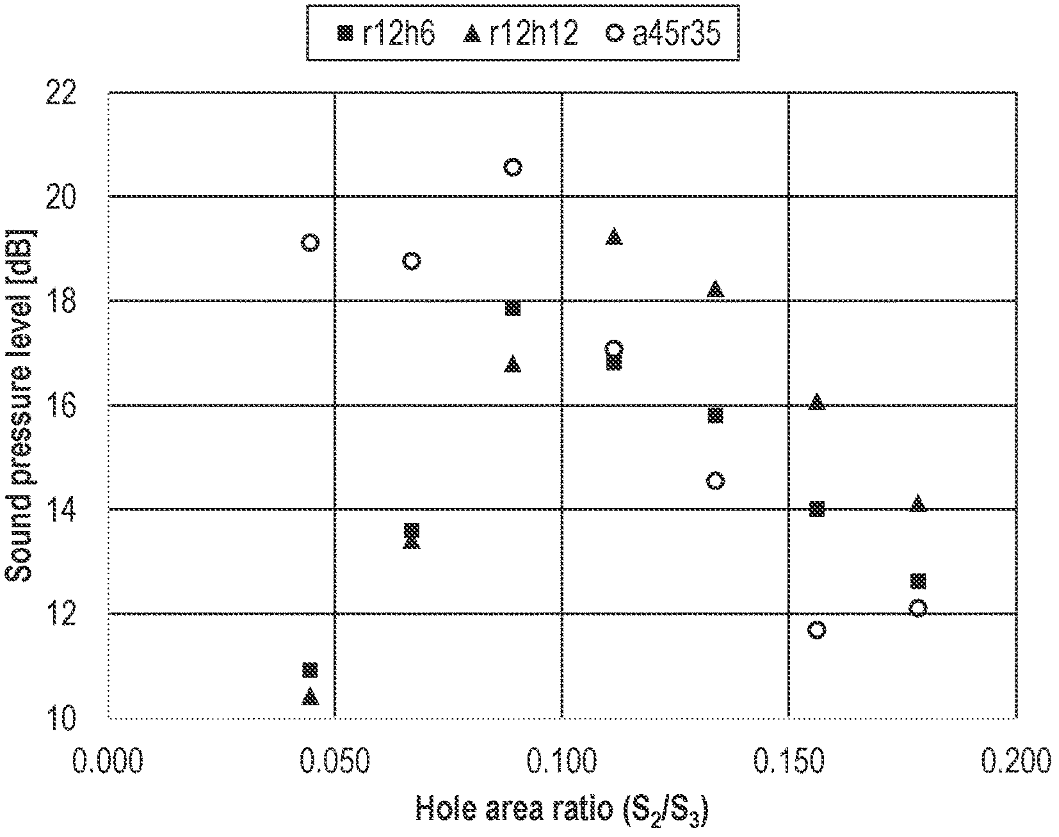
Figure 10A:
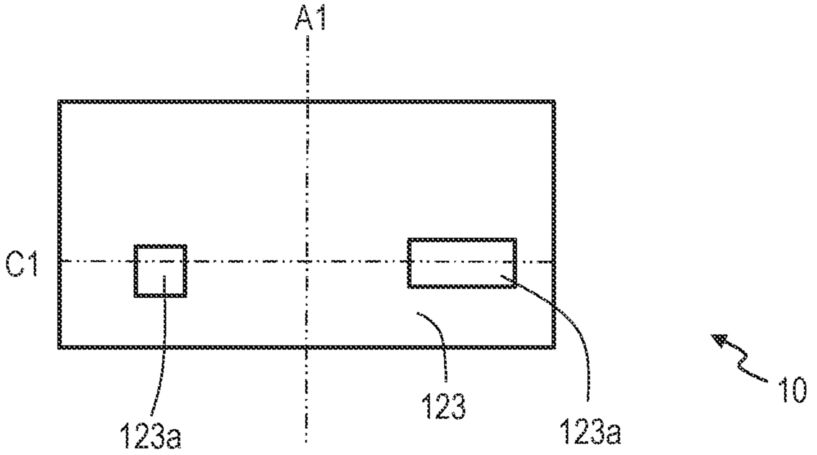
FIG. 10A is a front view for illustrating arrangement of sound holes.
Figure 10B:
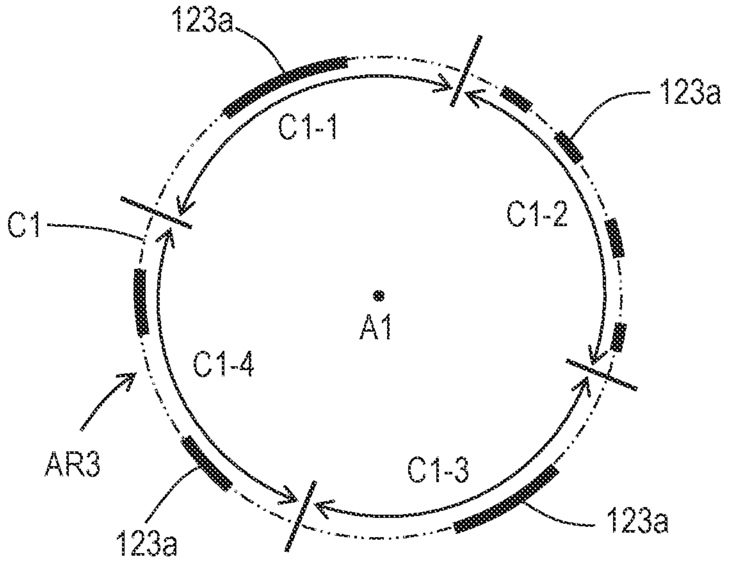
FIG. 10B is a conceptual view for illustrating the arrangement of sound holes.
Figure 11A:
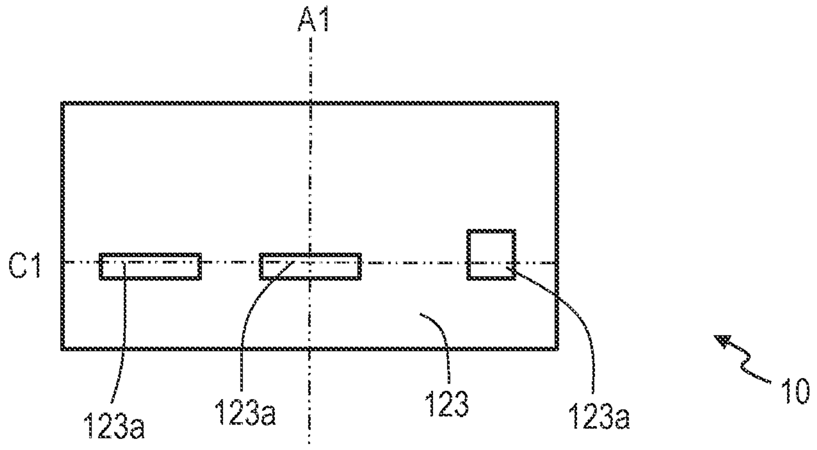
FIG. 11A is a front view for illustrating arrangement of sound holes.
Figure 11B:
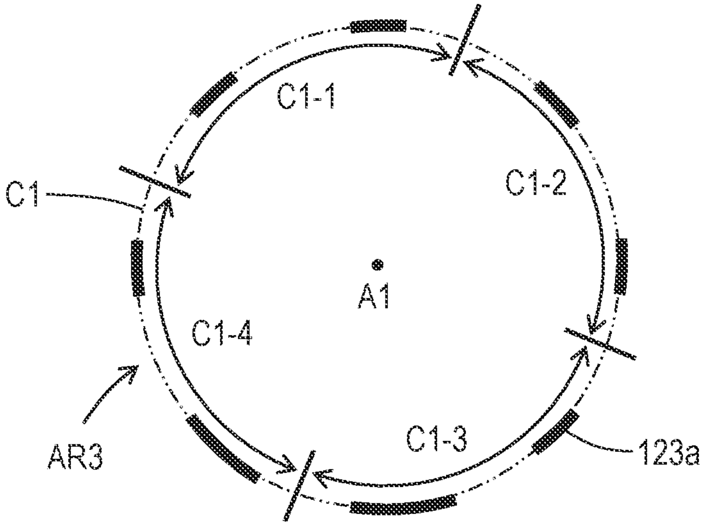
FIG. 11B is a conceptual view for illustrating the arrangement of sound holes.

FIG. 9B illustrates a relationship between the ratio $S_2/S_3$ of the sum $S_2$ of the opening areas of the sound holes 123*a* (second sound holes) to the total area $S_3$ of the side surface and the difference between the frequency characteristics of the acoustic signal observed at the position P1 and the frequency characteristic of the acoustic signal observed at the position P2. The horizontal axis represents the ratio $S_2/S_3$, and the vertical axis represents a sound pressure level (Sound pressure level (SPL) [dB]) representing the difference. The meanings of r12h6, r12h12, and r45h35 are the same as those in FIG. 9A. As illustrated in FIG. 9B, it can be seen that, particularly in the range in which the ratio $S_2/S_3$ of the sum $S_2$ of the opening areas of the sound holes 123*a* (second sound holes) to the total area $S_3$ of the side surface is $1/20 \leq S_2/S_3 \leq 1/5$, the difference between the sound pressure of the acoustic signal observed at the position P1 and the acoustic signal observed at the position P2 is large. This indicates that the sound leakage reduction effect in this range is large.

Modification 1 of First Embodiment

Figure 12A:
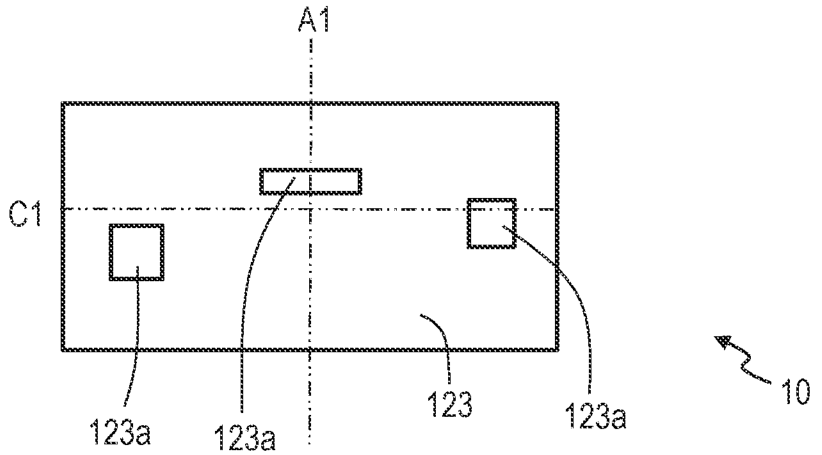
FIGS. 12A to 12C are front views for illustrating modifications of the arrangement of sound holes.
Figure 12B:
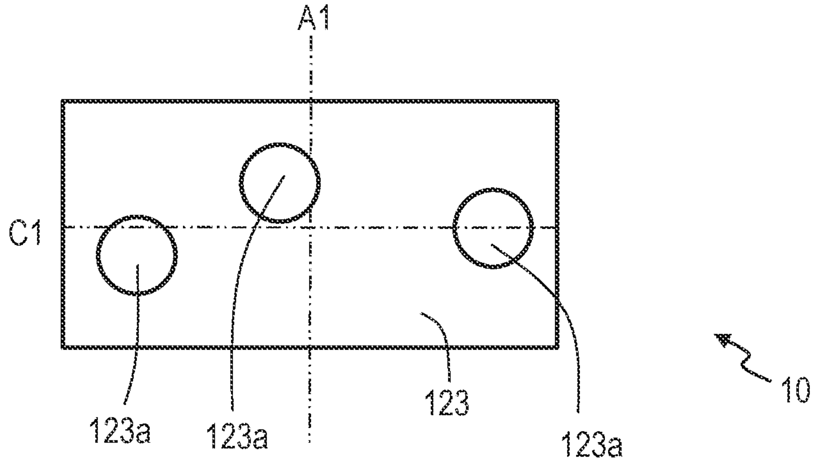
Figure 12C:
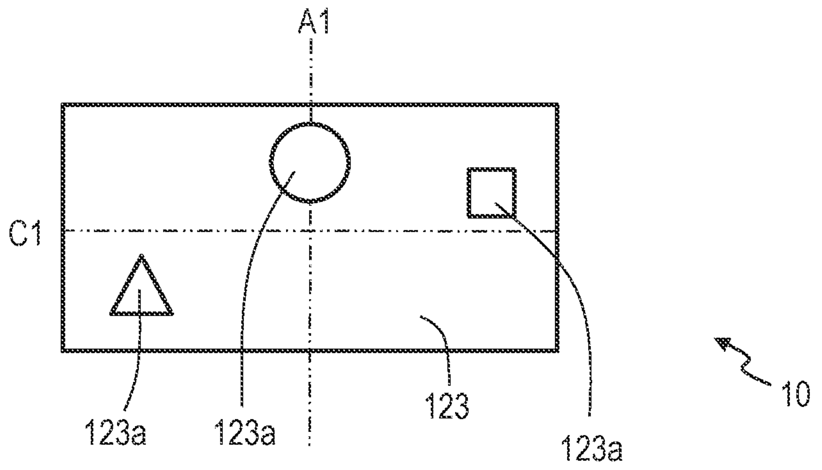

In the first embodiment, an example has been described in which a plurality of sound holes 123*a* (second sound holes) having the same shape, the same size, and the same interval is provided along the circumference C1. However, this does not limit the present invention. A plurality of sound holes 123*a* having different shapes and/or sizes and/or intervals may be provided along the circumference C1. For example, as illustrated in FIGS. 10A, 10B, 11A, 11B, and 12A, a plurality of sound holes 123*a* having different shapes and intervals may be provided in the wall portion 123 along the circumference C1, as illustrated in FIG. 12B, a plurality of sound holes 123*a* having different intervals may be provided in the wall portion 123 along the circumference C1, or as illustrated in FIG. 12C, a plurality of sound holes 123*a* having different shapes and sizes may be provided in the wall portion 123 along the circumference C1.

Even in such a case, in a case where the circumference C1 is equally divided into a plurality of unit arc regions, the sum of the opening areas of sound holes 123*a* (second sound holes) provided along the first arc region that is one of the unit arc regions is preferably the same as or substantially the same as the sum of the opening areas of sound holes 123*a* provided along the second arc region that is one of the unit arc regions excluding the first arc region. More preferably, the sums of the opening areas of sound holes 123*a* provided along the unit arc regions for the respective unit arc regions are preferably all the same or substantially the same. For example, as illustrated in FIGS. 10A, 10B, 11A, and 11B, although the number and size of the sound holes 123*a* provided in the unit arc regions C1-1, C1-2, C1-3, and C1-4 are different from each other, the sum of the opening areas of sound holes 123*a* provided in the unit arc region C1-1, the sum of the opening areas of sound holes 123*a* provided in the unit arc region C1-2, the sum of the opening areas of sound holes 123*a* provided in the unit arc region C1-3, and the sum of the opening areas of sound holes 123*a* provided in the unit arc region C1-4 are desirably all the same or substantially the same.

Only a plurality of sound holes 123*a* is required to be along the circumference C1, and not all the sound holes 123*a* need to be strictly arranged on the circumference C1. For example, as illustrated in FIGS. 12A, 12B, and 12C, not all the sound holes 123*a* need to be arranged on the circumference C1, and only the plurality of sound holes 123*a* is required to be arranged along the circumference C1. Note that the position of the circumference C1 is not limited to that exemplified in the first embodiment, and is only required to be a circumference centered on the axis A1.

As long as a sufficient sound leakage reduction effect can be obtained, not all the sound holes 123*a* need to be arranged along the circumference C1. That is, some sound holes 123*a* may be arranged at positions deviated from the circumference C1. The number of sound holes 123*a* is any number as long as a sufficient sound leakage reduction effect can be obtained, and one sound hole 123*a* may be provided.

Modification 2 of First Embodiment

Figure 13A:
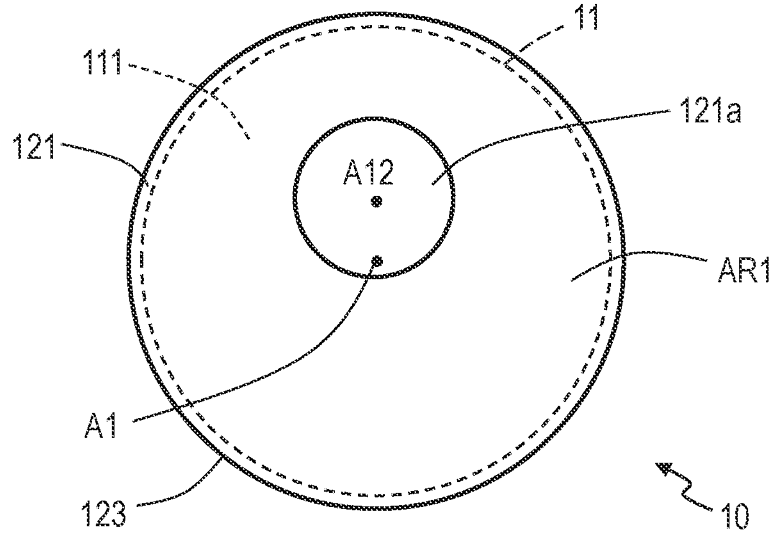
FIGS. 13A and 13B are transparent plan views for illustrating the modifications of the arrangement of sound holes.
Figure 13B:
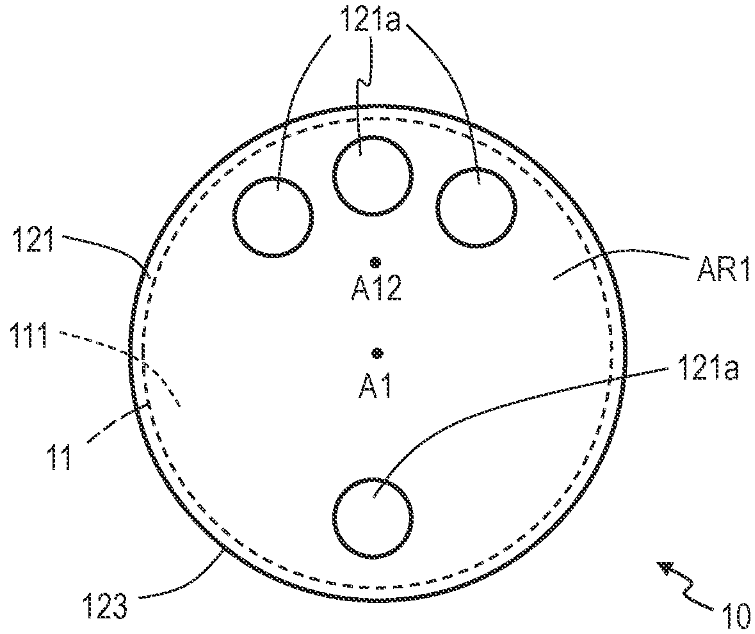

In the first embodiment, the configuration has been exemplified in which one sound hole 121*a* is arranged at the center position of the region AR1 of the wall portion 121 of the housing 12 (region of the wall portion arranged on one side of the driver unit) (hereinafter, the position is simply referred to as a "center position"). However, a plurality of sound holes 121*a* may be provided in the region AR1 of the wall portion 121 of the housing 12, or a sound hole 121*a* may be biased to an eccentric position deviated from the center (center position) of the region AR1 of the wall portion 121 of the housing 12. For example, as illustrated in FIG. 13A, one sound hole 121*a* may be provided at an eccentric position on the region AR1 (position on an axis A12 parallel to the axis A1 deviated from the axis A1) (hereinafter, the position is simply referred to as an "eccentric position"). In other words, the position of one sound hole 121*a* provided in the region AR1 may be biased to the eccentric position. Alternatively, as illustrated in FIG. 13B, a plurality of sound holes 121*a* may be provided in the region AR1, and the plurality of sound holes 121*a* may be biased to eccentric positions on the axis A12 parallel to the axis A1 deviated from the axis A1. In other words, the positions of a plurality of sound holes 121*a* provided in the region AR1 may be biased to the eccentric positions. That is, a single sound hole 121*a* may be provided, or a plurality of sound holes may be provided, and a sound hole 121*a* may be biased to the center position of the region AR1 of the wall portion 121 of the housing 12, or may be biased to an eccentric position. Note that the distance between the axis A1 and the axis A12 is any distance, and may be set according to required sound leakage reduction performance. An example of the distance between the axis A1 and the axis A12 is 4 mm, but this does not limit the present invention.

The resonance frequency of the housing 12 can be controlled by an arrangement configuration of the sound holes 121*a* (for example, number, size, interval, arrangement, and the like of the sound holes 121*a*) provided in the region AR1. The resonance frequency of the housing 12 affects frequency characteristics of acoustic signals emitted from the sound holes 121*a*, 123*a*. Therefore, the frequency characteristics of the acoustic signals emitted from the sound holes 121*a*, 123*a* can be controlled by the arrangement configuration of the sound holes 121*a* provided in the region AR1. For example, in a case where the frequencies of the acoustic signals AC1, AC2 become high, the wavelengths become short, and performing phase matching such that the sound leakage component of the acoustic signal AC1 emitted to the outside is canceled out by the acoustic signal AC2 becomes difficult. As a result, the higher the frequencies of the acoustic signals AC1, AC2, the more difficult reduction of sound leakage of the acoustic signal AC1. Since the sound pressure levels of the acoustic signals AC1, AC2 increase at the resonance frequency of the housing 12, if the resonance frequency of the housing 12 belongs to a high frequency band in which reduction of sound leakage is difficult, sound leakage is perceived large. In order to solve this issue, the arrangement configuration of the sound holes 121*a* may be set as in following Examples 2-1,2 so that the resonance frequency of the housing 12 is controlled.

Example 2-1

In a high frequency band in which reduction of sound leakage is difficult, the arrangement configuration of the sound holes 121*a* may be set such that human auditory sensitivity for the resonance frequency of the housing 12 is low. For example, it is assumed that Sa is human auditory sensitivity (audibility) for an acoustic signal having a resonance frequency equal to or higher than a predetermined frequency $f_{th}$ of the housing 12 in which the position of the sound hole 121*a* is biased to a certain eccentric position. Furthermore, it is assumed that $S_c$ is human auditory sensitivity for an acoustic signal having a resonance frequency equal to or higher than the predetermined frequency $f_{th}$ of the housing 12 in which the sound hole 121*a* is provided in the center position. It is assumed that the auditory sensitivity $S_d$ in this case is lower than the auditory sensitivity $S_c$. That is, the human auditory sensitivity $S_d$ for an acoustic signal having a resonance frequency equal to or higher than the predetermined frequency $f_{th}$ of the housing 12 in which the position of the sound hole 121*a* (first sound hole) is biased to a certain eccentric position (position deviated from the center of the region of the wall portion arranged on one side of the driver unit) is lower than the human auditory sensitivity $S_c$ for an acoustic signal having a resonance frequency equal to or higher than the predetermined frequency $f_{th}$ of the housing 12 in a case where it is assumed that the sound hole 121*a* is provided at the center position (center of the region of the wall portion arranged on one side of the driver unit). The position of the sound hole 121*a* may be biased to such an eccentric position. Note that the auditory sensitivity may be of any type as long as it is an index indicating audibility of sound. The higher the auditory sensitivity, the higher the audibility. An example of the auditory sensitivity is the reciprocal of the sound pressure level of sound required for a human to perceive sound of reference loudness. For example, the reciprocal of the sound pressure level at each frequency in the equal loudness curve is the auditory sensitivity. The predetermined frequency $f_{th}$ means a lower limit of a frequency band including a frequency in which canceling out of the sound leakage component of the acoustic signal AC1 by the acoustic signal AC2 is difficult. Examples of the predetermined frequency $f_{th}$ include 3000 Hz, 4000 Hz, 5000 Hz, and 6000 Hz.

Example 2-2

Depending on the arrangement configuration of the sound holes 121*a*, the resonance peak of the magnitude of the acoustic signal AC1 and/or the acoustic signal AC2 emitted from the housing 12 may be distorted. For example, it is assumed that $Q_d$ is peak sharpness (fineness of point) at a frequency equal to or higher than the predetermined frequency $f_{th}$ of the magnitude of the acoustic signal AC1 emitted from the sound hole 121*a* of the housing 12 in which the position of the sound hole 121*a* is biased to a certain eccentric position and/or the acoustic signal AC2 emitted from the sound holes 123*a*. Furthermore, it is assumed that $Q_c$ is peak sharpness at a frequency equal to or higher than the predetermined frequency $f_{th}$ of the magnitude of the acoustic signal AC1 emitted from the sound hole 121*a* of the housing 12 in which the sound hole 121*a* is provided at the center position and/or the acoustic signal AC2 emitted from the sound holes 123*a*. The peak sharpness $Q_d$ in this case is assumed to be blunter than the peak sharpness $Q_c$. That is, the peak sharpness $Q_d$ at a frequency equal to or higher than the predetermined frequency $f_{th}$ of the magnitude of the acoustic signal AC1 (first acoustic signal) emitted from the sound hole 121*a* (first sound hole) of the housing 12 in which the position of the sound hole 121*a* (first sound hole) is biased to a certain eccentric position and/or the acoustic signal AC2 (second acoustic signal) emitted from the sound holes 123*a* (second sound holes) is blunter than the peak sharpness $Q_c$ at a frequency equal to or higher than the predetermined frequency $f_{th}$ of the magnitude of the acoustic signal AC1 (first acoustic signal) emitted from the sound hole 121*a* (first sound hole) of the housing 12 in a case where it is assumed that the sound hole 121*a* is provided at the center position and/or the acoustic signal AC2 (second acoustic signal) emitted from the sound holes 123*a* (second sound holes). In other words, the peak at a frequency equal to or higher than the predetermined frequency $f_{th}$ of the magnitude of the acoustic signal AC1 and/or the acoustic signal AC2 emitted from the housing 12 in which the position of the sound hole 121*a* is biased to a certain eccentric position is flattened more than the peak at a frequency equal to or higher than the predetermined frequency $f_{th}$ of the magnitude of the acoustic signal AC1 and/or the acoustic signal AC2 emitted from the housing 12 in a case where it is assumed that the sound hole 121*a* is provided at the center position. The position of the sound hole 121*a* may be biased to such an eccentric position.

Figure 14A:
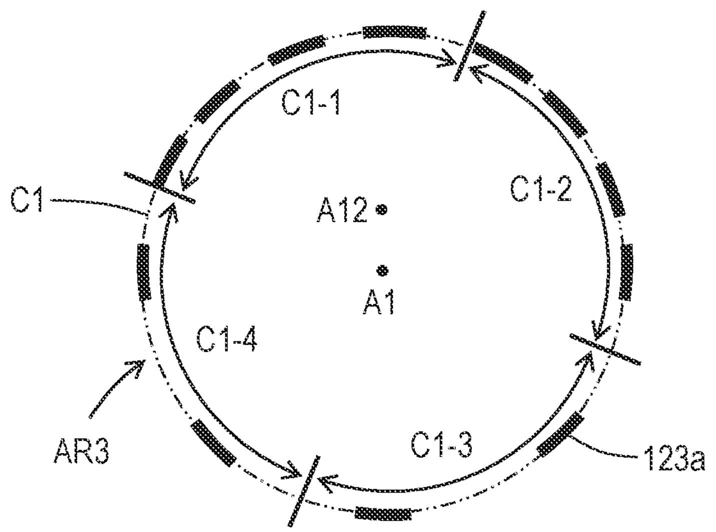
FIGS. 14A and 14B are conceptual views for illustrating the modifications of the arrangement of sound holes.
Figure 14B:
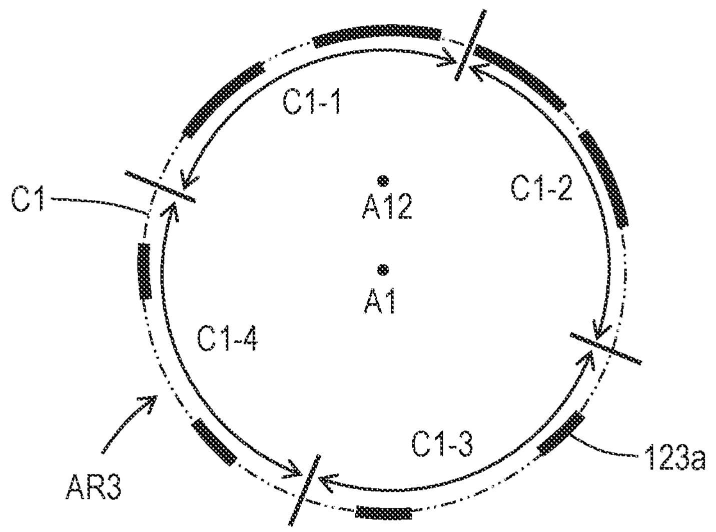

In a case where the position of a single or plurality of sound holes 121*a* is biased to an eccentric position, the distribution or opening areas of the sound holes 123*a* may be biased accordingly. For example, as illustrated in FIG. 13A or FIG. 13B, the position of a single or plurality of sound holes 121*a* provided in the region AR1 may be biased to an eccentric position on the axis A12 deviated from the axis A1, and as illustrated in FIGS. 14A and 14B, the opening areas of the sound holes 123*a* provided in the region AR3 may also be biased to the eccentric position side on the axis A12. In the example of FIG. 14A, the number of sound holes 123*a* provided along the unit arc region C1-3 farther from the eccentric position on the axis A12 is smaller than the number of sound holes 123*a* provided along the unit arc region C1-1 closer to the eccentric position. In the example of FIG. 14B, each opening area of the sound holes 123*a* provided along the unit arc region C1-3 farther from the eccentric position on the axis A12 is smaller than each opening area of the sound holes 123*a* provided along the unit arc region C1-1 closer to the eccentric position. That is, in a case where the circumference C1 is equally divided into a plurality of unit arc regions, the sum of the opening areas of sound holes 123*a* (second sound holes) provided along the first arc region (for example, C1-3) that is one of the unit arc regions is smaller than the sum of the opening areas of sound holes 123*a* provided along the second arc region (for example, C1-1) that is one of the unit arc regions closer to the eccentric position than the first arc region. In a case where the position of the sound hole 121*a* is biased to an eccentric position, the distribution of the acoustic signal AC1 emitted from the sound hole 121*a* to the outside is also biased to the eccentric position. Here, the distribution and the opening areas of the sound holes 123*a* are also made biased to the eccentric position, so that the distribution of the acoustic signal AC2 emitted from the sound holes 123*a* to the outside can also be biased to the eccentric position. As a result, the sound leakage component of the acoustic signal AC1 can be more sufficiently canceled out by the emitted acoustic signal AC2.

In order to control the resonance frequency of the housing 12 for other purposes, the sound hole 121*a* may be biased to an eccentric position deviated from the center (center position) of the region AR1 of the wall portion 121 of the housing 12. The size of the opening portions of the sound holes 121*a*, 123*a*, the thickness of the wall portion of the housing 12, and the capacity inside the housing 12 affect the resonance frequency of the housing 12. Therefore, by at least a part of these being controlled, the resonance frequency of the housing 12 can be higher or lower. That is, the larger the size of the opening portions of the sound holes 121*a*, 123*a*, the thinner the thickness of the wall portion of the housing 12, and the smaller the capacity inside the housing 12, the higher the resonance frequency of the housing 12. Conversely, the smaller the size of the opening portions of the sound holes 121*a*, 123*a*, the thicker the thickness of the wall portion of the housing 12, and the larger the capacity inside the housing 12, the lower the resonance frequency of the housing 12.

Modification 3 of First Embodiment

As described above, in the first embodiment and Modifications 1 and 2 thereof, the acoustic signal AC2 that is an antiphase signal of the acoustic signal AC1 or an approximate signal of the antiphase signal is emitted from the sound holes 123*a*, and a part (sound leakage component) of the acoustic signal AC1 emitted from the sound hole 121*a* is canceled out by a part of the emitted acoustic signal AC2. For this purpose, in a case where a direct wave of the acoustic signal AC1 is mainly emitted from the sound hole 121*a*, a direct wave of the acoustic signal AC2 is desirably mainly emitted from the sound holes 123*a*. This is because, since a reflected wave has a propagation path different from that of a direct wave, in a case where the acoustic signal AC2 emitted from the sound holes 123*a* includes a reflected wave, the acoustic signal AC2 emitted from the sound holes 123*a* may exhibit a phase different from that of the antiphase signal of the acoustic signal AC1 emitted from the sound hole 121*a* or the approximate signal of the antiphase signal, and the efficiency of canceling out the sound leakage component may be reduced. That is, desirably, the housing 12 includes an internal structure that reduces reverberation of the acoustic signal AC2 (second acoustic signal) inside the housing 12, and a direct wave of the acoustic signal AC2 is mainly emitted from the sound holes 123*a* (second sound holes). Hereinafter, such a configuration will be exemplified.

Example 3-1

A reverberation reduction material that reduces reverberation (for example, sponge, paper, or the like) may be installed in an internal region (for example, regions AR2, AR3) of the wall portion of the housing 12. The wall portion itself of the housing 12 may be formed from a reverberation reduction material, or a sheet-like reverberation reduction material may be fixed to the wall portion of the housing 12. Alternatively, the shape of the internal region (for example, regions AR2, AR3) of the wall portion of the housing 12 may be an uneven shape so that reverberation is reduced. Alternatively, a sheet having an uneven surface having a reverberation reduction effect may be fixed to an internal region of the wall portion of the housing 12.

Example 3-2

Figure 15A:
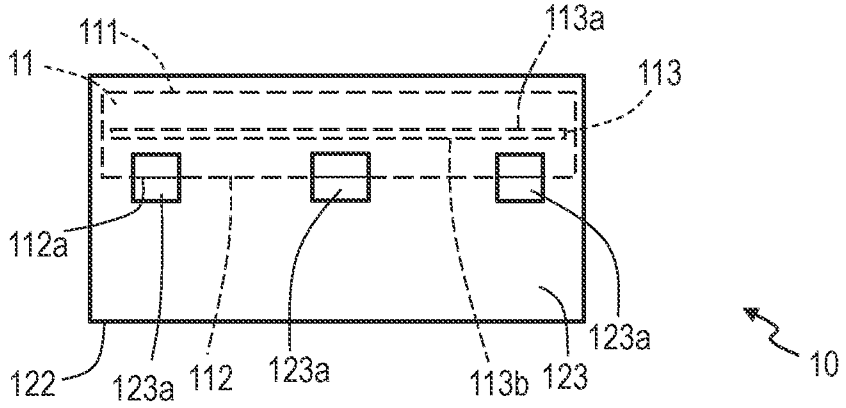
FIG. 15A is a transparent front view for illustrating a modification of the arrangement of sound holes.
Figure 15B:
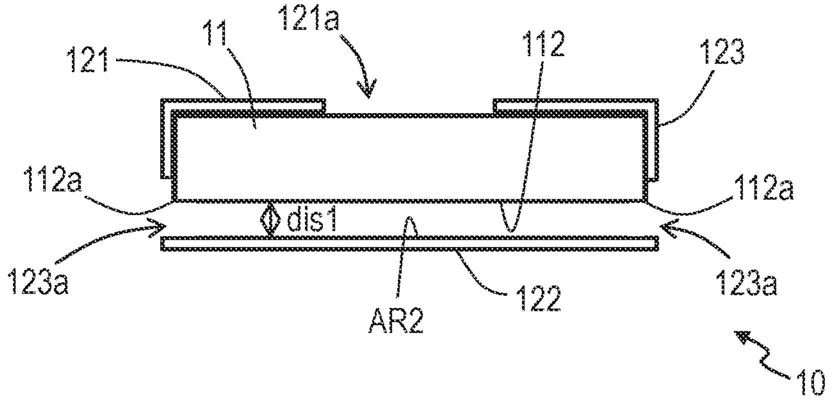
FIG. 15B is an end view for illustrating the modification of the arrangement of sound holes and a modification of an interval between a driver unit and a housing.

As illustrated in FIGS. 15A and 15B, the opening ends of the sound holes 123*a* (second sound holes) may be directed to a side edge portion 112*a* on the other side 112 (D2 direction side) of the driver unit 11, and a direct wave of the acoustic signal AC2 (second acoustic signal) emitted mainly from the other side 112 of the driver unit 11 may be emitted from the sound holes 123*a*.

Example 3-3

As illustrated in FIG. 15B, the wall portion 122 (region AR2) arranged on the other side of the driver unit 11 may be not in contact with the driver unit 11 (not in contact during driving of the driver unit 11), a distance dis1 between the driver unit 11 and the wall portion 122 arranged on the other side 112 of the driver unit 11 may be 5 mm or less, and a direct wave of the acoustic signal AC2 (second acoustic signal) may be mainly emitted from the sound holes 123*a* (second sound holes). The region AR2 being not in contact with the driver unit 11 during driving of the driver unit 11 means that, for example, the distance dis1 is larger than the amplitude of the other side 112 of the driving driver unit 11.

Modification 4 of First Embodiment

As described above, as the frequencies of the acoustic signals AC1, AC2 become higher, the wavelengths become shorter, and canceling out the sound leakage component of the acoustic signal AC1 by the acoustic signal AC2 becomes difficult. In some cases, it is assumed that performing phase matching of the acoustic signals AC1, AC2 at a high frequency becomes difficult, and the sound leakage component of the acoustic signal AC1 is rather amplified by the acoustic signal AC2. Therefore, there is a case where the acoustic signal AC2 having a high frequency is better to be prevented from being emitted from the sound holes 123*a*. Therefore, a sound absorbing material that absorbs an acoustic signal having a high frequency may be provided in the housing 12. This sound absorbing material has a characteristic that a sound absorbing rate for an acoustic signal having a frequency $f_1$ is larger than a sound absorbing rate for an acoustic signal having a frequency $f_2$. Provided that the frequency $f_1$ is higher than the frequency $f_2$ ($f_1>f_2$). That is, the sound absorbing material reduces a high frequency component of an acoustic signal more than a low frequency component. The frequency $f_1$ is less than or equal to a predetermined frequency $f2_{th}$, and the frequency $f_2$ is larger than the predetermined frequency $f2_{th}$. Examples of the predetermined frequency $f2_{th}$ include 3000 Hz, 4000 Hz, 5000 Hz, and 6000 Hz. In a case where energy of an acoustic signal input to the sound absorbing material is Ein and energy of an acoustic signal reflected by the sound absorbing material or energy of an acoustic signal passing through the sound absorbing material is $E_{out}$, a sound absorbing rate $\alpha$ of the sound absorbing material can be expressed by $\alpha=(E_{in}-E_{out})/E_{in}$. Examples of such a sound absorbing material include paper such as Japanese paper and Japanese writing paper, nonwoven fabric, silk, cotton, and the like.

Example 4-1

Figure 16A:
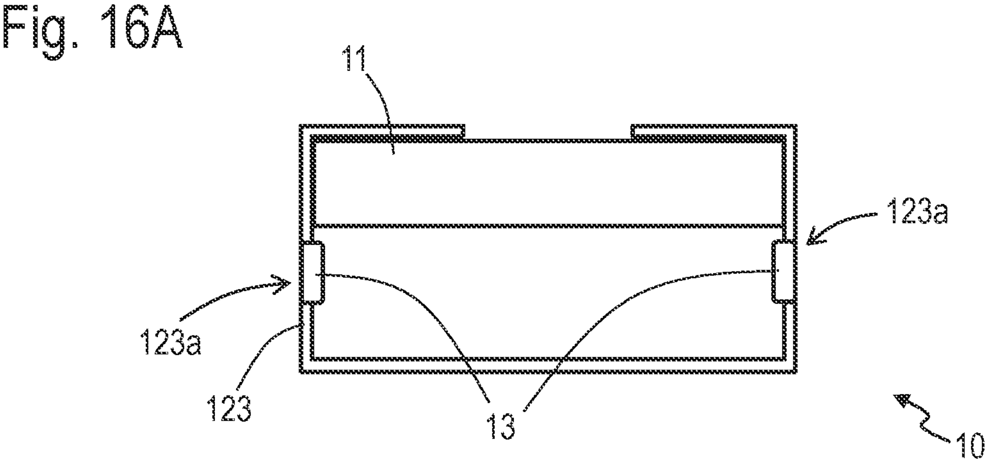
FIGS. 16A to 16C are end views for illustrating a modification of the acoustic signal output device according to the first embodiment.

A sound absorbing material 13 may be provided in at least any one of the sound holes 123*a* (second sound holes). For example, as illustrated in FIG. 16A, the sound absorbing material 13 may be filled in at least one of the sound holes 123*a*. At least one of the inside or the outside of at least any one of the sound holes 123*a* may be covered with the sound absorbing material 13.

Example 4-2

Figure 16B:
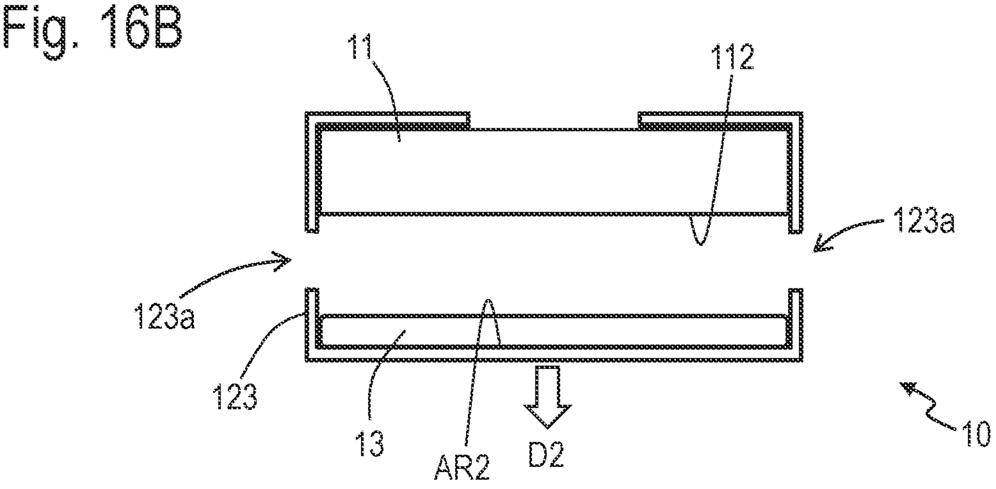

The sound absorbing material 13 may be provided in a region on the other side 112 (D2 direction side) of the driver unit 11 inside the housing 12. For example, as illustrated in FIG. 16B, the sound absorbing material 13 may be fixed to the region AR2 of the wall portion 122 arranged on the other side 112 (D2 direction side) of the driver unit 11. The sound absorbing material 13 may be fixed to the inside of the wall portion 123.

Example 4-3

Figure 16C:
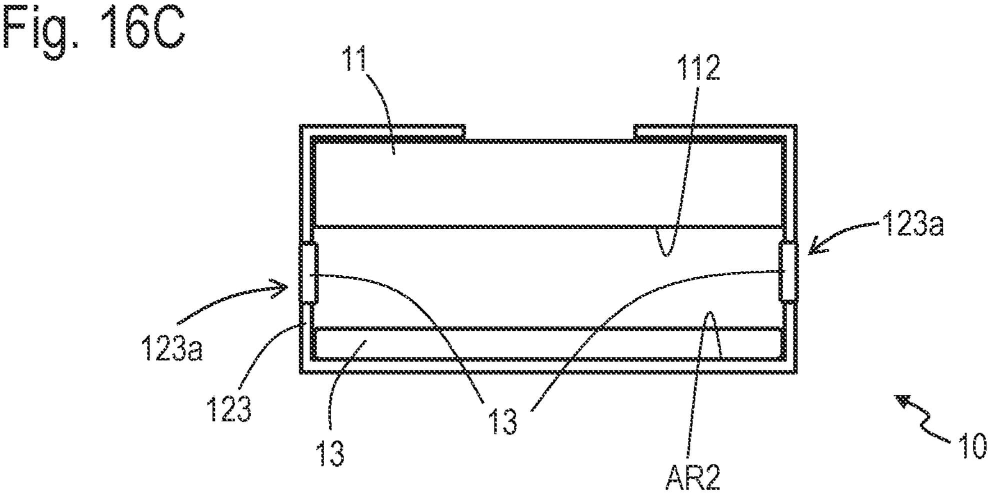

The sound absorbing material 13 may be provided in at least one of the sound holes 123*a* (second sound holes), and the sound absorbing material 13 may be provided in a region on the other side 112 (D2 direction side) of the driver unit 11 inside the housing 12. For example, as illustrated in FIG. 16C, the sound absorbing material 13 may be filled in at least one of the sound holes 123*a*, and the sound absorbing material 13 may be fixed to the region AR2 of the wall portion 122.

Experiment Result

An experimental result indicating a sound leakage reduction effect by the acoustic signal output device 10 of the present modification is indicated. In this experiment, a case of using the acoustic signal output device 10 of the first embodiment (without sound absorbing material: No acoustic absorbent) and a case of using the acoustic signal output device 10 in which the sound holes 123*a* are covered with the sound absorbing material as exemplified in the present modification (with sound absorbing material: With acoustic absorbent) were conducted. Japanese paper was used for the sound absorbing material. Also in this experiment, as illustrated in FIG. 5B, acoustic signal output devices 10 were worn on both ears of the dummy head 1100 imitating a human head, and an acoustic signal was observed at the positions P1 and P2. The position P1 is a position in the vicinity of the left ear 1120 of the dummy head 1100 (vicinity of an acoustic signal output device 10), and the position P2 is a position 15 cm away outward from the position P1.

Figure 17:
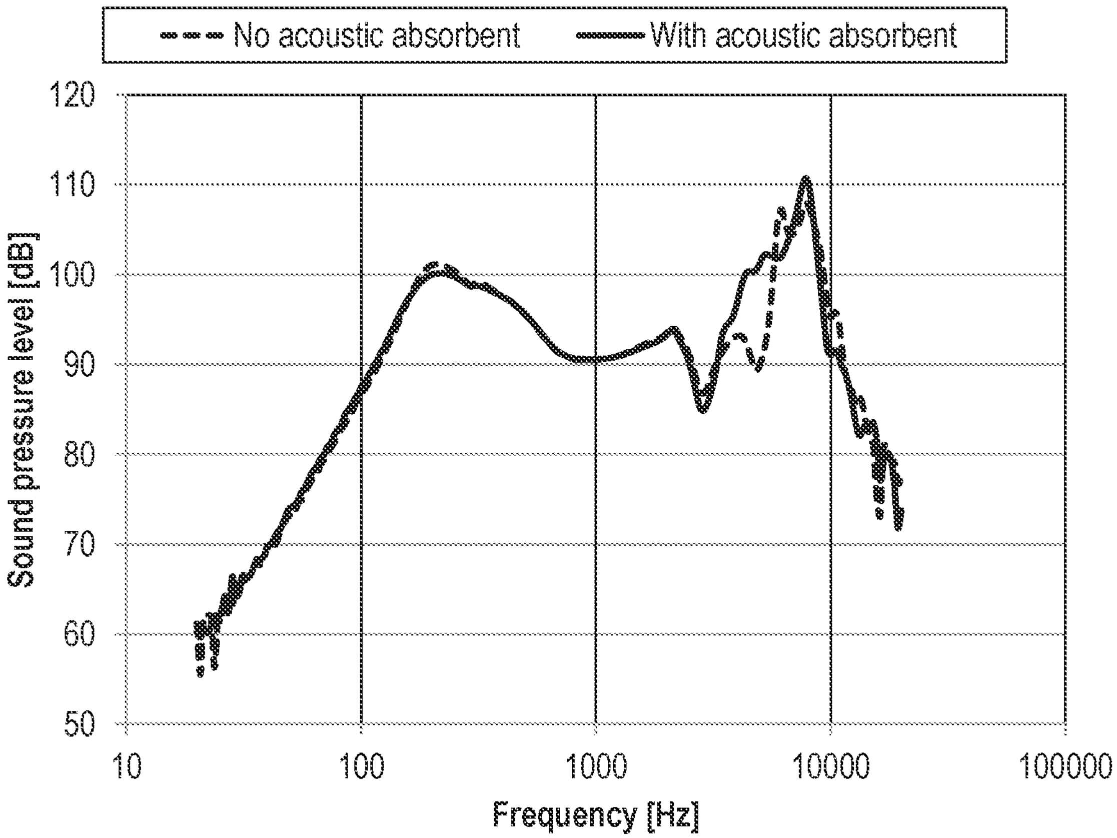
FIG. 17 is a graph in which frequency characteristics of acoustic signals observed at the position P1 in FIG. 5B are compared.
Figure 18:
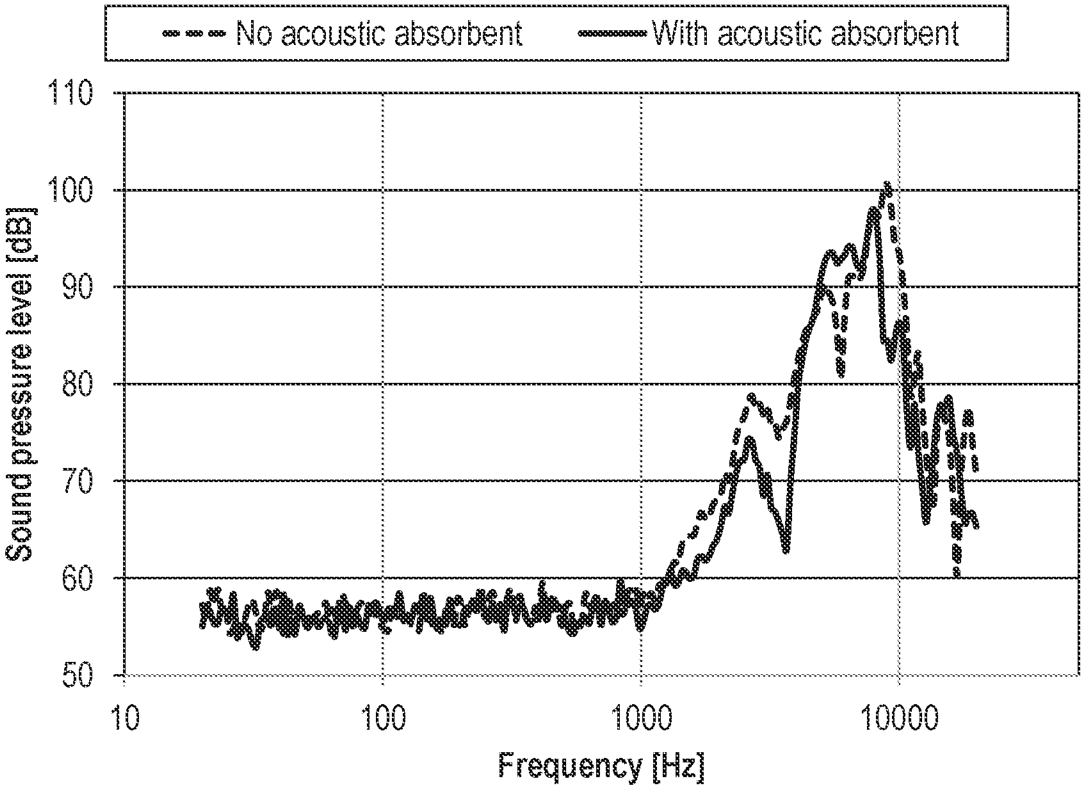
FIG. 18 is a graph illustrating frequency characteristics of acoustic signals observed at the position P2 in FIG. 5B.
Figure 19:
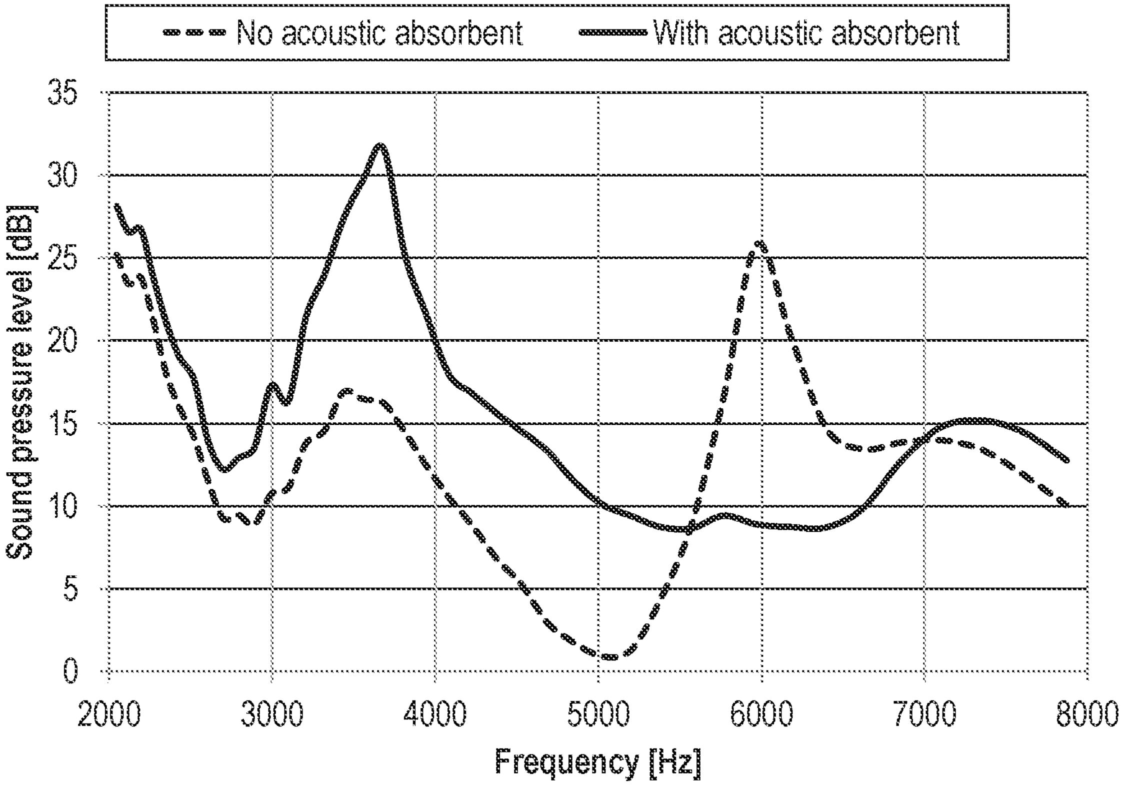
FIG. 19 is a graph illustrating differences between the acoustic signals observed at the position P1 and the acoustic signals observed at the position P2.

FIG. 17 illustrates frequency characteristics of an acoustic signal observed at the position P1 in FIG. 5B, FIG. 18 illustrates frequency characteristics of an acoustic signal observed at the position P2 in FIG. 5B, and FIG. 19 illustrates a difference between the frequency characteristics of the acoustic signal observed at the position P1 and the frequency characteristics of the acoustic signal observed at the position P2. The horizontal axis represents a frequency (Frequency [Hz]), and the vertical axis represents a sound pressure level (Sound pressure level (SPL) [dB]). A solid line graph illustrates frequency characteristics in the case of using the acoustic signal output device 10 in which the sound holes 123*a* are covered with the sound absorbing material (With acoustic absorbent), and a broken line graph illustrates frequency characteristics in the case of using the acoustic signal output device 10 of the first embodiment (No acoustic absorbent). As illustrated in FIG. 19, it can be seen that, in the band of a frequency of 2000 Hz or more, a difference between the sound pressure of the acoustic signal observed at the position P1 and the sound pressure of the acoustic signal observed at the position P2 is generally larger in the case of using the acoustic signal output device 10 in which the sound holes 123*a* are covered with the sound absorbing material than in the case of using the acoustic signal output device 10 that does not include the sound absorbing material. This indicates that, in a band of a frequency of 2000 Hz or more, sound leakage at the position P2 can be generally reduced more in the case of using the acoustic signal output device 10 in which the sound holes 123*a* are covered with the sound absorbing material.

Second Embodiment

Next, a second embodiment of the present invention will be described. The second embodiment is a modification of the first embodiment. Hereinafter, description will focus on differences from the matters described so far, and description of portions that have already been described will be simplified by using the same reference numerals.

In order to improve the sound quality of the acoustic signal output device 10 of the first embodiment or the modifications thereof, the size of the driver unit 11 may need to be increased. However, in the first embodiment or the modifications thereof, in a case where the size of the driver unit 11 increases, the size and weight of the acoustic signal output device 10 itself also increase. However, wearing the acoustic signal output device 10 having a large size and weight near the ear canal increases a burden on the ear and a foreign body feeling. Therefore, a housing including sound holes and the driver unit 11 may be formed as separate objects, and connected by a waveguide. As a result, the size of the driver unit 11 can be increased without the size and weight of the housing worn near the ear canal increased. Details will be described below.

Figure 20:
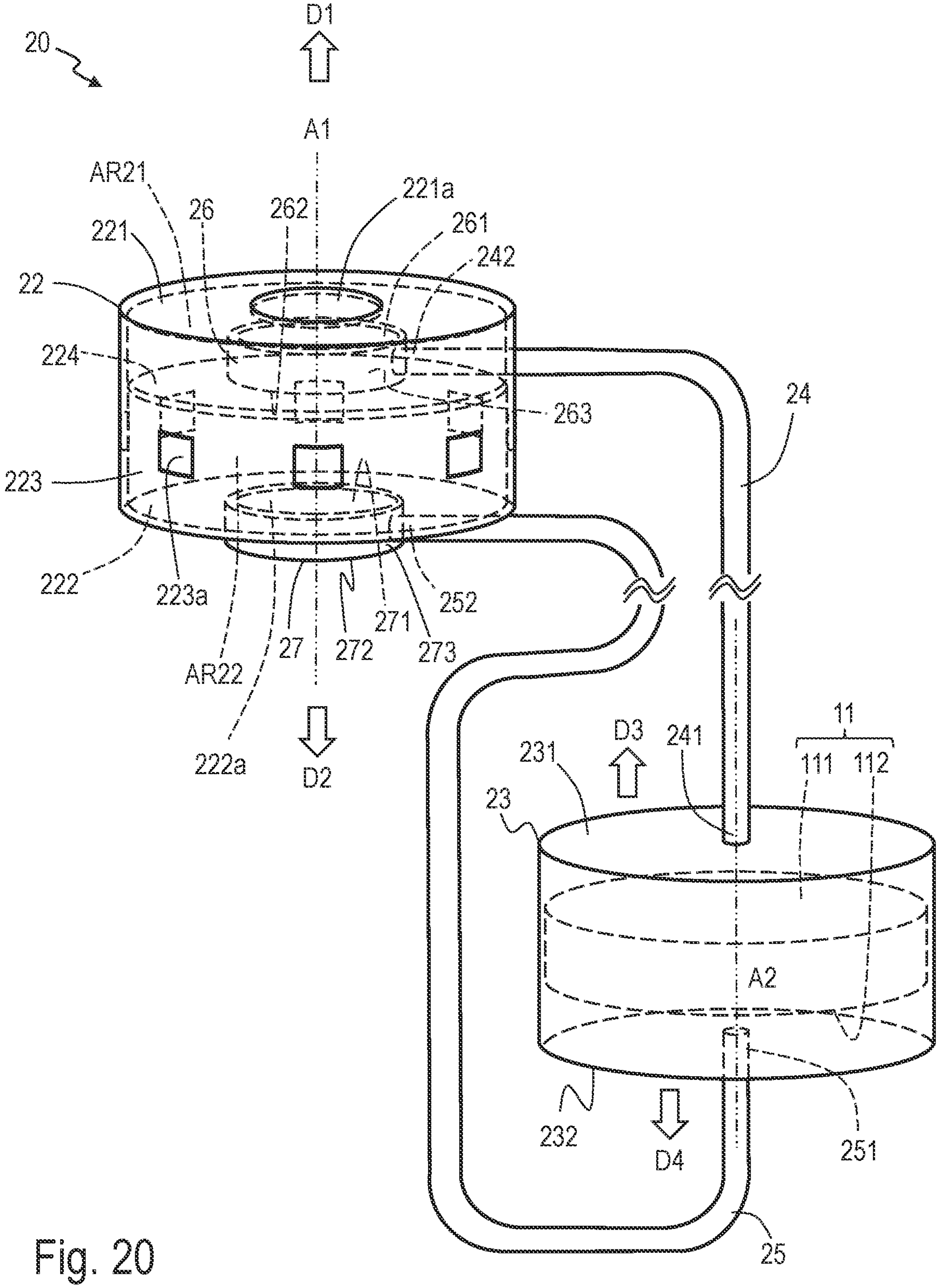
FIG. 20 is a transparent perspective view illustrating a configuration of an acoustic signal output device according to a second embodiment.

An acoustic signal output device 20 of the present embodiment is also a device for acoustic listening that is worn without sealing the ear canal of the user. As illustrated in FIG. 20, the acoustic signal output device 20 of the present embodiment includes a driver unit 11, a housing 22 including hollow portions AR21 and AR22 (first and second hollow portions), a housing 23 that internally accommodates the driver unit 11, hollow waveguides 24, 25 (first and second waveguides) connecting the housing 22 and the housing 23, and hollow joining members 26, 27 connecting the waveguides 24, 25 to the housing 22.

Driver Unit 11

As illustrated in FIG. 20, the driver unit 11 is a device that emits an acoustic signal AC1 (first acoustic signal) based on an input output signal to one side (D3 direction side), and emits an acoustic signal AC2 (second acoustic signal) that is an antiphase signal of the acoustic signal AC1 or an approximate signal of the antiphase signal to the other side (D4 direction side). The configuration of the driver unit 11 is the same as that of the first embodiment except that the D1 direction is replaced with the D3 direction and the D2 direction is replaced with the D4 direction.

Housing 23

As illustrated in FIG. 20, the housing 23 is a hollow member including a wall portion on the outer side, and internally houses the driver unit 11. Although the shape of the housing 23 is any shape, for example, the shape of the housing 23 is desirably rotationally symmetric (line-symmetric) or substantially rotationally symmetric about an axis A2 extending along the D3 direction. In the present embodiment, for simplification of description, an example is described in which the housing 23 has a substantially cylindrical shape including both end surfaces. However, this is an example and does not limit the present invention. For example, the housing 23 may have a substantially dome shape including a wall portion at an end portion, or may have a hollow substantially cubic shape, or may have another three-dimensional shape. One end 241 of the waveguide 24 is attached to a wall portion 231 of the housing 23 arranged on a surface 111 side on one side (D3 direction side) of the driver unit 11. In this manner, the waveguide 24 (first waveguide) having one end 241 connected to one side (D3 direction side) of the driver unit 11 leads out the acoustic signal AC1 emitted from a surface 111 of the driver unit 11 to one side (D3 direction side) to the outside of the housing 23. One end 251 of the waveguide 25 is attached to a wall portion 232 of the housing 23 arranged on a surface 112 side on the other side (D4 direction side) of the driver unit 11. In this manner, the waveguide 25 (second waveguide) having one end 251 connected to the other side (D4 direction side) of the driver unit 11 leads out the acoustic signal AC2 emitted from a surface 112 of the driver unit 11 to the other side (D4 direction side) to the outside of the housing 23. The material of the housing 23 is any material. The housing 23 may be formed from a rigid body such as synthetic resin or metal, or may be formed from an elastic body such as rubber.

Waveguides 24, 25

As illustrated in FIG. 20, the waveguides 24, 25 are, for example, hollow members configured in a tube shape, and transmit the acoustic signals AC1 and AC2 input from one ends 241, 251 to the other ends 242, 252 and emit the acoustic signals from the other ends 242, 252. However, the waveguides 24, 25 are not limited to the tubular waveguides, and any structures may be used as long as the structures guide acoustic signals collected at the one ends 241, 251 (first positions) to the other ends 242, 252 (second positions) different from the one ends 241, 251 (first positions). Although the lengths of the waveguides 24, 25 are any lengths, preferably, the length of the sound path of the waveguide 24 and the length of the sound path of the waveguide 25 are equal, or the difference between the length of the sound path of the waveguide 24 and the length of the sound path of the waveguide 25 is preferably an integral multiple of the wavelength of the acoustic signals AC1, AC2. That is, in a case where the length of the sound path of the waveguide 24 (first waveguide) is $L_1$, the length of the sound path of the waveguide 25 (second waveguide) is $L_2$, n is an integer, and the acoustic signal AC1 (first acoustic signal) and the acoustic signal AC2 (second acoustic signal) include acoustic signals having a wavelength $\lambda$, $L_1=L_2+n\lambda$ is desirably satisfied. Note that the sound path is a sound passage, and in a case of the waveguides 24, 25 having equal inner diameters, a specific example of the length of the sound paths of the waveguides 24, 25 is the length of the waveguides 24, 25. The material of the waveguides 24, 25 is also any material. The waveguides 24, 25 may each be formed from a rigid body such as synthetic resin or metal, or may be formed from an elastic body such as rubber.

Joining Member 26

The joining member 26 is a hollow member including an open end 261 positioned on one side, a wall portion 262 that is a bottom surface positioned on the other side of the open end 261, and a wall portion 263 that is a side surface surrounding a space between the open end 261 and the wall portion 262 around the axis A1. In the axis A1 of the present embodiment passes through the open end 261 and the wall portion 262. Preferably, the axis A1 is perpendicular or substantially perpendicular to the wall portion 262. Preferably, the joining member 26 is rotationally symmetric with respect to the axis A1. In the present embodiment, for simplification of description, an example is indicated in which the wall portion 263 has a cylindrical shape, but the wall portion 263 may have another shape such as a prismatic shape. The other end 242 of the waveguide 24 is attached to the wall portion 263, and the acoustic signal AC1 emitted from the other end 242 of the waveguide 24 is introduced inside the joining member 26 (space between the open end 261 and the wall portion 262). The acoustic signal AC1 introduced inside the joining member 26 is emitted from the open end 261. The material of the joining member 26 is any material. The joining member 26 may be formed from a rigid body such as synthetic resin or metal, or may be formed from an elastic body such as rubber.

Joining Member 27

Similarly, the joining member 27 is a hollow member including an open end 271 positioned on one side, a wall portion 272 that is a bottom surface positioned on the other side of the open end 271, and a wall portion 273 that is a side surface surrounding a space between the open end 271 and the wall portion 272 around the axis A1. The axis A1 of the present embodiment passes through the open end 271 and the wall portion 272. Preferably, the axis A1 is perpendicular or substantially perpendicular to the wall portion 272. Preferably, the joining member 27 is rotationally symmetric with respect to the axis A1. In the present embodiment, for simplification of description, an example is indicated in which the wall portion 273 has a cylindrical shape, but the wall portion 273 may have another shape such as a prismatic shape. The other end 252 of the waveguide 25 is attached to the wall portion 273, and the acoustic signal AC2 emitted from the other end 252 of the waveguide 25 is introduced inside the joining member 27 (space between the open end 271 and the wall portion 272). The acoustic signal AC2 introduced inside the joining member 27 is emitted from the open end 271. The material of the joining member 27 is any material. The joining member 27 may be formed from a rigid body such as synthetic resin or metal, or may be formed from an elastic body such as rubber.

Housing 22

As illustrated in FIGS. 20, 21A to 21C, 22A, and 22B, the housing 22 of the present embodiment includes a wall portion 221 positioned on one side (D1 direction side), a wall portion 222 positioned on the other side (D2 direction side), a wall portion 223 surrounding a space between the wall portion 221 and the wall portion 222, and a wall portion 224 separating a space surrounded by the wall portion 221, the wall portion 222, and the wall portion 223 into a hollow portion AR21 (first hollow portion) and a hollow portion AR22 (second hollow portion). In the present embodiment, the hollow portion AR21 and the hollow portion AR22 are arranged on the axis A1 extending in the same D1 direction, and for example, the center region of the hollow portion AR21 and the center region of the hollow portion AR22 are arranged on the same axis A1. The internal space of the hollow portion AR21 is desirably separated from the internal space of the hollow portion AR22 by the wall portion 224.

The joining member 26 to which the other end 242 of the waveguide 24 is attached is fixed or integrated with the inner wall portion of the hollow portion AR21, and the open end 261 side of the joining member 26 faces the wall portion 221 side. For example, the wall portion 262 side of the joining member 26 is fixed or integrated with the wall portion 224 inside the hollow portion AR21, and the open end 261 side faces the wall portion 221 side. In the example of the present embodiment, the center of the wall portion 262 and the open end 261 of the joining member 26 is arranged on the axis A1. As a result, the other end 242 of the waveguide 24 is connected to the hollow portion AR21 via the joining member 26, and the acoustic signal AC1 sent to the joining member 26 is emitted from the open end 261 toward the wall portion 221 side (D1 direction side). That is, for example, the joining member 26 is arranged on the axis A1, the open end 261 of the joining member 26 opens toward the direction D1 (first direction) along the axis A1, and the acoustic signal AC1 introduced from the other end 242 of the waveguide 24 is emitted toward the direction D1 inside the hollow portion AR21.

The wall portion 222 of the hollow portion AR22 is provided with a through hole 222*a*. The through hole 222*a* is desirably arranged on the axis A1, and more preferably, the center of the through hole 222*a* is desirably arranged on the axis A1. Although the shape of the through hole 222*a* is any shape, the opening portion of the through hole 222*a* is preferably rotationally symmetric with respect to the axis A1, and more preferably, the edge of the opening portion of the through hole 222*a* is a circle. The joining member 27 to which the other end 252 of the waveguide 25 is attached is fixed or integrated with the outside of the wall portion 222 of the housing 22, and the open end 271 side of the joining member 27 faces the through hole 222*a*. In the example of the present embodiment, the center of the wall portion 272 of the joining member 27, the open end 271, and the through hole 222*a* is arranged on the axis A1. As a result, the other end 252 of the waveguide 25 is connected to the hollow portion AR22 via the joining member 27, and the acoustic signal AC2 sent to the joining member 27 is emitted from the open end 271 toward the internal space of the hollow portion AR22. For example, the acoustic signal AC2 is emitted from the open end 271 toward the wall portion 224 side (D1 direction side). That is, for example, the joining member 27 is arranged on the axis A1, the open end 271 of the joining member 27 opens toward the direction D1 (first direction) along the axis A1, and the acoustic signal AC2 introduced from the other end 252 of the waveguide 25 is emitted toward the direction D1 inside the hollow portion AR22.

Although the shape of the housing 22 is any shape, for example, the shape of the housing 22 is desirably rotationally symmetric or substantially rotationally symmetric about the axis A1. In the present embodiment, for simplification of description, an example is described in which the external shape of the housing 22 has a substantially cylindrical shape including the wall portions 221, 222 as both end surfaces and the wall portion 223 as a side surface. In the present embodiment, an example is described in which the wall portions 221, 222, 224 are perpendicular or substantially perpendicular to the axis A1, and the wall portion 223 is parallel or substantially parallel to the axis A1. However, this is an example and does not limit the present invention. For example, the external shape of the housing 22 may have a substantially dome shape including a wall portion at an end portion, or may have a hollow substantially cubic shape, or may have another three-dimensional shape. The material of the housing 22 is any material. The housing 22 may be formed from a rigid body such as synthetic resin or metal, or may be formed from an elastic body such as rubber.

Sound Holes 221*a*, 223*a*

The wall portion 221 of the hollow portion AR21 (first hollow portion) includes a sound hole 221*a* (first sound hole) for leading out the acoustic signal AC1 (first acoustic signal) introduced into the hollow portion AR21 by the waveguide 24 (first waveguide) to the outside. Furthermore, the wall portion 223 of the hollow portion AR22 (second hollow portion) is provided with sound holes 223*a* (second sound holes) for leading out the acoustic signal AC2 (second acoustic signal) introduced into the hollow portion AR22 by the waveguide 25 (second waveguide) to the outside. Similarly to the sound hole 121*a* and the sound holes 123*a* of the first embodiment, the sound hole 221*a* and the sound holes 223*a* are, for example, through holes penetrating the wall portion of the housing 12, but this does not limit the present invention. As long as the acoustic signal AC1 and the acoustic signal AC2 can be led out to the outside, the sound hole 221*a* and the sound holes 223*a* may not be through holes.

The acoustic signal AC1 emitted from the sound hole 221*a* reaches the ear canal of the user and is heard by the user. On the other hand, the acoustic signal AC2 that is an antiphase signal of the acoustic signal AC1 or an approximate signal of the antiphase signal is emitted from the sound holes 223*a*. A part of the acoustic signal AC2 cancels out a part (sound leakage component) of the acoustic signal AC1 emitted from the sound hole 221*a*. As a result, sound leakage can be reduced.

An arrangement configuration of the sound holes 221*a*, 223*a* will be exemplified.

The sound hole 221*a* (first sound hole) of the present embodiment is provided in the wall portion 221 of the hollow portion AR21 arranged on one side (D1 direction side that is a side toward which the acoustic signal AC1 is emitted) of the joining member 26 (FIG. 20, FIG. 21A, FIG. 21B, and FIG. 22A). The sound holes 223*a* (second sound holes) of the present embodiment are provided in the wall portion 223 in contact with the hollow portion AR22. That is, assuming that a direction between the D1 direction (first direction) and the opposite direction of the D1 direction is a D12 direction (second direction) using the center of the hollow portion AR22 as a reference (FIG. 22A), the sound hole 221*a* (first sound hole) is provided on the D1 direction side (first direction side) of the housing 22, and the sound holes 223*a* (second sound holes) are provided on the D12 direction side (second direction side) of the housing 22. That is, the sound hole 221*a* opens toward the D1 direction (first direction) along the axis A1, and the sound holes 223*a* open toward the D12 direction (second direction). For example, in a case where the outer shape of the housing 22 includes the first end surface that is the wall portion 221 arranged on one side (D1 direction side) of the joining member 26, the second end surface that is the wall portion 222 arranged on the other side (D2 direction side) of the joining member 26, and the side surface that is the wall portion 223 surrounding the space sandwiched between the first end surface and the second end surface around the axis A1 along the emission direction (D1 direction) of the acoustic signal AC1 passing through the first end surface and the second end surface (FIG. 21B, FIG. 22A), the sound hole 221*a* (first sound hole) is provided on the first end surface, and the sound holes 223*a* (second sound holes) are provided on the side surface. In the present embodiment, no sound hole is provided on the wall portion 222 side of the housing 22. This is because if a sound hole is provided on the wall portion 222 side of the housing 22, the sound pressure level of the acoustic signal AC2 emitted from the housing 22 exceeds a level necessary for canceling out the sound leakage component of the acoustic signal AC1, and the excess is perceived as sound leakage.

Figure 21A:
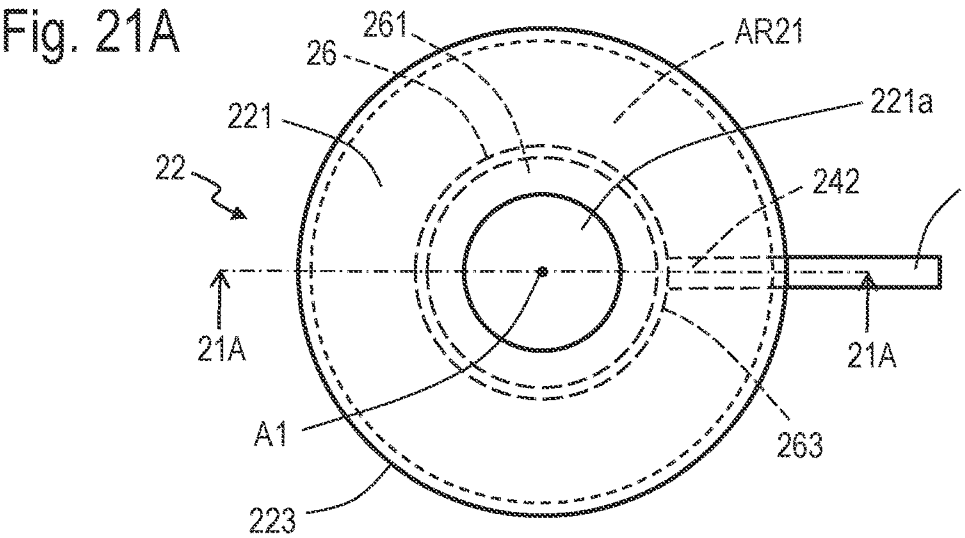
FIG. 21A is a transparent plan view illustrating the configuration of the acoustic signal output device according to the second embodiment.

As illustrated in FIG. 21A and the like, the sound hole 221*a* of the present embodiment is arranged on or in the vicinity of the axis A1 along the emission direction (D1 direction) of the acoustic signal AC1. The axis A1 of the present embodiment passes through the center of the region of the wall portion 221 arranged on one side (D1 direction side) of the joining member 26 or the vicinity of the center. For example, the axis A1 is an axis extending in the D1 direction through the center region of the housing 22. That is, the sound hole 221*a* of the present embodiment is provided at the center position of the region of the wall portion 221 of the housing 22. In the present embodiment, for simplification of description, an example is described in which the shape of the edge of the open end of the sound hole 221*a* is a circle (the open end is a circle). However, this does not limit the present invention. For example, the shape of the edge of the open end of the sound hole 221*a* may be another shape such as an ellipse, a quadrangle, and a triangle. The open end of the sound hole 221*a* may have a mesh shape. In other words, the open end of the sound hole 221*a* may be formed by a plurality of holes. In the present embodiment, for simplification of description, an example is described in which one sound hole 221*a* is provided in the wall portion 221 of the housing 22. However, this does not limit the present invention. For example, two or more sound holes 221*a* may be provided in the wall portion 221 of the housing 22.

Figure 21B:
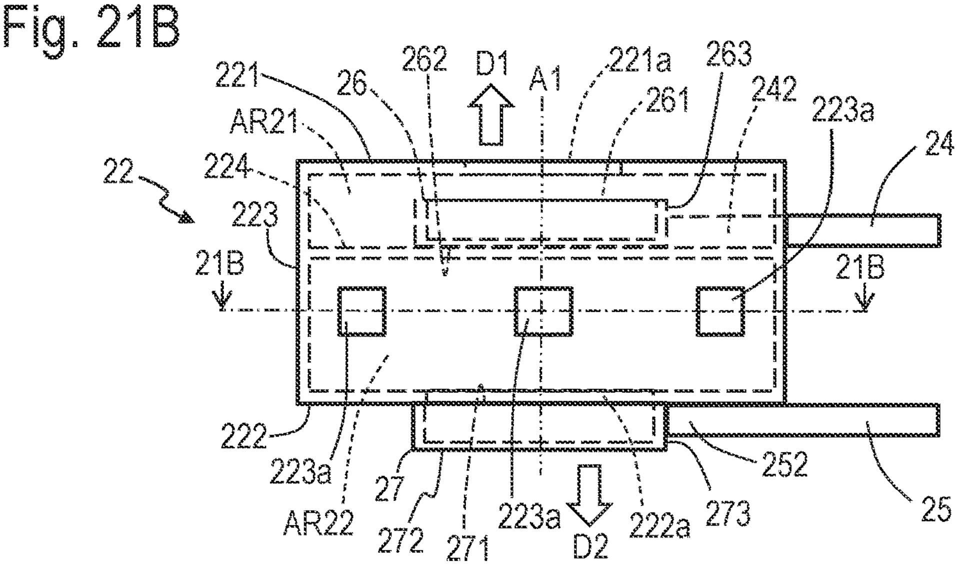
FIG. 21B is a transparent front view illustrating the configuration of the acoustic signal output device according to the second first embodiment.
Figure 21C:
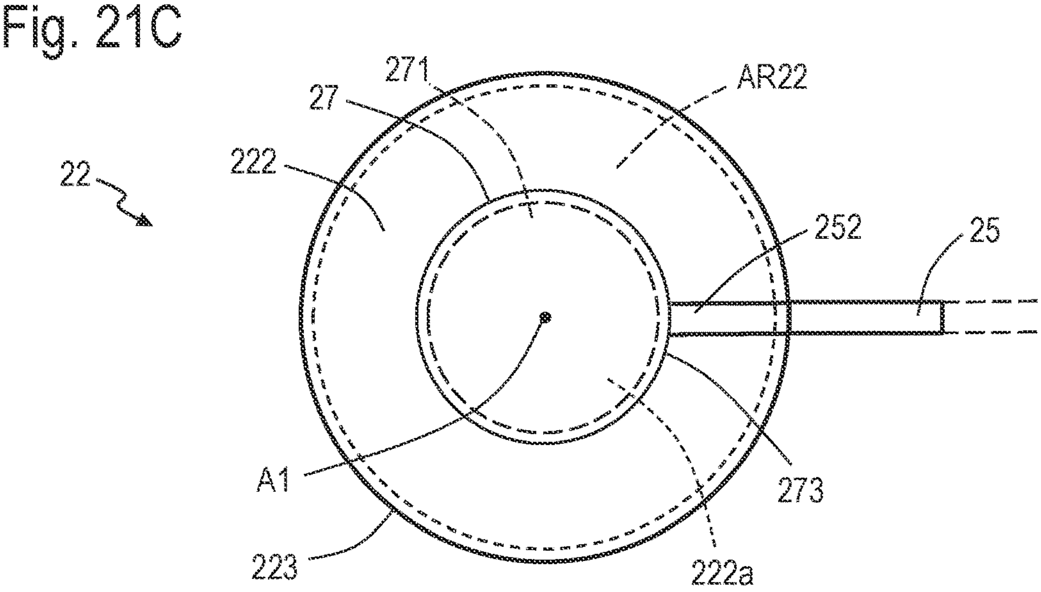
FIG. 21C is a bottom view illustrating the configuration of the acoustic signal output device according to the second embodiment.
Figure 22A:
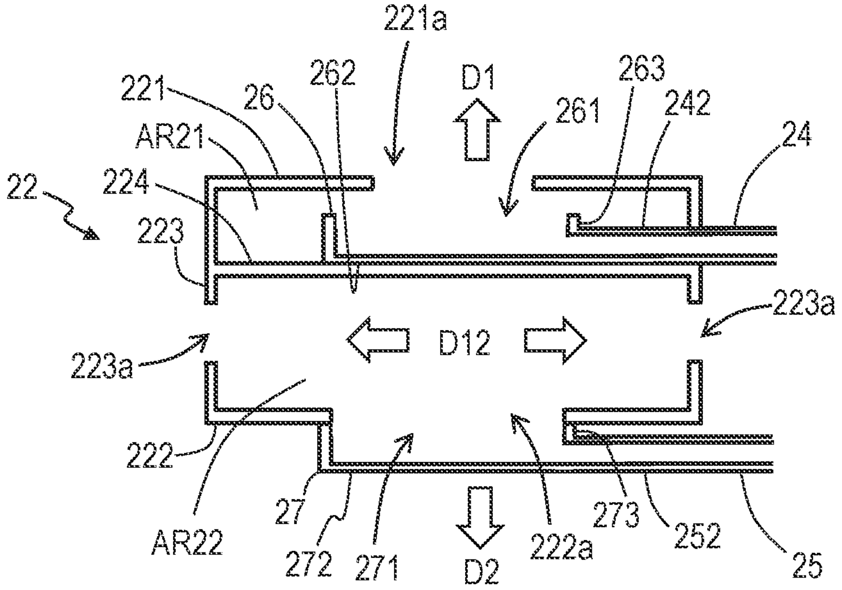
FIG. 22A is an end view taken along line 21A-21A in FIG. 21A.
Figure 22B:
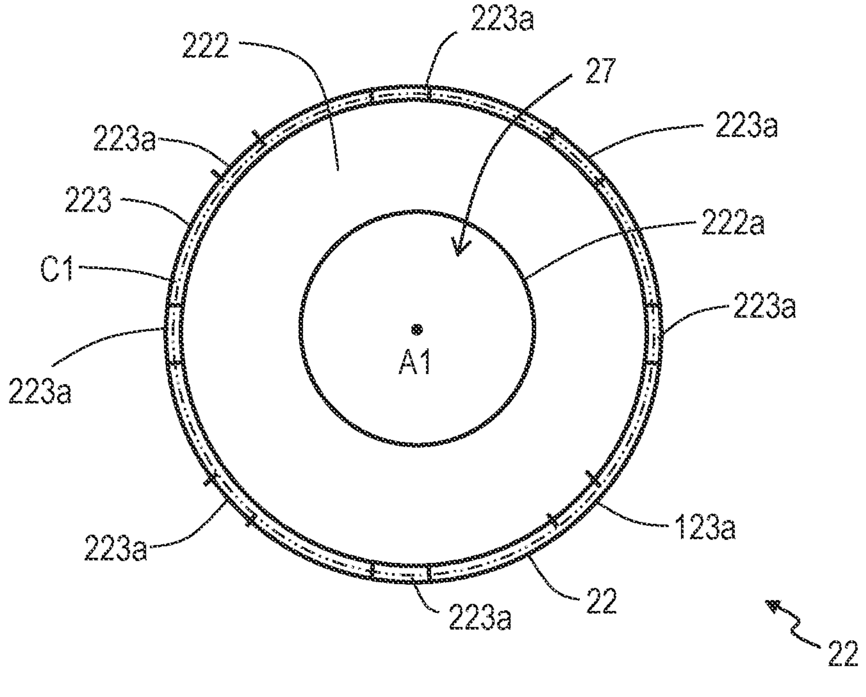
FIG. 22B is a cross-sectional view taken along line 21B-21B in FIG. 21B.

Similarly to the first embodiment, as illustrated in FIGS. 21B and 22B, a plurality of sound holes 223*a* (second sound holes) of the present embodiment is provided along a circumference C1 centered on the axis A1 along the emission direction of the acoustic signal AC1 (first acoustic signal). In the present embodiment, for simplification of description, an example is described in which the plurality of sound holes 223*a* is provided on the circumference C1. However, only a plurality of sound holes 223*a* is required to be provided along the circumference C1, and not all the sound holes 223*a* need to be strictly arranged on the circumference C1.

Similarly to the first embodiment, preferably, in a case where the circumference C1 is equally divided into a plurality of unit arc regions, the sum of the opening areas of sound holes 223*a* (second sound holes) provided along the first arc region that is one of the unit arc regions is the same as or substantially the same as the sum of the opening areas of sound holes 223*a* (second sound holes) provided along the second arc region that is one of the unit arc regions excluding the first arc region (FIG. 22B).

Similarly to the first embodiment, more preferably, the plurality of sound holes 223*a* having the same shape, the same size, and the same interval is desirably provided along the circumference C1. However, this does not limit the present invention.

In the present embodiment, for simplicity of description, a case where the shape of the edges of the open ends of the sound holes 223*a* is a quadrangle is exemplified, but this does not limit the present invention. For example, the shape of the edges of the open ends of the sound holes 223*a* may be another shape such as a circle, an ellipse, and a triangle. The open ends of the sound holes 223*a* may each have a mesh shape. In other words, the open ends of the sound holes 223*a* may each be formed by a plurality of holes. Further, the number of sound holes 223*a* is any number, and a single sound hole 223*a* may be provided in the wall portion 223 of the housing 22, or a plurality of sound holes 223*a* may be provided.

Similarly to the first embodiment, a ratio $S_2/S_1$ of the sum $S_2$ of the opening areas of the sound holes 223*a* (second sound holes) to the sum $S_1$ of the opening area of the sound hole 221*a* (first sound hole) desirably satisfies $2/3 \le S_2/S_1 \le 4$. In a case where the outer shape of the housing 22 includes the first end surface that is the wall portion 221 arranged on one side (D1 direction side) of the joining member 26, the second end surface that is the wall portion 222 arranged on the other side (D2 direction side) of the joining member 26, and the side surface that is the wall portion 223 surrounding the space sandwiched between the first end surface and the second end surface around the axis A1 along the emission direction (D1 direction) of the acoustic signal AC1 passing through the first end surface and the second end surface (FIG. 21B, FIG. 22A), a ratio $S_2/S_3$ of the sum $S_2$ of the opening areas of the sound holes 223*a* to the total area $S_3$ of the side surface is desirably $1/20 \le S_2/S_3 \le 1/5$.

Use State

Figure 23A:
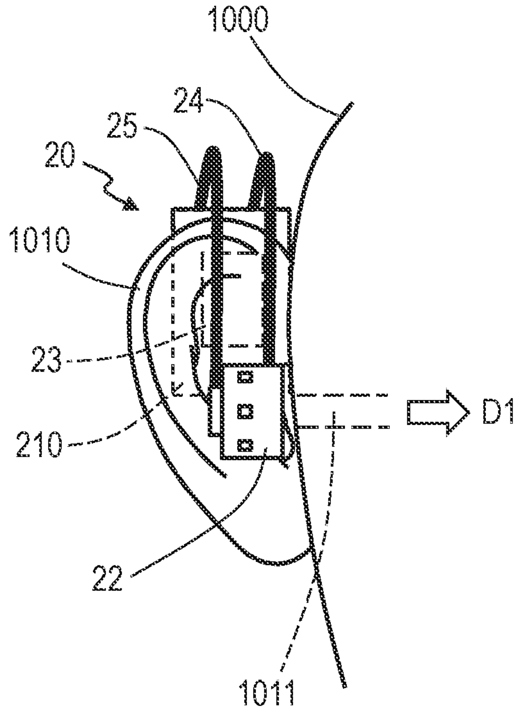
FIGS. 23A and 23B are views each for illustrating a use state of the acoustic signal output device according to the second embodiment.
Figure 23B:
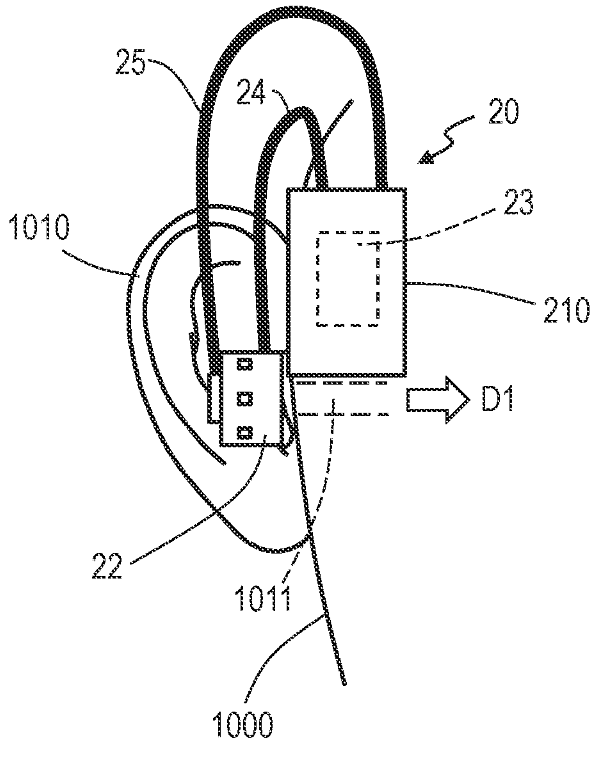
Figure 24:
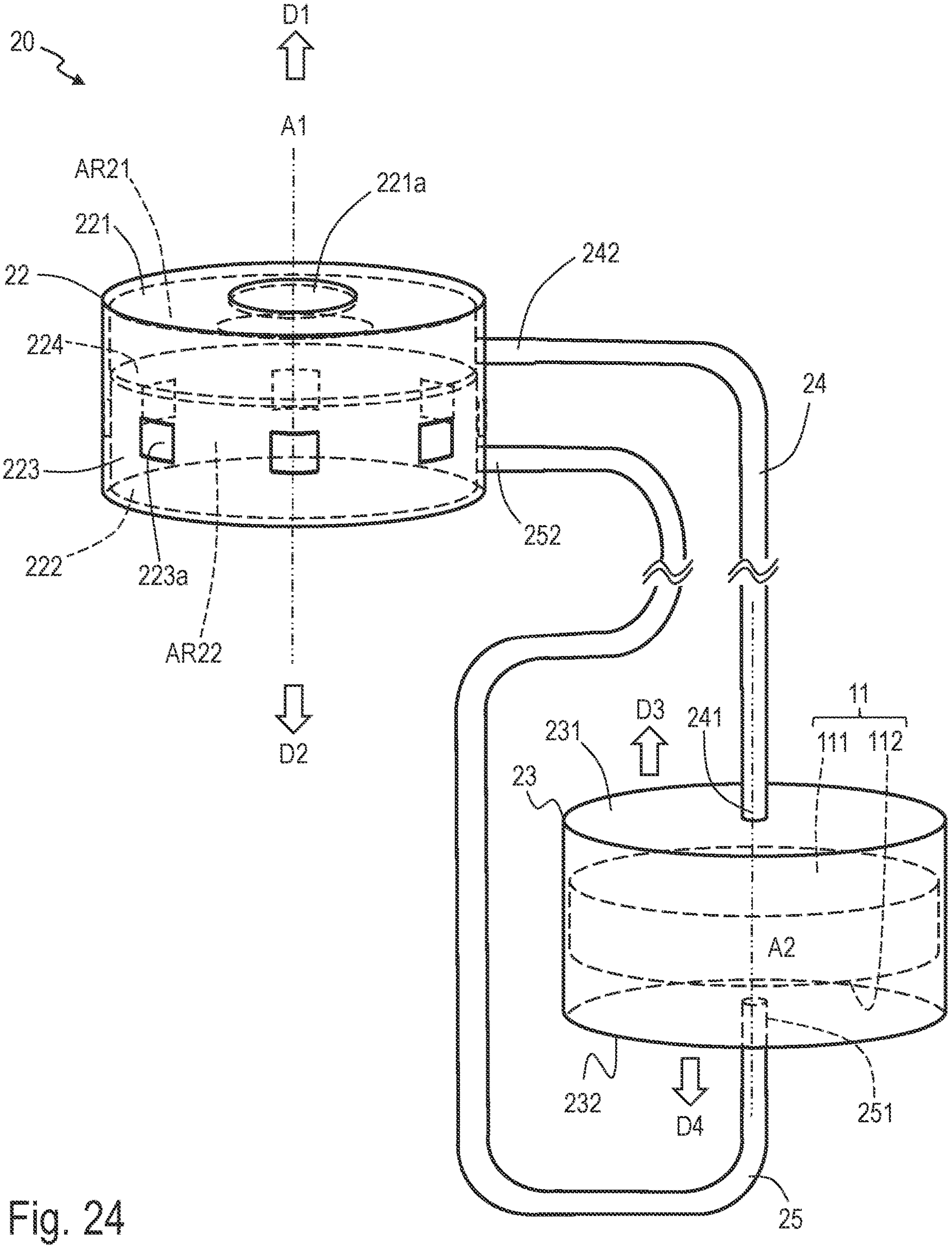
FIG. 24 is a transparent perspective view illustrating a modification of the acoustic signal output device according to the second embodiment.
Figure 25A:
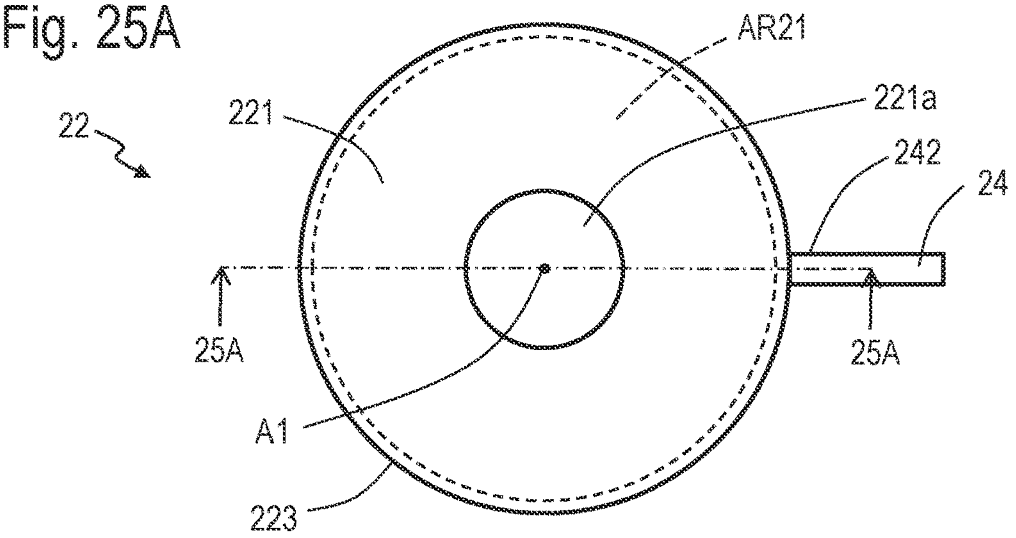
FIG. 25A is a transparent plan view illustrating the modification of the acoustic signal output device according to the second embodiment.
Figure 25B:
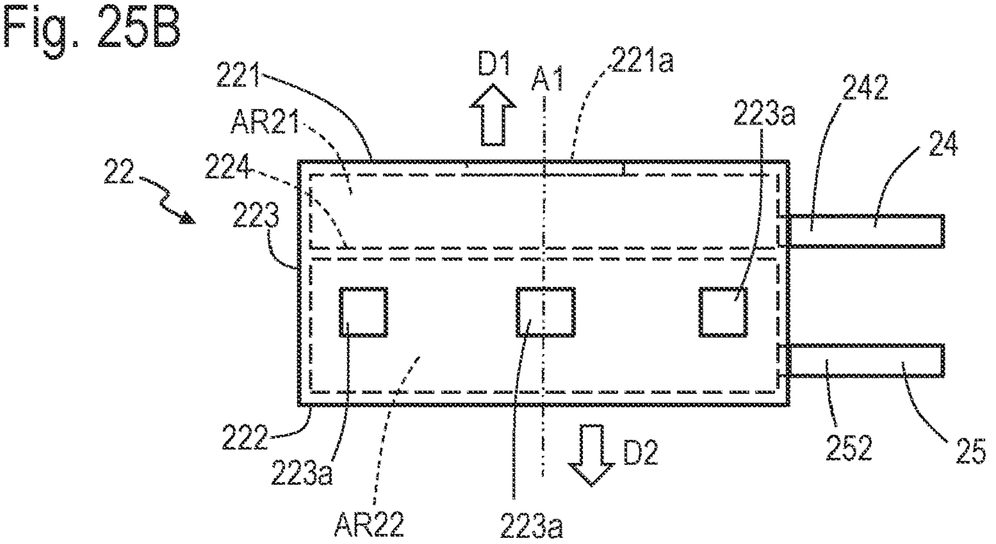
FIG. 25B is a transparent front view illustrating the modification of the acoustic signal output device according to the second embodiment.
Figure 25C:
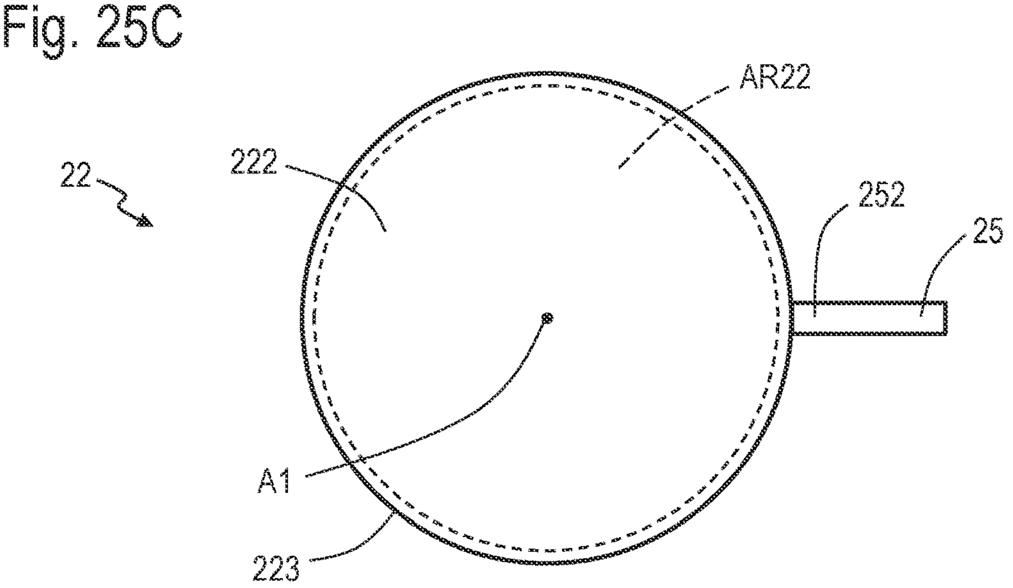
FIG. 25C is a bottom view illustrating the modification of the acoustic signal output device according to the second embodiment.
Figure 26:
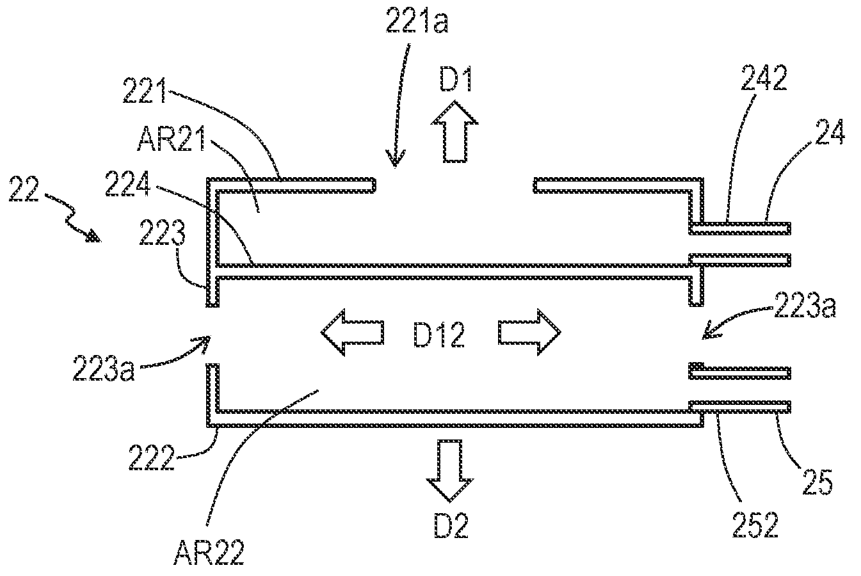
FIG. 26 is an end view taken along line 25A-25A in FIG. 25A.

A use state of the acoustic signal output device 20 will be exemplified with reference to FIGS. 23A and 23B. In the example of FIG. 23A, one acoustic signal output device 20 is worn on each of the right ear 1010 and the left ear (not illustrated) of the user 1000. Any wearing mechanism is used for wearing the acoustic signal output device 20 on the ear. The housing 22 of the acoustic signal output device 20 is arranged on the ear canal 1011 side of each of the right ear 1010 and the left ear, and the D1 direction side is directed to the ear canal 1011 side of the user 1000. Further, a reproducing device 210 including the housing 23 is arranged on the back side of the auricle of each of the right ear 1010 and the left ear, and the housing 23 and the housing 22 are connected by the waveguides 24, 25 as described above. The acoustic signal AC1 introduced from the driver unit 11 in the housing 23 into the hollow portion AR21 of the housing 22 is emitted from the sound hole 221*a*, and the emitted acoustic signal AC1 is heard by the user 1000. On the other hand, the acoustic signal AC2 introduced from the driver unit 11 in the housing 23 into the hollow portion AR22 of the housing 22 is emitted from the sound holes 223*a*. A part of the acoustic signal AC2 is an antiphase signal of the acoustic signal AC1 or an approximate signal of the antiphase signal, and cancels out a part (sound leakage component) of the acoustic signal AC1 emitted from the sound hole 221*a*.

As in the example of FIG. 23B, the reproducing device 210 including the housing 23 may be arranged on the head on the front side of the auricle of each of the right ear 1010 and the left ear, and the housing 23 and the housing 22 may be connected by the waveguides 24, 25 as described above. The other aspects are the same as those of the example of FIG. 23A.

Modification 1 of Second Embodiment

In the second embodiment, an example has been described in which a plurality of sound holes 223*a* (second sound holes) having the same shape, the same size, and the same interval is provided along the circumference C1. However, this does not limit the present invention. For example, the sound holes 223*a* having the same arrangement configuration as the arrangement configuration of the sound holes 123*a* in Modification 1 of the first embodiment may be provided in the housing 22 (FIGS. 10A to 12C).

Modification 2 of Second Embodiment

In the second embodiment, the configuration in which one sound hole 221*a* is arranged at the center position of the wall portion 221 of the housing 22 has been exemplified. However, similarly to Modification 2 of the first embodiment, a plurality of sound holes 221*a* may be provided in the region of the wall portion 221 of the housing 22, or a sound hole 221*a* may be biased to an eccentric position deviated from the center of the region of the wall portion 221 of the housing 22. For example, the sound hole 221*a* having the same arrangement configuration as the arrangement configuration of the sound hole 121*a* in Modification 2 of the first embodiment may be provided in the housing 22 (FIGS. 13A and 13B).

Similarly to Modification 2 of the first embodiment, in a case where the position of a single or plurality of sound holes 221*a* is biased to an eccentric position, the distribution or opening areas of the sound holes 223*a* may be biased accordingly. That is, in a case where the circumference C1 is equally divided into a plurality of unit arc regions, the sum of the opening areas of sound holes 223*a* (second sound holes) provided along the first arc region that is one of the unit arc regions may be smaller than the sum of the opening areas of sound holes 223*a* provided along the second arc region that is one of the unit arc regions closer to the eccentric position than the first arc region. For example, the sound holes 223*a* having the same arrangement configuration as the arrangement configuration of the sound holes 123*a* in Modification 2 of the first embodiment may be provided in the housing 22 (FIGS. 14A and 14B). Furthermore, by at least a part of the size of the opening portions of the sound holes 221*a*, 223*a*, the thickness of the wall portion of the housing 22, and the capacity inside the housing 22 being controlled, the resonance frequency of the housing 22 may be controlled.

Modification 3 of Second Embodiment

A sound absorbing material described in Modification 4 of the first embodiment in which the sound absorbing rate for an acoustic signal having a frequency $f_1$ is larger than the sound absorbing rate for an acoustic signal having a frequency $f_2$ ($f_1>f_2$) may be provided in the acoustic signal output device 20. The sound absorbing material may be provided on the other side 112 (D4 direction side) of the driver unit 11 inside the housing 23, may be provided inside the waveguide 25 (second waveguide), may be provided at an end portion (open end portion) of the waveguide 25, may be provided at least in any one of the sound holes 223*a* (second sound holes), or may be provided inside the hollow portion AR22 (second hollow portion). For example, in Example 4-1 to Example 4-3 of Modification 4 of the first embodiment, the housing 12 may be replaced with the hollow portion AR22, the sound holes 123*a* may be replaced with the sound holes 223*a*, the region on the other side 112 of the driver unit 11 may be replaced with the internal region of the hollow portion AR22, and the region AR2 of the wall portion 122 may be replaced with the region of the wall portion 222.

Modification 4 of Second Embodiment

By the joining members 26, 27 being provided as in the second embodiment, the emission directions of the acoustic signals AC1, AC2 in the hollow portions AR21, AR22 can be controlled. For example, the acoustic signal AC1 introduced from the other end 242 of the waveguide 24 can be emitted in the direction D1 along the axis A1 inside the hollow portion AR21, and the acoustic signal AC2 introduced from the other end 252 of the waveguide 25 can be emitted in the direction D1 inside the hollow portion AR22. In this case, the sound pressure distributions of the acoustic signal AC1 emitted from the sound hole 221*a* and the acoustic signal AC2 emitted from the sound holes 223*a* can be rotationally symmetric or substantially rotationally symmetric with respect to the axis A1. As a result, sound leakage can be appropriately reduced. However, this does not limit the present invention. For example, as illustrated in FIGS. 24, 25A, 25B, 25C, and 26, the acoustic signal output device 20 may not include the joining member 26, the other end 242 side of the waveguide 24 may be directly connected to the wall portion 223 of the hollow portion AR21, and the acoustic signal AC1 sent to the other end 242 of the waveguide 24 may be emitted toward the inside of the hollow portion AR21. Similarly, the acoustic signal output device 20 may not include the joining member 27, the other end 252 side of the waveguide 25 may be directly connected to the wall portion 223 of the hollow portion AR22, and the acoustic signal AC2 sent to the other end 252 of the waveguide 25 may be emitted toward the inside of the hollow portion AR22.

In the second embodiment, an example has been described in which the internal space of the hollow portion AR21 of the housing 22 is separated from the internal space of the hollow portion AR22 by the wall portion 224. (FIG. 20, FIG. 21B, and FIG. 22A). However, the internal space of the hollow portion AR21 of the housing 22 may not be separated from the internal space of the hollow portion AR22. In such a case, preferably, the open end 261 of the joining member 26 faces the wall portion 221 side (D1 direction side) of the housing 22 (for example, sound hole 221*a* side), and the open end 271 of the joining member 27 faces the wall portion 222 side (D2 direction side) of the housing 22. Even with such a configuration, the acoustic signal AC1 is emitted from the sound hole 221*a*, and the acoustic signal AC2 is emitted from the sound holes 223*a*.

Third Embodiment

A plurality of acoustic signal output devices 10 described in the first embodiment or the modifications thereof may be provided and controlled independently. As a result, the sound pressure level of the acoustic signal AC1 emitted from a certain acoustic signal output device 10 and the sound pressure level of the acoustic signal AC2 emitted from another acoustic signal output device 10 can be independently controlled. For example, a certain acoustic signal output device 10 and another acoustic signal output device 10 can be driven in opposite phases or substantially opposite phases and the level (power) at each frequency can be independently controlled. As a result, as exemplified in the first embodiment, the sound leakage component of the acoustic signal AC1 of each of the acoustic signal output devices 10 is canceled out by a part of the acoustic signal AC2, and a part of the acoustic signal AC1 and a part of the acoustic signal AC2 output from each of the acoustic signal output devices 10 different from each other can be canceled out. As a result, the sound leakage component can be more appropriately canceled out. In the present embodiment, for simplification of description, an example is described in which two acoustic signal output devices 10 are provided for one ear and are controlled independently. However, this does not limit the present invention, and three or more acoustic signal output devices 10 may be provided for one ear and controlled independently. Note that the same reference numerals are used for the matters already described and description thereof is omitted, and branch numbers are used to distinguish a plurality of members having the same configuration. For example, the two acoustic signal output devices 10 are referred to as an acoustic signal output device 10-1 and an acoustic signal output device 10-2, but the configurations of the acoustic signal output devices 10-1, 2 are the same as those of the acoustic signal output device 10.

Figure 27:
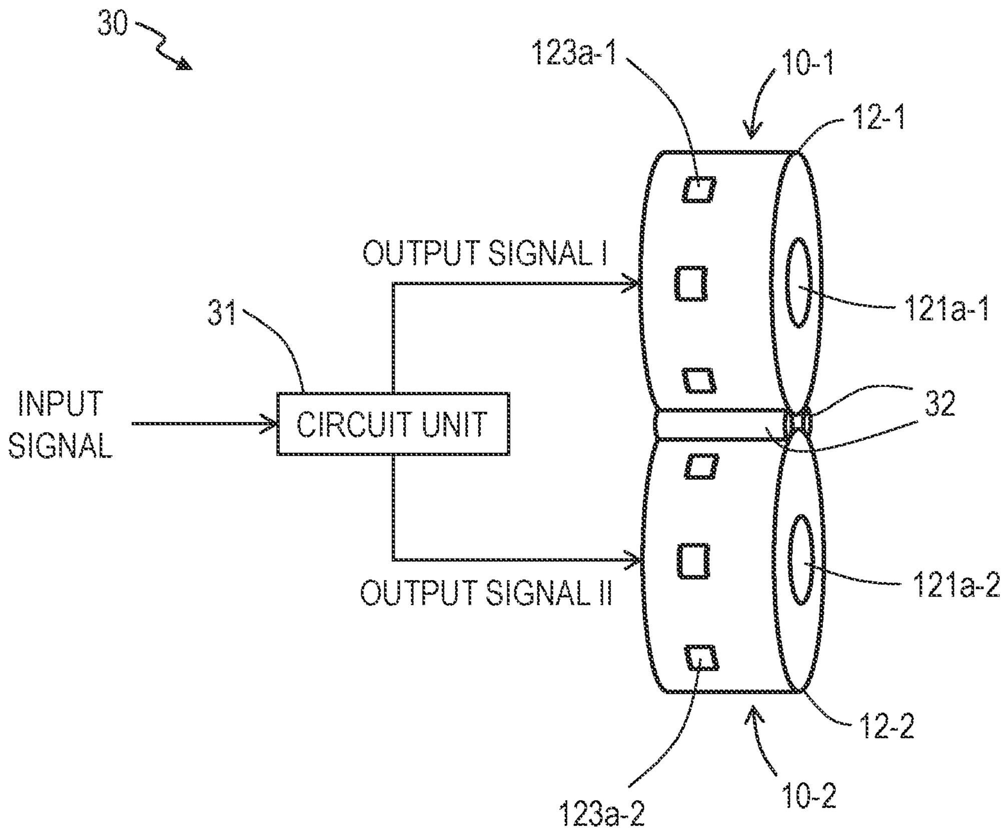
FIG. 27 is a perspective view illustrating a configuration of an acoustic signal output device according to a third embodiment.
Figure 28:
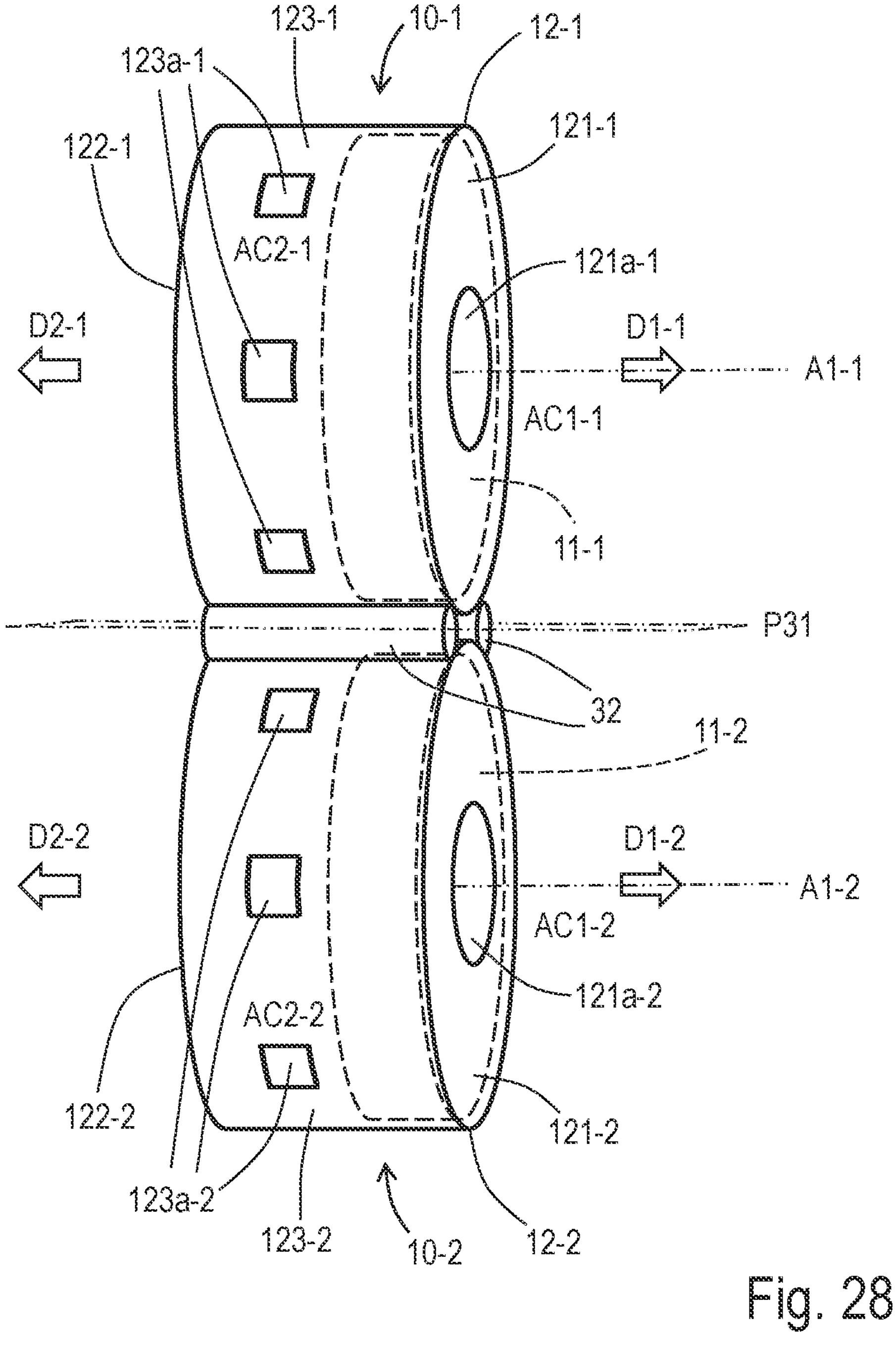
FIG. 28 is a transparent perspective view illustrating the configuration of the acoustic signal output device according to the third embodiment.

An acoustic signal output device 30 of the present embodiment is a device for acoustic listening that is worn without sealing the ear canal of the user. As illustrated in FIGS. 27 and 28, the acoustic signal output device 30 of the present embodiment includes the acoustic signal output devices 10-1, 2, a circuit unit 31, and a coupling portion 32.

Acoustic Signal Output Device 10-1

Figure 29:
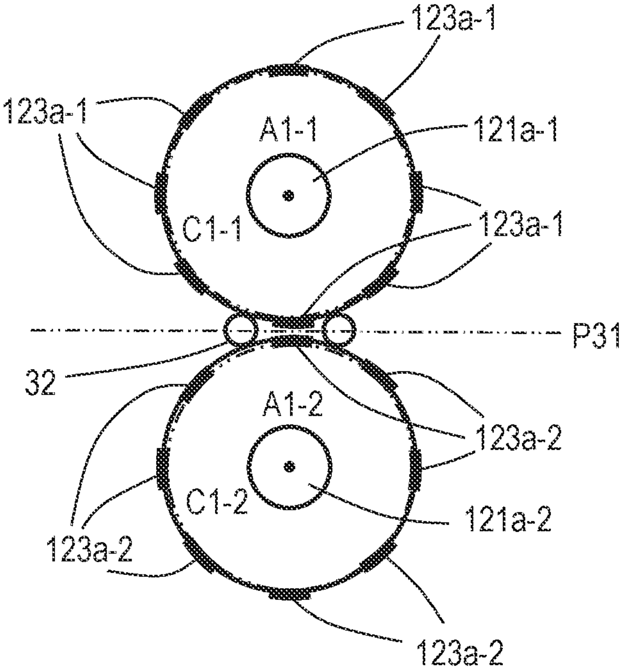
FIG. 29 is a conceptual view for illustrating arrangement of sound holes.

The configuration of the acoustic signal output device 10-1 is the same as that of the acoustic signal output device 10 exemplified in the first embodiment and the modifications thereof. That is, the acoustic signal output device 10-1 includes a driver unit 11-1 (first driver unit) and a housing 12-1 (first housing portion) that internally accommodates the driver unit 11-1. The driver unit 11-1 emits an acoustic signal AC1-1 (first acoustic signal) to a D1-1 direction side (one side), and emits an acoustic signal AC2-1 (second acoustic signal) that is an antiphase signal of the acoustic signal AC1-1 (first acoustic signal) or an approximate signal of the antiphase signal to a D2-1 direction side (other side) on the basis of an input output signal I (electrical signal representing an acoustic signal). A wall portion 121-1 of the housing 12-1 includes a single or plurality of sound holes 121*a*-1 (first sound holes) for leading out the acoustic signal AC1-1 (first acoustic signal) emitted from the driver unit 11-1 to the outside. A wall portion 123-1 of the housing 12-1 includes a single or plurality of sound holes 123*a*-1 (second sound holes) for leading out the acoustic signal AC2-1 (second acoustic signal) emitted from the driver unit 11-1 to the outside. Details of the configuration of the acoustic signal output device 10-1 are the same as those of the acoustic signal output device 10 described in the first embodiment. For example, the plurality of sound holes 123*a*-1 (second sound holes) is provided along a circumference C1-1 (first circumference) centered on an axis A1-1 (first axis) parallel or substantially parallel to a straight line extending in the direction D1-1 (first direction) (FIG. 29). For example, in a case where the circumference C1-1 (first circumference) is equally divided into a plurality of first unit arc regions, the sum of the opening areas of sound holes 123*a*-1 (second sound holes) provided along the first arc region that is one of the first unit arc regions is the same as or substantially the same as the sum of the opening areas of sound holes 123*a*-1 (second sound holes) provided along the second arc region that is one of the first unit arc regions excluding the first arc region.

Acoustic Signal Output Device 10-2

The configuration of the acoustic signal output device 10-2 is also the same as that of the acoustic signal output device 10 exemplified in the first embodiment and the modifications thereof. That is, the acoustic signal output device 10-2 includes a driver unit 11-2 (second driver unit) and a housing 12-2 (second housing portion) that internally accommodates the driver unit 11-2. The driver unit 11-2 emits an acoustic signal AC1-2 (fourth acoustic signal) to a D1-2 direction side (one side), and emits an acoustic signal AC2-2 (third acoustic signal) that is an antiphase signal of the acoustic signal AC1-2 or an approximate signal of the antiphase signal to a D2-2 direction side (other side) on the basis of an input output signal II (electrical signal representing an acoustic signal). The phase of the acoustic signal AC1-2 (fourth acoustic signal) is the same as or approximate to the phase of the acoustic signal AC2-1 (second acoustic signal). The phase of the acoustic signal AC2-2 (third acoustic signal) is the same as or approximate to the phase of the acoustic signal AC1-1 (first acoustic signal). The driver unit 11-2 may have the same design as the driver unit 11-1, or may have a different design from the driver unit 11-1. For example, the driver unit 11-2 may be smaller than the driver unit 11-1, or the performance of the driver unit 11-2 may be inferior to that of the driver unit 11-1. A wall portion 123-2 of the housing 12-2 includes a single or plurality of sound holes 123*a*-2 (third sound holes) for leading out the acoustic signal AC2-2 (third acoustic signal) emitted from the driver unit 11-2 to the outside. A wall portion 121-2 of the housing 12-2 includes a single or plurality of sound holes 121*a*-2 (fourth sound holes) for leading out the acoustic signal AC1-2 (fourth acoustic signal) emitted from the driver unit 11-2 to the outside. Details of the configuration of the acoustic signal output device 10-2 are the same as those of the acoustic signal output device 10 described in the first embodiment. For example, the plurality of sound holes 123*a*-2 (third sound holes) is provided along a circumference C1-2 (fourth circumference) centered on an axis A1-2 (fourth axis) parallel or substantially parallel to a straight line extending in the direction D1-2 (fourth direction) (FIG. 29). For example, in a case where the circumference C1-2 (fourth circumference) is equally divided into a plurality of fourth unit arc regions, the sum of the opening areas of sound holes 123*a*-2 (third sound holes) provided along the third arc region that is one of the fourth unit arc regions is the same as or substantially the same as the sum of the opening areas of sound holes 123*a*-2 (third sound holes) provided along the fourth arc region that is one of the fourth unit arc regions excluding the third arc region.

Coupling Portion 32

As illustrated in FIGS. 27, 28, and 29, the coupling portion 32 fixes the housing 12-1 of the acoustic signal output device 10-1 and the housing 12-2 of the acoustic signal output device 10-2 to each other. In the example of FIG. 28, the outside of the wall portion 123-1 of the housing 12-1 of the acoustic signal output device 10-1 and the outside of the wall portion 123-2 of the housing 12-2 of the acoustic signal output device 10-2 are joined. The sound hole 121*a*-1 (first sound hole) opens toward the direction D1-1 (first direction) along the axis A1-1. The direction D1-1 is a direction along the axis A1-1. The sound holes 123*a*-1 (second sound holes) open toward a direction D12-1 (second direction) between the direction D1-1 (first direction) and the opposite direction of the direction D1-1 (first direction). The sound hole 121*a*-2 (fourth sound hole) opens toward the direction D1-2 (fourth direction) that is the same as or approximate to the direction D1-1 (first direction). The direction D1-2 is a direction along the axis A1-2. The sound holes 123*a*-2 (third sound holes) open toward D12-2 (third direction) between the direction D1-2 (fourth direction) and the opposite direction of the direction D1-2 (fourth direction). However, this arrangement configuration is an example and does not limit the present invention.

As illustrated in FIGS. 27, 28, and 29, preferably, the sound hole 121*a*-1 (first sound hole) and the sound hole 121*a*-2 (fourth sound hole) are desirably plane-symmetric or substantially plane-symmetric with respect to a reference plane P31 including a straight line parallel or substantially parallel to the straight line (axis A1-1) extending in the direction D1-1 (first direction). Similarly, the sound holes 123*a*-1 (second sound holes) and the sound holes 123*a*-2 (third sound holes) are desirably plane-symmetric or substantially plane-symmetric with respect to the reference plane P31. More preferably, the housing 12-1 (first housing portion) and the housing 12-2 (second housing portion) are plane-symmetric or substantially plane-symmetric with respect to the reference plane P31.

Circuit Unit 31

The circuit unit 31 is a circuit that uses an input signal that is an electrical signal representing an acoustic signal as an input and outputs an output signal I that is an electrical signal for driving the driver unit 11-1 and an output signal II that is an electrical signal for driving the driver unit 11-2. The output signal I and the output signal II are electrical signals representing acoustic signals, and the output signal II is an antiphase signal of the output signal I or an approximate signal of the antiphase signal. Hereinafter, a configuration of the circuit unit 31 will be exemplified.

Configuration Example 1 of Circuit Unit 31

Figure 30A:
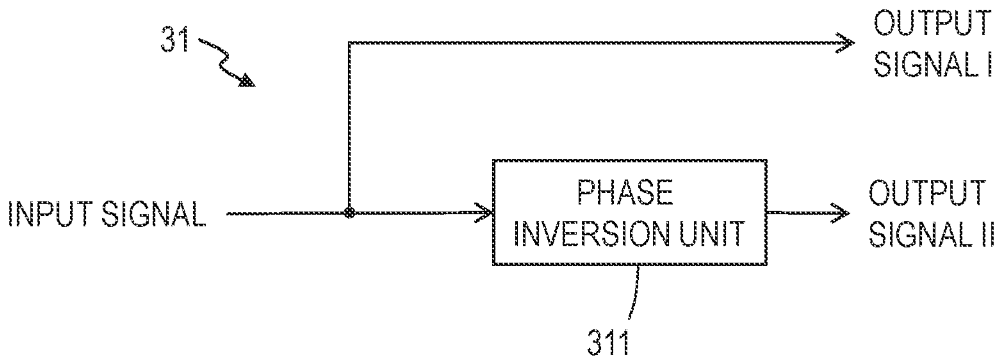
FIGS. 30A to 30C are block diagrams each for illustrating a configuration of a circuit unit.

The circuit unit 31 illustrated in FIG. 30A includes a phase inversion unit 311 that is a phase inversion circuit. An input signal input to the circuit unit 31 is directly output as the output signal I and supplied to the driver unit 11-1. Furthermore, the input signal input to the circuit unit 31 is also input to the phase inversion unit 311. The phase inversion unit 311 outputs an antiphase signal of the input signal or an approximate signal of the antiphase signal as the output signal II. The output signal II is supplied to the driver unit 11-2.

Configuration Example 2 of Circuit Unit 31

Figure 30B:
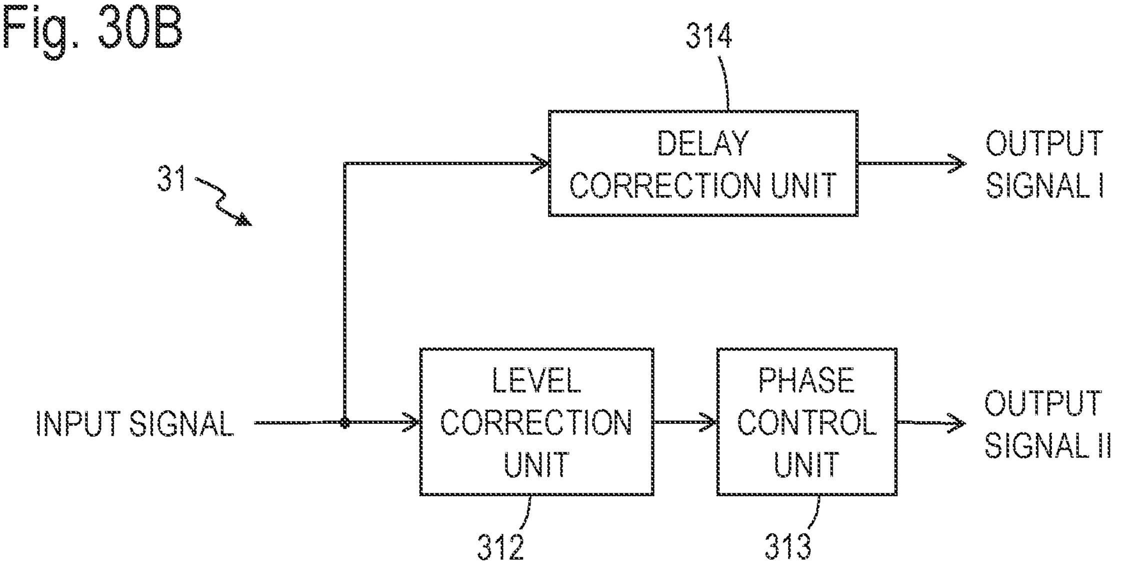

The circuit unit 31 illustrated in FIG. 30B includes a level correction unit 312, a phase control unit 313, and a delay correction unit 314. An input signal input to the circuit unit 31 is input to the level correction unit 312 and the delay correction unit 314. The level correction unit 312 adjusts the level of each frequency band of the input signal and outputs a band-level adjusted signal obtained by the adjustment. That is, in a case where the designs (aperture, structure, and the like) of the driver units 11-1, 2 are different from each other, the frequency characteristics of acoustic signals output from the driver units 11-1, 2 are also different. The difference in the frequency characteristics of acoustic signals output from the driver units 11-1, 2 relates to an effect of canceling out of sound leakage. For example, in a case where the housing 12-1 and the housing 12-2 are plane-symmetric with respect to the reference plane P31, the frequency characteristics of acoustic signals output from the driver units 11-1, 2 are desirably the same in order to enhance the effect of canceling out of sound leakage. Therefore, output signals are desirably adjusted such that the frequency characteristics of the acoustic signals output from the driver units 11-1, 2 are the same. On the other hand, in a case where the housing 12-1 and the housing 12-2 are not plane-symmetric with respect to the reference plane P31, the balance of the frequency characteristics of acoustic signals output from the driver units 11-1, 2 is desirably adjusted according to the asymmetry such that the effect of canceling out of sound leakage is enhanced. The level correction unit 312 implements these by adjusting the level of each band of the input signal. The band-level adjusted signal output from the level correction unit 312 is input to the phase control unit 313. The phase control unit 313 generates an antiphase signal of the band-level adjusted signal or an approximate signal of the antiphase signal, and outputs the signal as the output signal II. The phase control unit 313 is, for example, a phase inversion circuit or an all-pass filter. In a case where the phase control unit 313 is an all-pass filter, an antiphase signal of the band-level adjusted signal or an approximate signal of the antiphase signal can be generated in consideration of the phase characteristics of the level correction unit 312. The output signal II is supplied to the driver unit 11-2. The delay correction unit 314 outputs the output signal I obtained by adjusting the delay amount of the input signal. That is, in a case where delay occurs in processing (filter processing) of the level correction unit 312 and the phase control unit 313, the delay correction unit 314 adjusts the delay amount. As a result, the phases of the acoustic signals output from the driver units 11-1, 2 can be adjusted, and the sound leakage reduction effect can be improved. The output signal I is supplied to the driver unit 11-1. As described above, in the configuration example 2 of the circuit unit 31, the output signal I and the output signal II based on an input signal can be independently controlled.

Configuration Example 3 of Circuit Unit 31

As described above, as the frequencies of the acoustic signals AC1, AC2 become higher, the wavelengths become shorter, and canceling out the sound leakage component of the acoustic signal AC1 by the acoustic signal AC2 becomes difficult. For example, this canceling out is difficult in a frequency region that exceeds 6000 Hz. Therefore, in such a high frequency band, the acoustic signal AC2 for reducing the sound leakage component may rather promote sound leakage. On the other hand, in an earphone or the like, since the level of a low frequency sound range is weak, the influence of sound leakage is also small. For example, the influence of sound leakage is small in a frequency region below 2000 Hz. Therefore, in such a low frequency band, the importance of the acoustic signal AC2 for reducing the sound leakage component is low. Human auditory sensitivity to acoustic signals at frequencies from 2000 Hz to 6000 Hz is relatively high. That is, the importance of the acoustic signal AC2 for reducing the sound leakage component of the acoustic signal AC1 in such a frequency band is high.

From the above viewpoint, in a case where the user listens to the acoustic signal AC1 emitted from the sound hole 121*a*-1 of the acoustic signal output device 10-1, the frequency band of an acoustic signal emitted from the acoustic signal output device 10-2 may be restricted more than the frequency band of an acoustic signal emitted from the acoustic signal output device 10-1. That is, a frequency bandwidth BW-2 of the acoustic signal AC2-2 and the acoustic signal AC1-2 (third acoustic signal and fourth acoustic signal) emitted from the driver unit 11-2 (second driver unit) may be narrower than a frequency bandwidth BW-1 of the acoustic signals AC1-1 and AC2-1 (first acoustic signal and second acoustic signal) emitted from the driver unit 11-1 (first driver unit).

Example 31-1

For example, the magnitude (level) of the high-frequency side of the acoustic signal AC2-2 and the acoustic signal AC1-2 may be reduced more than the magnitude of the high-frequency side of the acoustic signal AC1-1 and the acoustic signal AC2-1. That is, the magnitude of a component at a frequency equal to or higher than a frequency $f_{31}$ (first frequency) of the acoustic signals AC2-2 and AC1-2 (third acoustic signal and fourth acoustic signal) emitted from the driver unit 11-2 (second driver unit) may be smaller than the magnitude of a component at a frequency equal to or higher than the frequency $f_{31}$ of the acoustic signals AC1-1 and AC2-1 (first acoustic signal and second acoustic signal) emitted from the driver unit 11-1 (first driver unit). For example, the driver unit 11-2 may output the acoustic signal AC2-2 and the acoustic signal AC1-2 in which a frequency band of the frequency $f_{31}$ or higher is reduced. Examples of the frequency $f_{31}$ include 3000 Hz, 4000 Hz, 5000 Hz, and 6000 Hz.

Example 31-2

For example, the magnitude of the low-frequency side of the acoustic signal AC2-2 and the acoustic signal AC1-2 may be reduced more than the magnitude of the low-frequency side of the acoustic signal AC1-1 and the acoustic signal AC2-1. That is, the magnitude of a component at a frequency equal to or lower than a frequency $f_{32}$ (second frequency) of the acoustic signals AC2-2 and AC1-2 (third acoustic signal and fourth acoustic signal) emitted from the driver unit 11-2 (second driver unit) may be smaller than the magnitude of a component at a frequency equal to or lower than the frequency $f_{32}$ of the acoustic signals AC1-1 and AC2-1 (first acoustic signal and second acoustic signal) emitted from the driver unit 11-1 (first driver unit). For example, the driver unit 11-2 may output the acoustic signal AC2-2 and the acoustic signal AC1-2 in which a frequency band of the frequency $f_{32}$ or lower is reduced. Examples of the frequency $f_{32}$ include 1000 Hz, 2000 Hz, and 3000 Hz.

Example 31-3

For example, the magnitude of the high-frequency side of the acoustic signal AC2-2 and the acoustic signal AC1-2 may be reduced more the magnitude of the high-frequency side of the acoustic signal AC2-1 and the acoustic signal AC1-1, and the magnitude of the low-frequency side of the acoustic signal AC2-2 and the acoustic signal AC1-2 may be reduced more than the magnitude of the low-frequency side of the acoustic signal AC2-1 and the acoustic signal AC1-1. For example, the driver unit 11-2 may output the acoustic signal AC2-2 and the acoustic signal AC1-2 in which a frequency band of the frequency $f_{32}$ or lower and a frequency band of the frequency $f_{31}$ or higher are reduced (for example, acoustic signal AC2-2 and acoustic signal AC1-2 including only signals in a frequency band between the frequency $f_{32}$ and the frequency $f_{31}$).

Hereinafter, a configuration example 3 of the circuit unit 31 that implements these will be exemplified.

Figure 30C:
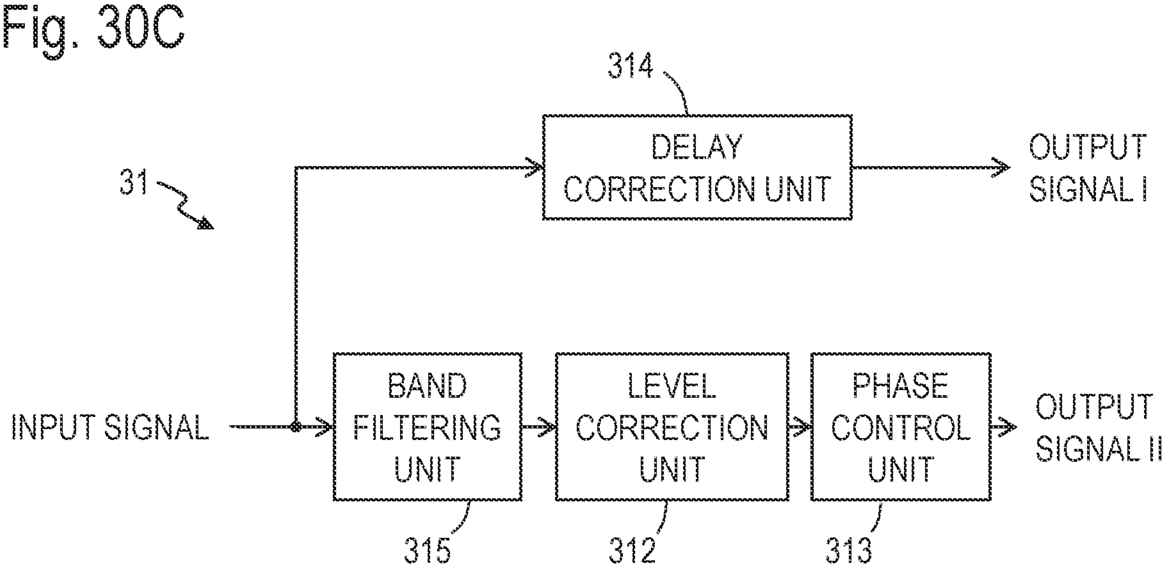

The circuit unit 31 illustrated in FIG. 30C includes the level correction unit 312, the phase control unit 313, the delay correction unit 314, and a band filtering unit 315. An input signal input to the circuit unit 31 is input to the band filtering unit 315 and the delay correction unit 314. The band filtering unit 315 obtains and outputs a band-restricted signal in which the band of the input signal is restricted (narrowed). In a case of the above-described example 31-1, a signal obtained by reducing the high-frequency side (for example, frequency band of the frequency $f_{31}$ or higher) of the input signal is output as the band-restricted signal. In a case of the above-described example 31-2, a signal obtained by reducing the low-frequency side (for example, frequency band of the frequency $f_{32}$ or lower) of the input signal is output as the band-restricted signal. In a case of the above-described example 31-3, a signal obtained by reducing the high-frequency side (for example, frequency band of the frequency $f_{31}$ or higher) and the low-frequency side (for example, frequency band of the frequency $f_{32}$ or lower) of the input signal is output as the band-restricted signal.

The band-restricted signal is input to the level correction unit 312. The level correction unit 312 adjusts the level of each band of the band-restricted signal and outputs a band-level adjusted signal obtained by the adjustment. The band-level adjusted signal output from the level correction unit 312 is input to the phase control unit 313. The phase control unit 313 generates an antiphase signal of the band-level adjusted signal or an approximate signal of the antiphase signal, and outputs the signal as the output signal II. The output signal II is supplied to the driver unit 11-2. The delay correction unit 314 outputs the output signal I obtained by adjusting the delay amount of the input signal.

Use State

Figure 31:
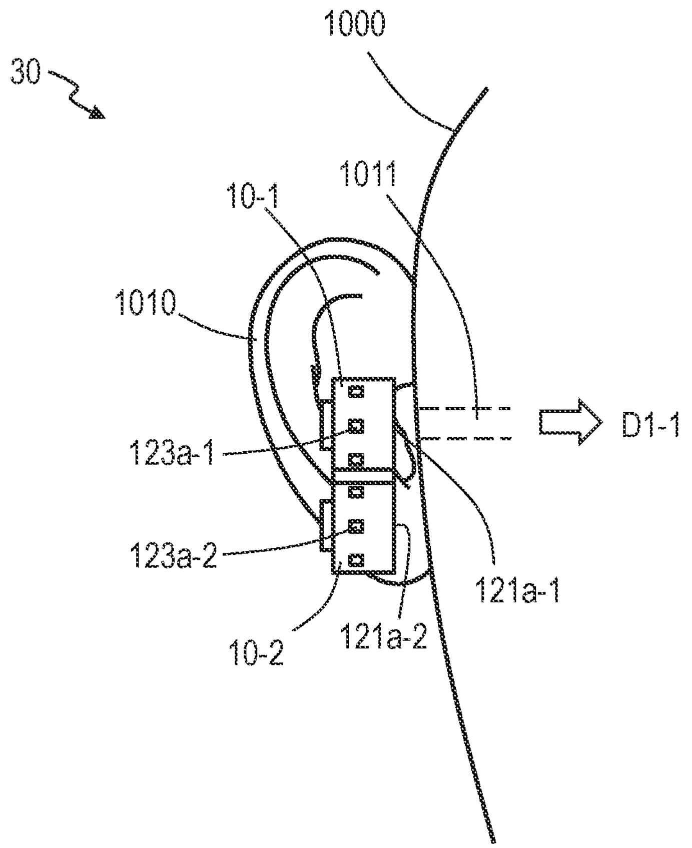
FIG. 31 is a view for illustrating a use state of the acoustic signal output device according to the third embodiment.

A use state of the acoustic signal output device 30 will be exemplified with reference to FIG. 31. One acoustic signal output device 30 is worn on each of the right ear 1010 and the left ear (not illustrated) of the user 1000 of FIG. 31. The D1 direction side of the acoustic signal output device 10-1 of each acoustic signal output device 30 is directed to the ear canal 1011 side of the user 1000. The acoustic signal output device 10-2 is arranged at a position deviated from the ear canal 1011. For example, when the acoustic signal output device 30 is worn on the ear, the sound hole 121*a*-1 (first sound hole) is arranged toward the ear canal 1011, and the sound holes 123*a*-1 (second sound holes), the sound holes 123*a*-2 (third sound holes), and the sound hole 121*a*-2 (fourth sound hole) are arranged in directions directing other than the ear canal 1011. Any wearing mechanism is used for wearing the acoustic signal output device 30 on the ear. The acoustic signal AC1-1 (first acoustic signal) emitted from the sound hole 121*a*-1 (first sound hole) of the acoustic signal output device 10-1 is heard by the user 1000. On the other hand, a part of the acoustic signal AC2-1 (second acoustic signal) emitted from the sound holes 123*a*-1 (second sound holes) cancels out a part of the acoustic signal AC1-1 (first acoustic signal) emitted from the sound hole 121*a*-1 (first sound hole). A part of the acoustic signal AC2-2 (third acoustic signal) emitted from the sound holes 123*a*-2 (third sound holes) cancels out a part of the acoustic signal AC1-2 (fourth acoustic signal) emitted from the sound hole 121*a*-2 (fourth sound hole). A part of the acoustic signal AC2-2 (third acoustic signal) emitted from the sound holes 123*a*-2 (third sound holes) cancels out a part of the acoustic signal AC2-1 (second acoustic signal) emitted from the sound holes 123*a*-1 (second sound holes). A part of the acoustic signal AC1-2 (fourth acoustic signal) emitted from the sound hole 121*a*-2 (fourth sound hole) cancels out a part of the acoustic signal AC1-1 (first acoustic signal) emitted from the sound hole 121*a*-1 (first sound hole). That is, in the present embodiment, the acoustic signal AC1-1 (first acoustic signal) is emitted from the sound hole 121*a*-1 (first sound hole), the acoustic signal AC2-1 (second acoustic signal) is emitted from the sound holes 123*a*-1 (second sound holes), the acoustic signal AC2-2 (third acoustic signal) is emitted from the sound holes 123*a*-2 (third sound holes), and the acoustic signal AC1-2 (fourth acoustic signal) is emitted from the sound hole 121$a$-2 (fourth sound hole). In this case, an attenuation rate $\eta_{11}$ of the acoustic signal AC1-1 (first acoustic signal) at a position P2 (second point) with reference to a position P1 (first point) is equal to or less than a predetermined value $\eta_{th}$ smaller than an attenuation rate $\eta_{21}$ due to air propagation of an acoustic signal at the position P2 (second point) with reference to the position P1 (first point). Alternatively, in this case, an attenuation amount $\eta_{12}$ of the acoustic signal AC1-1 (first acoustic signal) at the position P2 (second point) with reference to the position P1 (first point) is equal to or larger than a predetermined value $\omega_{th}$ larger than an attenuation amount $\eta_{22}$ due to air propagation of an acoustic signal at the position P2 (second point) with reference to the position P1 (first point). Note that the position P1 (first point) in the present embodiment is a predetermined point at which the acoustic signal AC1-1 (first acoustic signal) emitted from the sound hole 121$a$-1 (first sound hole) reaches. On the other hand, the position P2 (second point) in the present embodiment is a predetermined point at which the distance from the acoustic signal output device 30 is longer than the position P1 (first point). As described above, the sound leakage component from the acoustic signal output device 30 is canceled out. Particularly in the present embodiment, since the relative level of the driver unit 11-1 with respect to the driver unit 11-2 can be controlled, sound leakage can be further reduced as compared with a case of using one driver unit 11 as in the first embodiment.

As described in the configuration example 3 of the circuit unit 31, in a case where the user listens to the acoustic signal AC1 emitted from the sound hole 121$a$-1 of the acoustic signal output device 10-1, a sufficient sound leakage reduction effect can be expected by the frequency band of an acoustic signal emitted from the acoustic signal output device 10-2 being restricted more than the frequency band of the acoustic signal emitted from the acoustic signal output device 10-1. For example, as in the example 31-1, in a case where the magnitude of the high-frequency side (for example, high-frequency side on which sound leakage is difficult to be reduced by canceling out) of the acoustic signal AC2-2 and the acoustic signal AC1-2 is reduced more than the magnitude of the high-frequency side of the acoustic signal AC2-1 and the acoustic signal AC1-1, sound leakage can be prevented from being rather promoted on the high-frequency side. For example, as in the example 31-2, even if the magnitude of the low-frequency side of the acoustic signal AC2-2 and the acoustic signal AC1-2 is reduced more than the magnitude of the low-frequency side of the acoustic signal AC2-1 and the acoustic signal AC1-1, the influence of sound leakage is small in applications such as earphones in which the level of the low frequency sound range is weak. Even if the driver unit 11-2 is smaller than the driver unit 11-1 or has lower performance, a sufficient sound leakage reduction effect can be expected.

Modification 1 of Third Embodiment

Figure 32A:
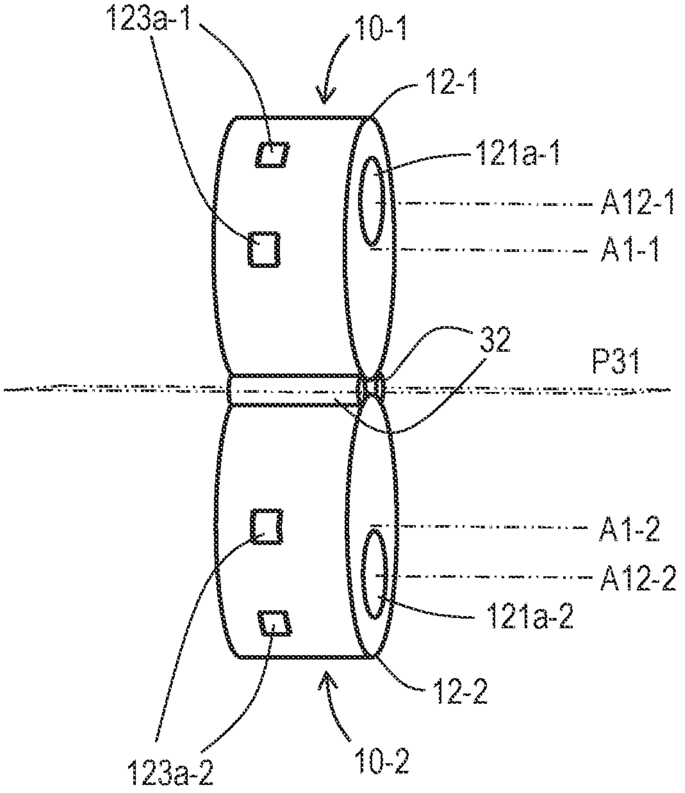
FIG. 32A is a perspective view illustrating a modification of the acoustic signal output device according to the third embodiment.
Figure 32B:
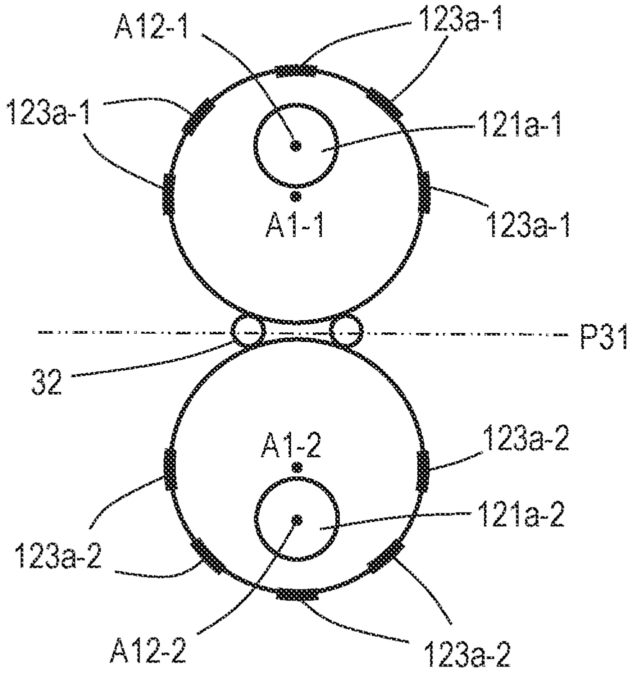
FIG. 32B is a conceptual view for illustrating a modification of the arrangement of sound holes.

The acoustic signal output devices 10-1, 2 may be the acoustic signal output device 10 described in the modifications of the first embodiment. For example, as illustrated in FIG. 32A, the position of the sound hole 121$a$-1 (first sound hole) may be biased to a first eccentric position deviated from the axis A1-1 (first center axis) passing through the center region of the housing 12-1 (first housing portion) and extending in the direction D1-1 (first direction) (the first eccentric position is a position on an axis A12-1 parallel to the axis A1-1 deviated from the axis A1-1). As illustrated in FIG. 32B, in a case where the circumference C1-1 (first circumference) is equally divided into a plurality of first unit arc regions, the sum of the opening areas of sound holes 123$a$-1 (second sound holes) provided along the first arc region that is one of the first unit arc regions may be smaller than the sum of the opening areas of sound holes 123$a$-1 (second sound holes) provided along the second arc region that is one of the first unit arc regions closer to the first eccentric position than the first arc region. Similarly, for example, the position of the sound hole 121$a$-2 (fourth sound hole) may be biased to a fourth eccentric position deviated from the axis A1-2 (second center axis) passing through the center region of the housing 12-2 (second housing portion) and extending in the direction D1-2 (fourth direction) (the fourth eccentric position is a position on an axis A12-2 parallel to the axis A1-2 deviated from the axis A1-2). As illustrated in FIG. 32B, in a case where the circumference C1-2 (fourth circumference) is equally divided into a plurality of second unit arc regions, the sum of the opening area of a sound hole 123$a$-2 (third sound hole) provided along the third arc region that is one of the second unit arc regions may be smaller than the sum of the opening area of a sound hole 123$a$-2 (third sound hole) provided along the fourth arc region that is one of the second unit arc regions closer to the fourth eccentric position than the third arc region. Even in such a case, preferably, the sound hole 121$a$-1 (first sound hole) and the sound hole 121$a$-2 (fourth sound hole) are desirably plane-symmetric or substantially plane-symmetric with respect to the reference plane P31 including a straight line parallel or substantially parallel to the straight line (axis A1-1) extending in the direction D1-1 (first direction). Similarly, the sound holes 123$a$-1 (second sound holes) and the sound holes 123$a$-2 (third sound holes) are desirably plane-symmetric or substantially plane-symmetric with respect to the reference plane P31. More preferably, the housing 12-1 (first housing portion) and the housing 12-2 (second housing portion) are desirably plane-symmetric or substantially plane-symmetric with respect to the reference plane P31. The sound absorbing material described in the modifications of the first embodiment may be provided in at least one of the acoustic signal output devices 10-1, 2.

Modification 2 of Third Embodiment

Figure 33A:
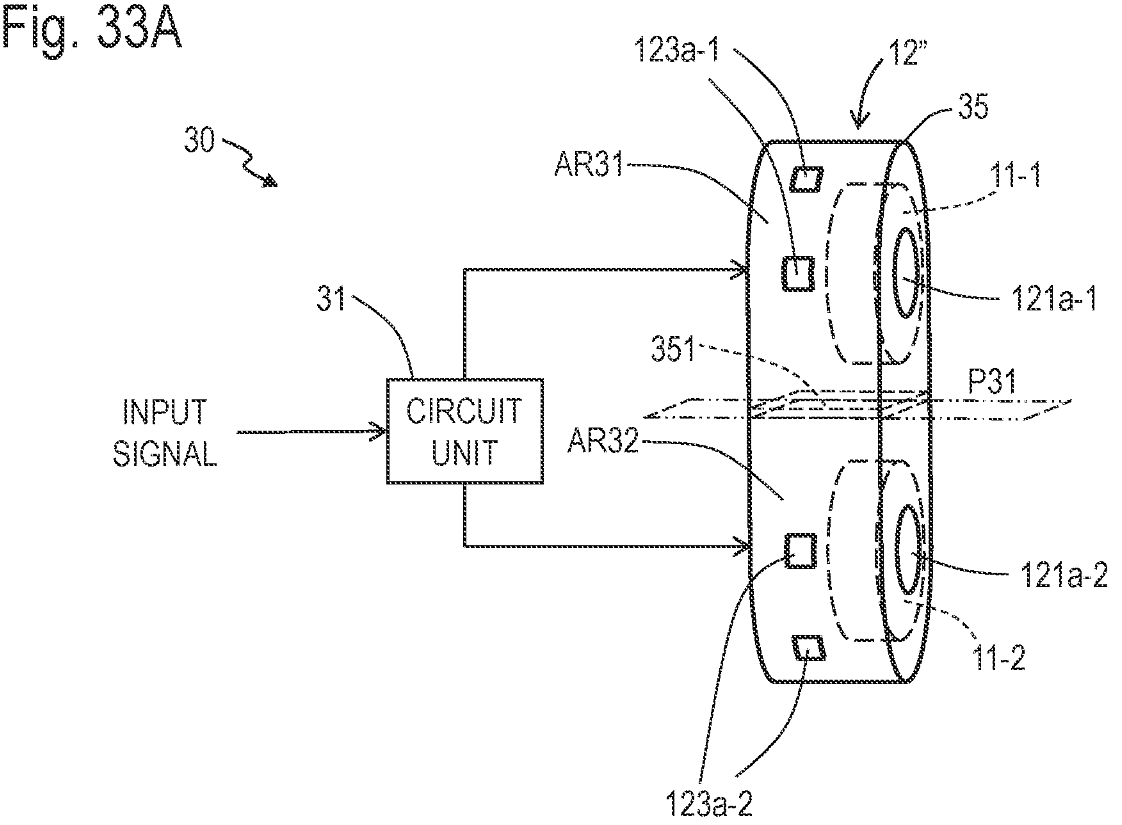
FIG. 33A is a transparent perspective view illustrating a modification of the acoustic signal output device according to the third embodiment.

In the third embodiment, the housing 12-1 (first housing portion) of the acoustic signal output device 10-1 and the housing 12-2 (second housing portion) of the acoustic signal output device 10-2 may be integrated. For example, as illustrated in FIG. 33A, the housing 12-1 of the acoustic signal output device 10-1 and the housing 12-2 of the acoustic signal output device 10-2 may be replaced by an integrated housing 12", a region AR31 in which the driver unit 11-1 is housed and a region AR32 in which the driver unit 11-2 is housed may be partitioned by a wall portion 351 provided inside the housing 12", and the region AR 31 may be separated from the region AR32. Note that, in a case where the region AR31 and the region AR32 are partitioned by the wall portion 351, a part of the acoustic signal AC1-1 and a part of the acoustic signal AC1-2 can be prevented from being canceled out by each other and a part of the acoustic signal AC2-1 and a part of the acoustic signal AC2-2 can be prevented from being canceled out by each other inside the housing 12". Therefore, the region AR31 and the are AR32 are desirably partitioned by the wall portion 351. However, the region AR31 and the region AR32 may not be partitioned by the wall portion 351. That is, a part of the acoustic signals AC1-1, AC2-1 emitted from the driver unit 11-1 may not be emitted from any of the sound holes 121*a*-1, 123*a*-1, 121*a*-2, 123*a*-2 and may be canceled out by a part of the acoustic signals AC1-2, AC2-2 emitted from the driver unit 11-2 inside the housing 12". Even in this case, components of the acoustic signals AC1-1, AC2-1, AC1-2, AC2-2 that are not canceled out inside the housing 12" are emitted to the outside from any of one the sound holes 121*a*-1, 123*a*-1, 121*a*-2, 123*a*-2. For example, components of the acoustic signals AC1-1, AC2-1 emitted from the driver unit 11-1 that are not canceled out inside the housing 12" are emitted to the outside from any one of 121*a*-1, 123*a*-1, 121*a*-2, 123*a*-2. It goes without saying that they are canceled out by a part of components of other acoustic signals emitted from any one of the driver units 11-1, 2 and emitted to the outside from any one of the sound holes 121*a*-1, 123*a*-1, 121*a*-2, 123*a*-2. Therefore, even in such a case, a sound leakage reduction effect can be obtained. Even in a case where the housing 12-1 and the housing 12-2 are integrated as the housing 12", the sound hole 121*a*-1 (first sound hole) and the sound hole 121*a*-2 (fourth sound hole) are desirably plane-symmetric or substantially plane-symmetric with respect to the reference plane P31. Similarly, the sound holes 123*a*-1 (second sound holes) and the sound holes 123*a*-2 (third sound holes) are desirably plane-symmetric or substantially plane-symmetric with respect to the reference plane P31. More preferably, the housing 12-1 (first housing portion) and the housing 12-2 (second housing portion) are desirably plane-symmetric or substantially plane-symmetric with respect to the reference plane P31. The sound absorbing material described in the modifications of the first embodiment may be provided inside the housing 12" or in any of the sound holes 121*a*-1, 121*a*-2, 123*a*-1, 123*a*-2. The other aspects are the same as those of the third embodiment or Modification 1 thereof.

Modification 3 of Third Embodiment

Figure 33B:
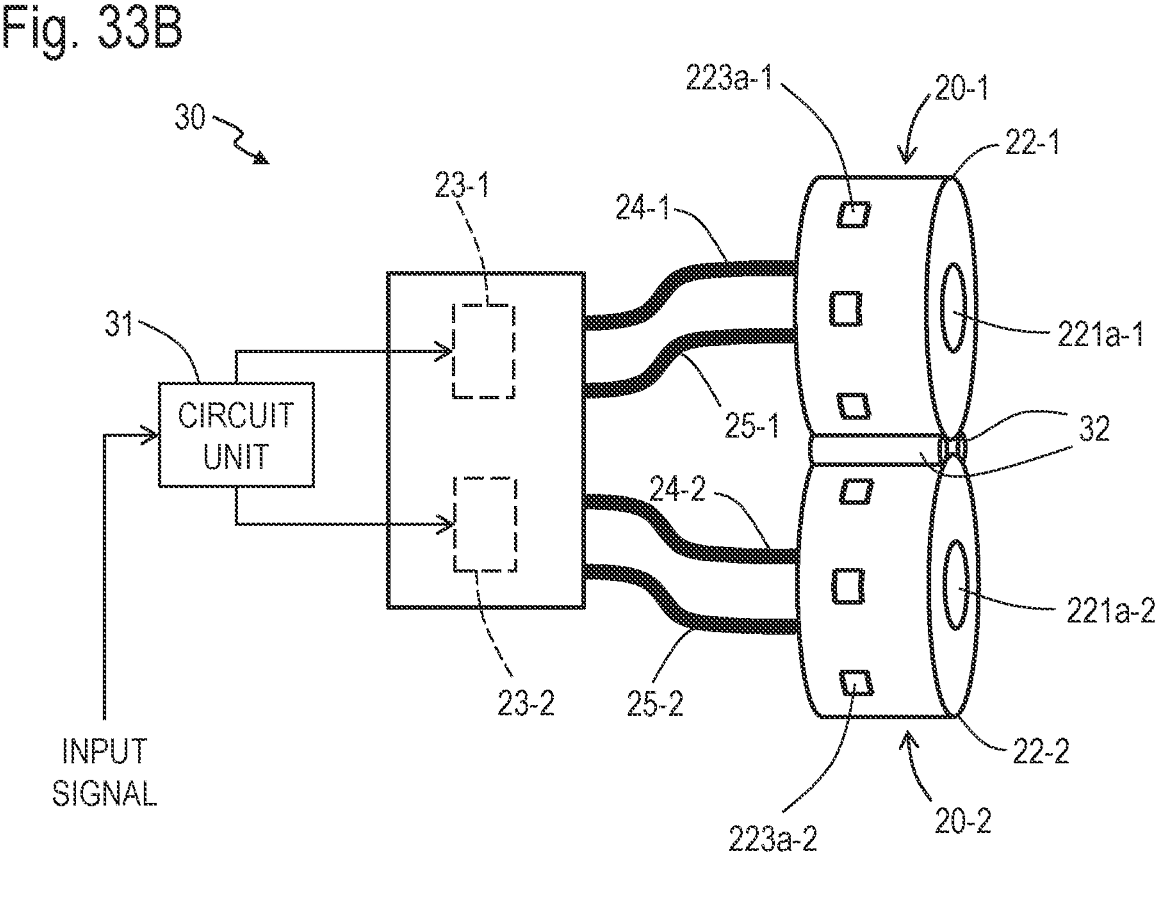
FIG. 33B is a view illustrating the modification of the acoustic signal output device according to the third embodiment.

Instead of the acoustic signal output devices 10-1, 2 of the third embodiment, acoustic signal output devices 20-1, 2 having the same configuration as the acoustic signal output device 20 of the second embodiment may be used. For example, as illustrated in FIG. 33B, a housing 22-1 and a housing 22-2 of the acoustic signal output devices 20-1, 2 may be joined by the coupling portion 32, and as described in the second embodiment, the housing 22-1 and a housing 23-1 may be connected by waveguides 24-1, 25-1, and the housing 22-2 and a housing 23-2 may be connected by waveguides 24-2, 25-2. The circuit unit 31 supplies the output signal I to the driver unit 11-1 housed in the housing 23-1, and supplies the output signal II to the driver unit 11-2 housed in the housing 23-2. As described in the second embodiment, the acoustic signal AC1-1 sent from the housing 23-1 to the housing 22-1 by the waveguides 24-1, 25-1 is emitted from a sound hole 221*a*-1, and the acoustic signal AC2-1 is emitted from sound holes 223*a*-1. Similarly, the acoustic signal AC1-2 sent from the housing 23-2 to the housing 22-2 by the waveguides 24-2, 25-2 is emitted from a sound hole 221*a*-2, and the acoustic signal AC2-2 is emitted from sound holes 223*a*-2. Other matters are the same as those in the third embodiment or Modifications 1 and 2 thereof except that the housings 12-1, 12-2, the sound holes 121*a*-1, 121*a*-2, 123*a*-1, 123*a*-2, and the wall portions 121-1, 121-2, 122-1, 122-2, 123-1, 123-2 are replaced with the housings 22-1, 22-2, the sound holes 221*a*-1, 221*a*-2, 223*a*-1, 223*a*-2, and wall portions 221-1, 221-2, 222-1, 222-2, 223-1, 223-2. Further, the housing 23-1 may be connected to the housing 22-1 by the waveguides 24-1, 25-1, and may be connected to the housing 23-1 by the waveguides 24-2, 25-2. In this case, the circuit unit 31 supplies the output signal I to the driver unit 11-1 housed in the housing 23-1. The acoustic signal AC1-1 sent from the housing 23-1 to the housing 22-1 by the waveguides 24-1, 25-1 is emitted from the sound hole 221*a*-1, and the acoustic signal AC2-1 is emitted from the sound holes 223*a*-1. Similarly, the acoustic signal AC1-2 sent from the housing 23-1 to the housing 22-2 by the waveguides 24-2, 25-2 is emitted from the sound hole 221*a*-2, and the acoustic signal AC2-2 is emitted from the sound holes 223*a*-2. The housing 23-1 may be connected to κ housings 22-κ by waveguides 24-κ, 25-κ. Provided that $\kappa=1, \ldots, \kappa_{max}$, and $\kappa_{max}$ is an integer of 2 or more. In this case, the circuit unit 31 supplies the output signal I to the driver unit 11-1 housed in the housing 23-1. An acoustic signal AC1-κ sent from the housing 23-1 to a housing 22-κ by the waveguides 24-κ, 25-κ is emitted from a sound hole 221*a*-κ, and an acoustic signal AC2-κ is emitted from sound holes 223*a*-κ. In such a case, the housing 23-2 and the driver unit 11-2 may be omitted, and the circuit unit 31 may not output the output signal II. Alternatively, the housing 23-2 and the driver unit 11-2 may not be omitted, and the housing 23-2 may be connected to still another housing 22-γ by waveguides 24-γ, 25-γ. Provided that $\gamma=\kappa_{max}+1, \ldots, \gamma_{max}$, and $\gamma_{max}$ is an integer larger than $\kappa_{max}$. In this case, the output signal II output from the circuit unit 31 is further supplied to the driver unit 11-2 housed in the housing 22-2, an acoustic signal AC1-γ sent from the housing 23-2 to the housing 22-γ by the waveguides 24-γ, 25-γ is emitted from a sound hole 221*a*-γ, and an acoustic signal AC2-γ is emitted from sound holes 223*a*-γ. That is, the acoustic signal AC1-1 (first acoustic signal) emitted from any one of a single or a plurality of driver units is required to be emitted to the outside from the sound hole 221*a*-1 (first sound hole). The acoustic signal AC2-1 (second acoustic signal) emitted from any one of the single or the plurality of driver units is required to be emitted to the outside from the sound holes 123*a*-1 (second sound holes). The acoustic signal AC2-2 (third acoustic signal) emitted from any one of the single or the plurality of driver units is required to be emitted from the sound holes 123*a*-2 (third sound holes). The acoustic signal AC1-2 (fourth acoustic signal) emitted from any one of the single or the plurality of driver units is required to be emitted to the outside from the sound hole 221*a*-2 (fourth sound hole). That is, the acoustic signal AC1-1 (first acoustic signal) and the acoustic signal AC2-2 (third acoustic signal) may be the same signals emitted from the same driver unit, or they may be different signals emitted from different driver units. Similarly, the acoustic signal AC2-1 (second acoustic signal) and the acoustic signal AC1-2 (fourth acoustic signal) may be the same signals emitted from the same driver unit, or they may be different signals emitted from different driver units.

Fourth Embodiment

In the fourth embodiment, an example is described in which an acoustic signal output device worn on both ears without sealing the ear canals of the user emits monophonic acoustic signals having phases inverted from each other toward the left and right ears. A part of the monophonic acoustic signals is emitted from such an acoustic signal output device not only toward the ear canals of the user but also outward of the user. However, since the monophonic acoustic signals having phases inverted from each other are emitted, the monophonic acoustic signals propagating outward of the user cancel out each other, and sound leakage is reduced.

Figure 34A:
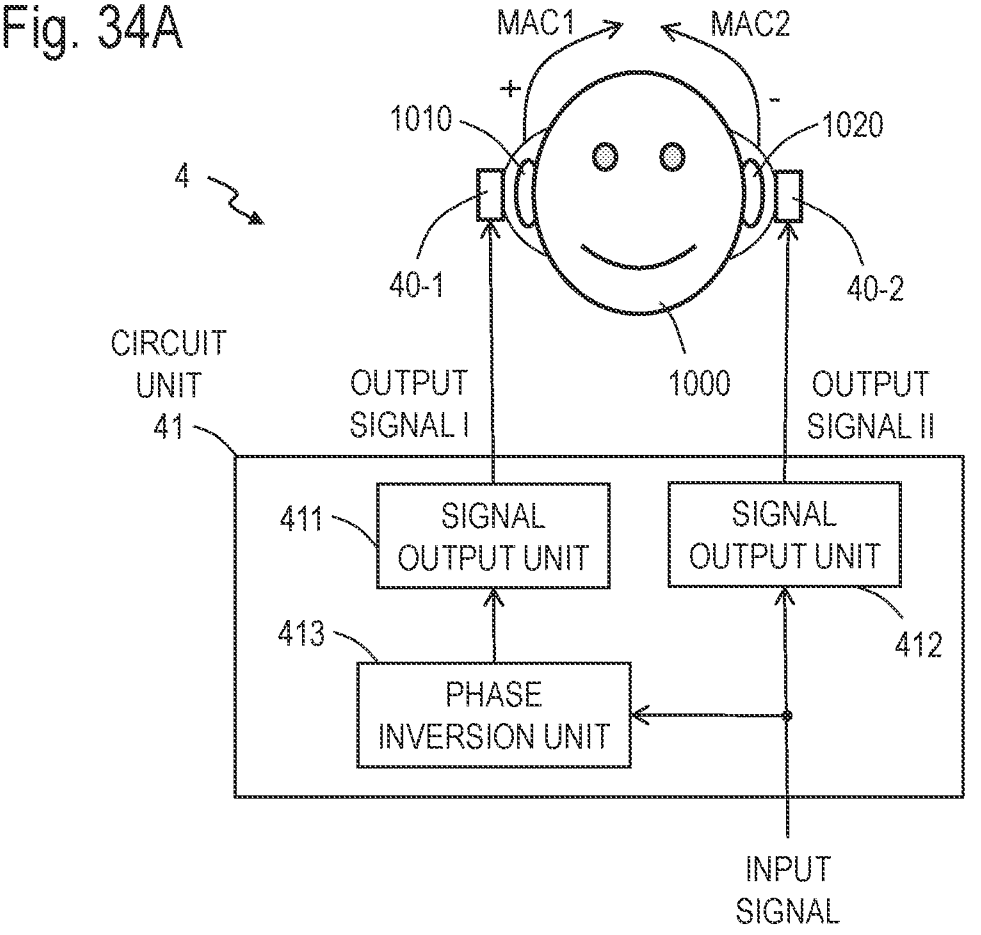
FIG. 34A is a view for illustrating a configuration of an acoustic signal output device according to a fourth embodiment.

As illustrated in FIG. 34A, an acoustic signal output device 4 of the present embodiment includes an acoustic signal output unit 40-1 (first acoustic signal output unit) worn on the right ear (one ear) 1010 of the user 1000, an acoustic signal output unit 40-2 (second acoustic signal output unit) worn on the left ear (other ear) 1020, and a circuit unit 41.

Circuit Unit 41

The circuit unit 41 is a circuit that uses an input signal that is an electrical signal representing a monophonic acoustic signal as an input, generates and outputs an output signal I to be supplied to the acoustic signal output unit 40-1 and an output signal II to be supplied to the acoustic signal output unit 40-2. The circuit unit 41 of the present embodiment includes signal output units 411, 412 and a phase inversion unit 413. The input signal is input to the phase inversion unit 413 and the signal output unit 412. The phase inversion unit 413 outputs an output signal I (first output signal) that is an antiphase signal of the input signal or an approximate signal of the antiphase signal. The signal output unit 411 (first signal output unit) outputs the output signal I (first output signal) to the acoustic signal output unit 40-1 (first acoustic signal output unit). That is, the signal output unit 411 (first signal output unit) outputs the output signal I (first output signal) for outputting a monophonic acoustic signal MAC1 (first monophonic acoustic signal) from the acoustic signal output unit 40-1 (first acoustic signal output unit) worn on the right ear (one ear) 1010. The signal output unit 412 outputs the input signal as it is to the acoustic signal output unit 40-2 (second acoustic signal output unit) as the output signal II (second output signal). That is, the signal output unit 412 outputs the output signal II (second output signal) for outputting a monophonic acoustic signal MAC2 (second monophonic acoustic signal) from the acoustic signal output unit 40-2 (second acoustic signal output unit) worn on the left ear (other ear) 1020.

Acoustic Signal Output Units 40-1, 40-2

The acoustic signal output units 40-1, 40-2 are devices for acoustic listening that are worn on both ears without sealing the ear canals of the user. The output signal I is input to the acoustic signal output unit 40-1, and the acoustic signal output unit 40-1 converts the output signal I into the monophonic acoustic signal MAC1 (the phase same as or substantially the same as the phase of the monophonic acoustic signal MAC1 is expressed as "+") and emits the signal toward the ear canal of the right ear 1010. The output signal II is input to the acoustic signal output unit 40-2, and the acoustic signal output unit 40-2 converts the output signal II into the monophonic acoustic signal MAC2 (the phase same as or substantially the same as the phase of the monophonic acoustic signal MAC2 is expressed as "−") and emits the signal toward the ear canal of the left ear 1020. Here, the monophonic acoustic signal MAC2 is an antiphase signal of the monophonic acoustic signal MAC1 or an approximate signal of the antiphase signal of the monophonic acoustic signal MAC1. However, even if the phases of acoustic signals captured by the left and right ears are inverted from each other, a listening issue hardly occurs. A part of the emitted monophonic acoustic signal MAC1 and monophonic acoustic signal MAC2 is also emitted to the outside of both ears, but since the monophonic acoustic signal MAC1 and the monophonic acoustic signal MAC2 are in opposite phase or substantially opposite phase to each other, they cancel each other out. That is, a part of the emitted monophonic acoustic signal MAC1 (first monophonic acoustic signal) and the emitted monophonic acoustic signal MAC2 (part of the second monophonic acoustic signal) are canceled out by interfering with each other on the outer side (outer side of the user 1000, that is, opposite side of the right ear 1010) of the acoustic signal output unit 40-1 (first acoustic signal output unit) worn on the right ear 1010 (one ear) and/or on the outer side (outer side of the user 1000, that is, opposite side of the left ear 1020) of the acoustic signal output unit 40-2 (second acoustic signal output unit) worn on the left ear 1020 (other ear). That is, as described above, the monophonic acoustic signal MAC1 (first monophonic acoustic signal) is output from the acoustic signal output unit 40-1 (first acoustic signal output unit), and the monophonic acoustic signal MAC2 (second monophonic acoustic signal) is output from the acoustic signal output unit 40-2 (second acoustic signal output unit). In this case, an attenuation rate $\eta_{11}$ of the monophonic acoustic signal MAC1 (first monophonic acoustic signal) at a position P2 (second point) with reference to a position P1 (first point) is equal to or less than a predetermined value $\eta_{th}$ smaller than an attenuation rate $\eta_{21}$ due to air propagation of an acoustic signal at the position P2 (second point) with reference to the position P1 (first point). Alternatively, in this case, an attenuation amount $\eta_{12}$ of the first monophonic acoustic signal at the position P2 (second point) with reference to the position P1 (first point) is equal to or larger than a predetermined value $\omega_{th}$ larger than an attenuation amount $\eta_{22}$ due to air propagation of an acoustic signal at the position P2 (second point) with reference to the position P1 (first point). Provided that the position P1 (first point) in the present embodiment is a predetermined position at which the monophonic acoustic signal MAC1 (first monophonic acoustic signal) reaches. The position P2 (second point) of the present embodiment is a position farther from the acoustic signal output unit 40-1 (first acoustic signal output unit) than the position P1 (first point). As a result, sound leakage is reduced.

Modification 1 of Fourth Embodiment

Acoustic signal output devices 10 of the first embodiment or the modifications thereof may be used instead of the acoustic signal output units 40-1, 40-2, or acoustic signal output devices 20 of the second embodiment or the modifications thereof may be used.

Figure 34B:
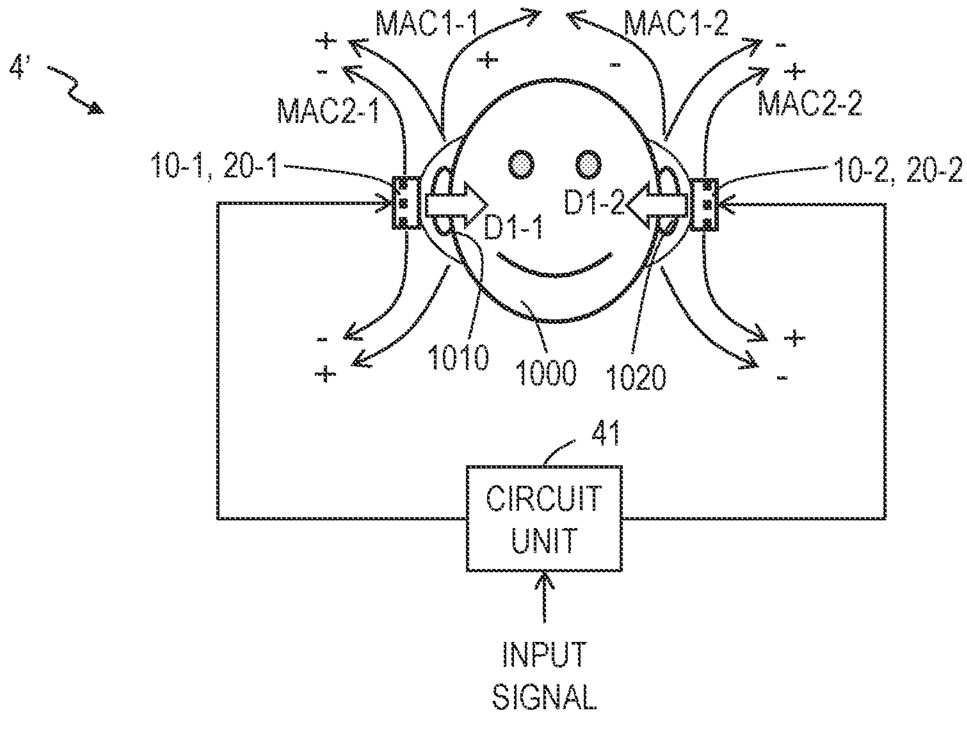
FIG. 34B is a view for illustrating a modification of the acoustic signal output device according to the fourth embodiment.

As illustrated in FIG. 34B, an acoustic signal output device 4' of this modification includes the acoustic signal output device 10-1 (first acoustic signal output unit) worn on the right ear (one ear) 1010 of the user 1000, the acoustic signal output device 10-2 (second acoustic signal output unit) worn on the left ear (other ear) 1020, and the circuit unit 41, or includes the acoustic signal output device 20-1 (first acoustic signal output unit) worn on the right ear (one ear) 1010 of the user 1000, the acoustic signal output device 20-2 (second acoustic signal output unit) worn on the left ear (other ear) 1020, and the circuit unit 41.

The acoustic signal output device 10-1 or 20-1 (first acoustic signal output unit) includes a driver unit 11-1 (first driver unit) that emits a monophonic acoustic signal MAC1-1 (first acoustic signal, first monophonic acoustic signal) in a D1-1 direction (one side) and emits a monophonic acoustic signal MAC2-1 (second acoustic signal) that is an antiphase signal of the monophonic acoustic signal MAC1-1 or an approximate signal of the antiphase signal of the monophonic acoustic signal MAC1-1 to the other side in the D1-1 direction, and a housing 12-1 or 22-1 (first housing) in which a single or plurality of sound holes 121*a*-1 or 221*a*-1 (first sound holes) for leading out the monophonic acoustic signal MAC1-1 (first acoustic signal) emitted from the driver unit 11-1 to the outside and a single or a plurality of sound holes 123*a*-1 or 223*a*-1 (second sound holes) for leading out the monophonic acoustic signal MAC2-1 (second acoustic signal) emitted from the driver unit 11-1 to the outside are provided in the wall portion.

The acoustic signal output device 10-2 or 20-2 (second acoustic signal output unit) includes a driver unit 11-2 (second driver unit) that emits a monophonic acoustic signal MAC1-2 (fourth acoustic signal, second monophonic acoustic signal) that is the same as or approximate to the monophonic acoustic signal MAC2-1 (second acoustic signal) in a D1-2 direction (one side) and emits a monophonic acoustic signal MAC2-2 (third acoustic signal) that is the same as or approximate to the monophonic acoustic signal MAC1-1 (first acoustic signal) to the other side in the D1-2 direction, and housing 12-2, 22-2 (second housing) in which a single or plurality of sound holes 123*a*-2 or 223*a*-2 (third sound holes) for leading out the monophonic acoustic signal MAC2-2 (third acoustic signal) emitted from the driver unit 11-2 to the outside and a single or a plurality of sound holes 121*a*-2 or 221*a*-2 (fourth sound holes) for leading out the monophonic acoustic signal MAC1-2 (fourth acoustic signal) emitted from the driver unit 11-2 to the outside are provided in the wall portion.

In the present modification, the acoustic signal AC1-1 (first acoustic signal) is the monophonic acoustic signal MAC1-1 (first monophonic acoustic signal), the acoustic signal AC2-1 is the monophonic acoustic signal MAC2-1, the acoustic signal AC1-2 (fourth acoustic signal) is the monophonic acoustic signal MAC1-2 (second monophonic acoustic signal), and the acoustic signal AC2-2 is the monophonic acoustic signal MAC2-2. The other detailed configurations of the acoustic signal output devices 10-1, 10-2 are the same as those of the acoustic signal output device 10 of the first embodiment or the modifications thereof. The detailed configurations of the acoustic signal output devices 20-1, 20-2 are the same as those of the acoustic signal output device 20 of the second embodiment or the modifications thereof.

When the acoustic signal output device 4' is worn on both ears, the sound hole 121*a*-1 or 221*a*-1 of the acoustic signal output device 10-1 or 20-1 is directed to the right ear 1010 (that is, the D1-1 direction is directed to the right ear 1010), and the sound hole 121*a*-2 or 221*a*-2 of the acoustic signal output device 10-2 or 20-2 is directed to the left ear 1020 (that is, the D1-2 direction is directed to the left ear 1020).

From the sound hole 121*a*-1 or 221*a*-1 of the acoustic signal output device 10-1 or 20-1 (first acoustic signal output unit), the monophonic acoustic signal MAC1-1 (first monophonic acoustic signal) is emitted toward the ear canal of the right ear 1010. From the sound hole 121*a*-2 or 221*a*-2 of the acoustic signal output device 10-2 or 20-2 (second acoustic signal output unit), the monophonic acoustic signal MAC1-2 (second monophonic acoustic signal) is emitted toward the ear canal of the left ear 1020. Here, the monophonic acoustic signal MAC1-2 is an antiphase signal of the monophonic acoustic signal MAC1-1 or an approximate signal of the antiphase signal of the monophonic acoustic signal MAC1-1. However, even if the phases of acoustic signals captured by the left and right ears are inverted from each other, a listening issue hardly occurs. A part of the emitted monophonic acoustic signal MAC1-1 and monophonic acoustic signal MAC1-2 is also emitted to the outside of both ears, but since the monophonic acoustic signal MAC1-1 and the monophonic acoustic signal MAC1-2 are in opposite phase or substantially opposite phase to each other, they cancel each other out. That is, a part of the emitted monophonic acoustic signal MAC1-1 (first monophonic acoustic signal) and the emitted monophonic acoustic signal MAC1-2 (part of the second monophonic acoustic signal) are canceled out by interfering with each other on the outer side (outer side of the user 1000, that is, opposite side of the right ear 1010) of the acoustic signal output device 10-1 or 20-1 (first acoustic signal output unit) worn on the right ear 1010 (one ear) and/or on the outer side (outer side of the user 1000, that is, opposite side of the left ear 1020) of the acoustic signal output device 10-2 or 20-2 (second acoustic signal output unit) worn on the left ear 1020 (other ear). Further, from the sound holes 123*a*-1 or 223*a*-1 of the acoustic signal output device 10-1 or 20-1 (first acoustic signal output unit), the monophonic acoustic signal MAC2-1 is emitted. A part of the emitted monophonic acoustic signal MAC2-1 cancels out a part of the monophonic acoustic signal MAC1-1 emitted from the sound hole 121*a*-1 or 221*a*-1. Further, from the sound holes 123*a*-2 or 223*a*-2 of the acoustic signal output device 10-2 or 20-2 (second acoustic signal output unit), the monophonic acoustic signal MAC2-2 is emitted. A part of the emitted monophonic acoustic signal MAC2-2 cancels out a part of the monophonic acoustic signal MAC1-2 emitted from the sound hole 121*a*-2 or 221*a*-2. As a result, sound leakage is reduced.

Modification 2 of Fourth Embodiment

The output signal I and the output signal II in the fourth embodiment or Modification 1 of the fourth embodiment may be reversed. That is, an input signal input to the circuit unit 41 may be input to the phase inversion unit 413 and the signal output unit 412, the phase inversion unit 413 may output the output signal II (second output signal) that is an antiphase signal of the input signal or an approximate signal of the antiphase signal to the acoustic signal output unit 40-2 (second acoustic signal output unit), and the signal output unit 412 may directly output the input signal as it is to the acoustic signal output unit 40-1 (first acoustic signal output unit) as the output signal I (first output signal).

Fifth Embodiment

In a fifth embodiment, wearing methods of an ear-worn acoustic signal output device will be exemplified. As described above, in the conventional wearing method, an issue such as a heavy burden on the ears and difficulty in stable wearing may occur. In the present embodiment, new wearing methods of an acoustic signal output device for solving such an issue will be exemplified.

Wearing Method 1

Figure 35A:
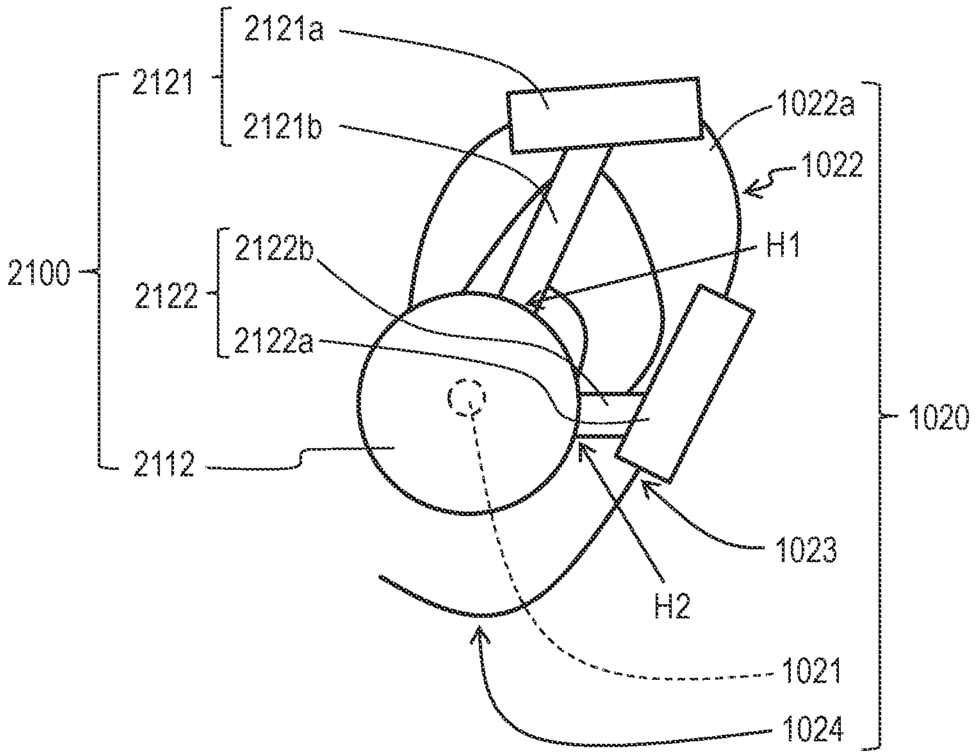
FIG. 35A is a transparent front view for illustrating a configuration of an acoustic signal output device according to a fifth embodiment.
Figure 35B:
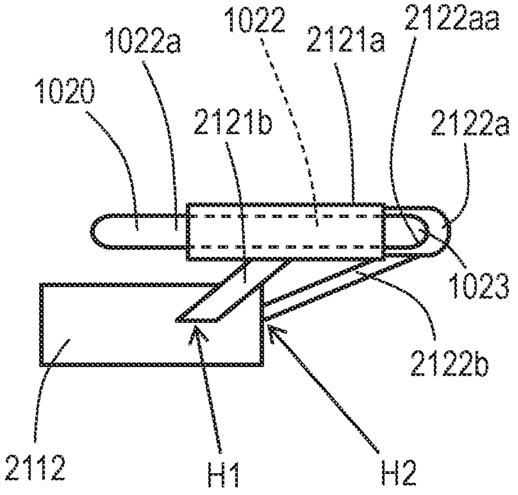
FIG. 35B is a transparent plan view for illustrating the configuration of the acoustic signal output device according to the fifth embodiment.
Figure 35C:
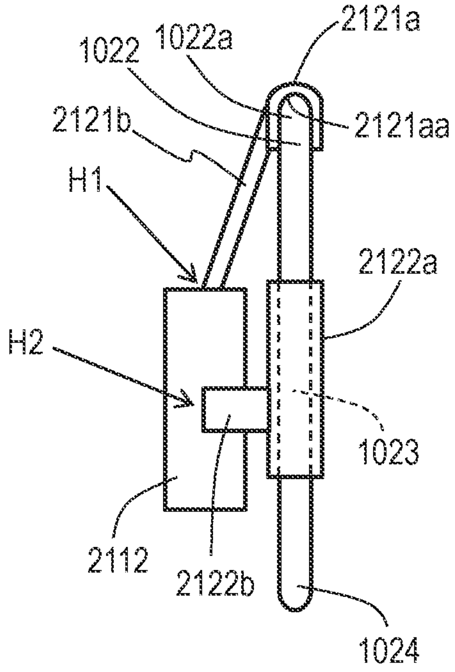
FIG. 35C is a transparent right side view for illustrating the configuration of the acoustic signal output device according to the fifth embodiment.
Figure 36A:
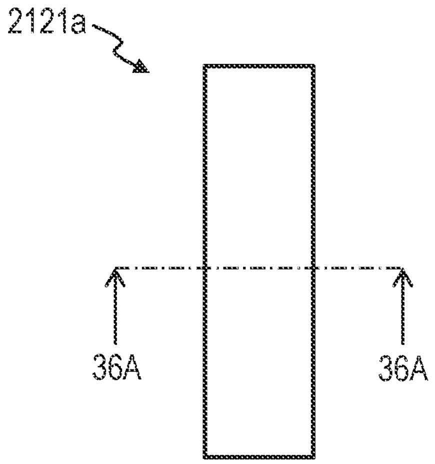
FIG. 36A is a plan view illustrating a fixing portion according to the fifth embodiment.
Figure 36B:
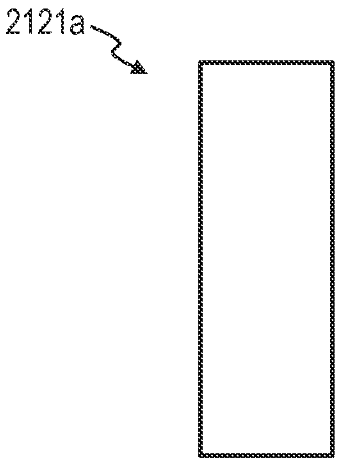
FIG. 36B is a right side view illustrating the fixing portion according to the fifth embodiment.
Figure 36C:
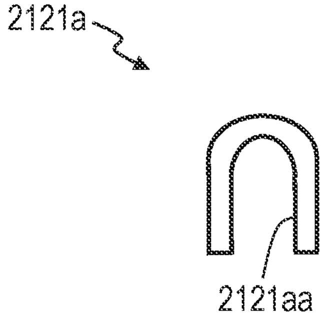
FIG. 36C is a front view illustrating the fixing portion according to the fifth embodiment.
Figure 36D:
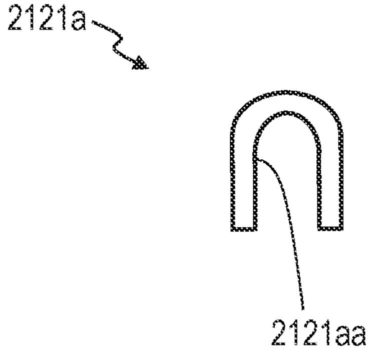
FIG. 36D is a cross-sectional view taken along line 36A-36A in FIG. 36A.

A wearing method 1 will be exemplified using FIGS. 35A to 36D. As illustrated in FIGS. 35A to 35C, an acoustic signal output device 2100 of the wearing method 1 includes a housing 2112 that emits an acoustic signal, a wearable portion 2121 (first wearable portion) that holds the housing 2112 and is configured to be worn on an upper portion 1022 (first auricle portion) of the auricle 1020 that is a part of the auricle 1020, and a wearable portion 2122 (second wearable portion) that holds the housing 2112 and is configured to be worn on an intermediate portion 1023 (second auricle portion) that is a part of the auricle 1020 different from the upper portion 1022 (first auricle portion) of the auricle 1020. Note that the intermediate portion 1023 is an intermediate portion between the upper portion 1022 (helix side) and a lower portion 1024 (ear lobe side) of the auricle 1020. In the present embodiment, an example is described in which the auricle 1020 is a human auricle, but the auricle 1020 may be an auricle of an animal other than a human (such as a chimpanzee).

The housing 2112 of this example may be any of the housings 12, 12", 22 exemplified in the first to fourth embodiments and the modifications thereof, or may be a housing of an acoustic signal output device that emits an acoustic signal such as a conventional earphone. When the acoustic signal output device 2100 is worn, the housing 2112 is arranged such that a sound hole 2112*a* is directed to the ear canal 1021 side and the ear canal 1021 is not blocked.

The wearable portion 2121 (first wearable portion) of this example includes a fixing portion 2121*a* (first fixing portion) that grips the helix 1022*a* (end portion) of the upper portion 1022 (first auricle portion) of the auricle 1020, and a support portion 2121*b* that fixes the fixing portion 2121*a* (first fixing portion) to the housing 2112. One end of the support portion 2121*b* holds a specific region of the wall portion outside the fixing portion 2121*a*, and the other end of the support portion 2121*b* holds a specific region H1 (first holding region) of the wall portion outside the housing 2112. One end of the support portion 2121*b* may be fixed to a specific region of the wall portion of the fixing portion 2121*a*, or may be integrated with the wall portion of the fixing portion 2121*a* at the specific region. Similarly, the other end of the support portion 2121*b* may be fixed to the specific region H1 of the wall portion outside the housing 2112, or may be integrated with the wall portion outside the housing 2112 at the specific region H1. As described above, the support portion 2121*b* holds the housing 2112 from the outer side (first outer side) of the specific region H1 of the wall portion of the housing 2112. In this example, when the fixing portion 2121*a* is worn on the helix 1022*a*, the outer side (first outer side) of the region H1 is the upper portion 1022 side of the auricle 1020. Here, the fixing portion 2121*a* (first fixing portion) is configured to grip the helix 1022*a* of the upper portion 1022 (first auricle portion) of the auricle 1020 from the upper side of the auricle 1020. The housing 2112 is configured to be suspended by the wearable portion 2121 (first wearable portion) including the fixing portion 2121*a* (first fixing portion) holding the helix 1022*a*. That is, the fixing portion 2121*a* grips the helix 1022*a* from the upper side of the auricle 1020, and the housing 2112 is suspended by the other end of the support portion 2121*b* holding the fixing portion 2121*a* at one end. The reaction force against the weight of the housing 2112 suspended in this manner is supported by the inner wall surface of the fixing portion 2121*a*. For example, the reaction force is supported by the inner wall surface of the fixing portion 2121*a* arranged perpendicular or substantially perpendicular to the reaction force direction. In such a configuration, the weight of the housing 2112 can be supported even in a case where the gripping force of the fixing portion 2121*a* is small. Since a load on the auricle 1020 is smaller as the gripping force of the fixing portion 2121*a* is smaller, a load on the ear can be reduced. Note that the fixing portion 2121*a* may have any specific shape. An example of the fixing portion 2121*a* is a member having a C-shaped or U-shaped hollow cross-sectional shape and configured to grip the helix 1022*a* in a state where the helix 1022*a* is in contact with an inner wall surface 2121*aa* (for example, FIGS. 36A to 36D). For example, the fixing portion 2121*a* having an ear cuff shape can be exemplified.

The wearable portion 2122 (second wearable portion) of this example includes a fixing portion 2122*a* (second fixing portion) that grips the end portion of the intermediate portion 1023 (second auricle portion) of the auricle 1020, and a support portion 2122*b* that fixes the fixing portion 2122*a* (second fixing portion) to the housing 2112. One end of the support portion 2122*b* holds a specific region of the wall portion outside the fixing portion 2122*a*, and the other end of the support portion 2122*b* holds a specific region H2 (second holding region) of the wall portion outside the housing 2112. The region H2 is different from the region H1 described above. One end of the support portion 2122*b* may be fixed to a specific region of the wall portion of the fixing portion 2122*a*, or may be integrated with the wall portion of the fixing portion 2122*a* at the specific region. Similarly, the other end of the support portion 2122*b* may be fixed to the specific region H2 of the wall portion outside the housing 2112, or may be integrated with the wall portion outside the housing 2112 at the specific region H2. As described above, the support portion 2122*b* holds the housing 2112 from the outer side (second outer side different from the first outer side) of the specific region H2 of the wall portion of the housing 2112. In this example, when the fixing portion 2122*a* is worn on the end portion of the intermediate portion 1023 of the auricle 1020, the outer side (second outer side) of the region H2 is the intermediate portion 1023 side of the auricle 1020. In this manner, the housing 2112 is held by the upper portion 1022 of the auricle 1020 from the outer side (first outer side) of the region H1 by the wearable portion 2121 (first wearable portion) as described above, and is further held by the intermediate portion 1023 of the auricle 1020 from the outer side (second outer side different from the first outer side) of the region H2 by the wearable portion 2122 (second wearable portion). As a result, the position of the housing 2112 worn on the auricle 1020 is stabilized. Since the housing 2112 is held at mutually different portions (upper portion 1022 and intermediate portion 1023) of the auricle 1020 by the wearable portion 2121 (first wearable portion) and the wearable portion 2122 (second wearable portion), a load on the auricle 1020 due to wearing can be dispersed. The housing 2112 is worn on the auricle 1020 by the wearable portions 2121, 2122 that grip the end portion of the auricle 1020. Such wearable portions 2121, 2122 do not interfere with a temple of glasses or a string of a mask hooked on the back side of the auricle 1020. Note that the fixing portion 2122*a* may have any specific shape. An example of the fixing portion 2122*a* is a member having a C-shaped or U-shaped hollow cross-sectional shape and configured to grip the intermediate portion 1023 of the auricle 1020 in a state where the helix 1022*a* is in contact with an inner wall surface 2122*aa*. For example, the fixing portion 2122*a* having an ear cuff shape can be exemplified.

The material of the wearable portion 2121 and the wearable portion 2122 is any material. The wearable portion 2121 and the wearable portion 2122 may each be formed from a rigid body such as synthetic resin or metal, or may be formed from an elastic body such as rubber.

Wearing Method 2

Figure 37A:
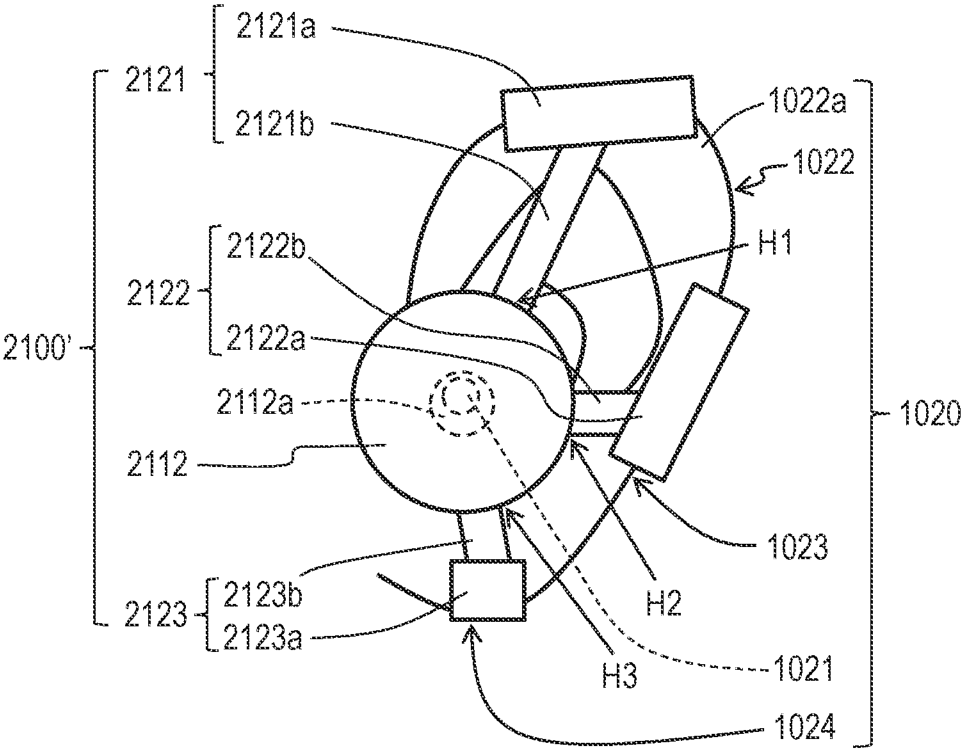
FIG. 37A is a transparent front view for illustrating a modification of the acoustic signal output device according to the fifth embodiment.
Figure 37B:
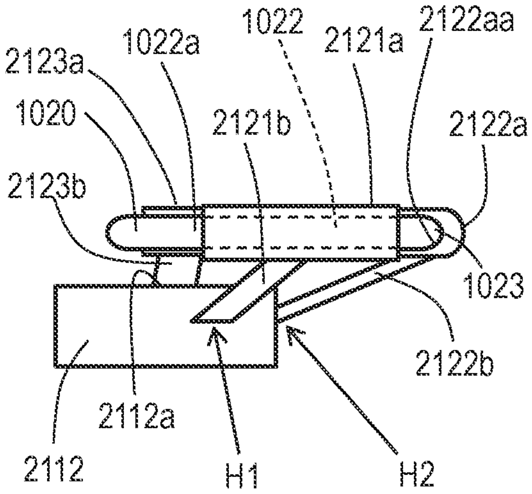
FIG. 37B is a transparent plan view for illustrating the modification of the acoustic signal output device according to the fifth embodiment.
Figure 37C:
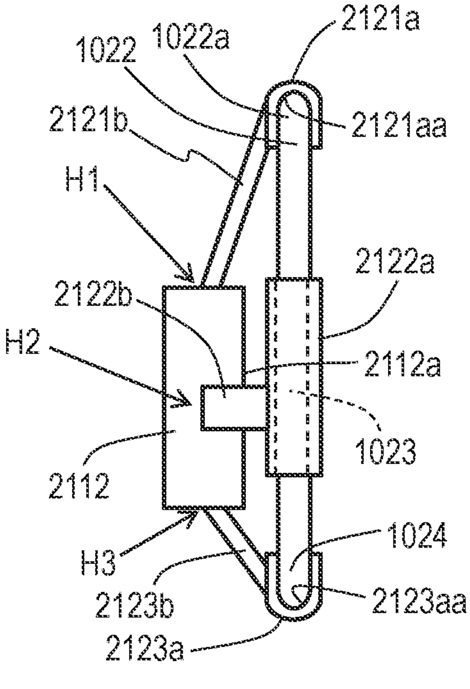
FIG. 37C is a transparent right side view for illustrating the modification of the acoustic signal output device according to the fifth embodiment.

A wearing method 2 will be exemplified using FIGS. 37A to 37C. As illustrated in FIGS. 37A to 37C, an acoustic signal output device 2100' of the wearing method 2 is obtained by further adding a wearable portion 2123 (second wearable portion) configured to be worn on the lower portion 1024 (second auricle portion) that is a part of the auricle 1020 different from the upper portion 1022 (first auricle portion) and the intermediate portion 1023 (second auricle portion) of the auricle 1020 to the acoustic signal output device 2100 of the wearing method 1.

The wearable portion 2123 (second wearable portion) of this example includes a fixing portion 2123*a* (second fixing portion) that grips the end portion of the lower portion 1024 (second auricle portion) of the auricle 1020, and a support portion 2123*b* that fixes the fixing portion 2123*a* (second fixing portion) to the housing 2112. One end of the support portion 2123*b* holds a specific region of the wall portion outside the fixing portion 2123*a*, and the other end of the support portion 2123*b* holds a specific region H3 (second holding region) of the wall portion outside the housing 2112. The region H3 is different from the region H1 and the region H2 described above. One end of the support portion 2123*b* may be fixed to a specific region of the wall portion of the fixing portion 2123*a*, or may be integrated with the wall portion of the fixing portion 2123*a* at the specific region. Similarly, the other end of the support portion 2123*b* may be fixed to the specific region H3 of the wall portion outside the housing 2112, or may be integrated with the wall portion outside the housing 2112 at the specific region H3. As described above, the support portion 2123*b* holds the housing 2112 from the outside (second outside different from the first outside) of the specific region H3 of the wall portion of the housing 2112. In this example, when the fixing portion 2123*a* is worn on the end portion of the lower portion 1024 of the auricle 1020, the outer side (second outer side) of the region H3 is the lower portion 1024 side of the auricle 1020. In this manner, the housing 2112 is further held by the lower portion 1024 of the auricle 1020 from the outer side (second outer side different from the first outer side) of the region H3 by the wearable portion 2123 (second wearable portion). As a result, the position of the housing 2112 worn on the auricle 1020 is further stabilized. Since the housing 2112 is held at different portions (upper portion 1022, intermediate portion 1023, and lower portion 1024) of the auricle 1020 by the wearable portion 2121 (first wearable portion), the wearable portion 2122 (second wearable portion), and the wearable portion 2123 (second wearable portion), a load on the auricle 1020 due to wearing can be dispersed. The housing 2112 is worn on the auricle 1020 by the wearable portions 2121, 2122, 2123 that grip the end portion of the auricle 1020. Such wearable portions 2121, 2122, 2123 do not interfere with a temple of glasses or a string of a mask hooked on the back side of the auricle 1020. Note that the fixing portion 2123*a* may have any specific shape. An example of the fixing portion 2123*a* is a member having a C-shaped or U-shaped hollow cross-sectional shape and configured to grip the lower portion 1024 of the auricle 1020 in a state where the helix 1022*a* is in contact with an inner wall surface 2123*aa*. For example, the fixing portion 2123*a* having an ear cuff shape can be exemplified. The material of the wearable portion 2123 is any material.

Wearing Method 3

The wearable portion 2122 of the acoustic signal output device 2100' of the wearing method 2 may be omitted.

Wearing Method 4

Figure 38:
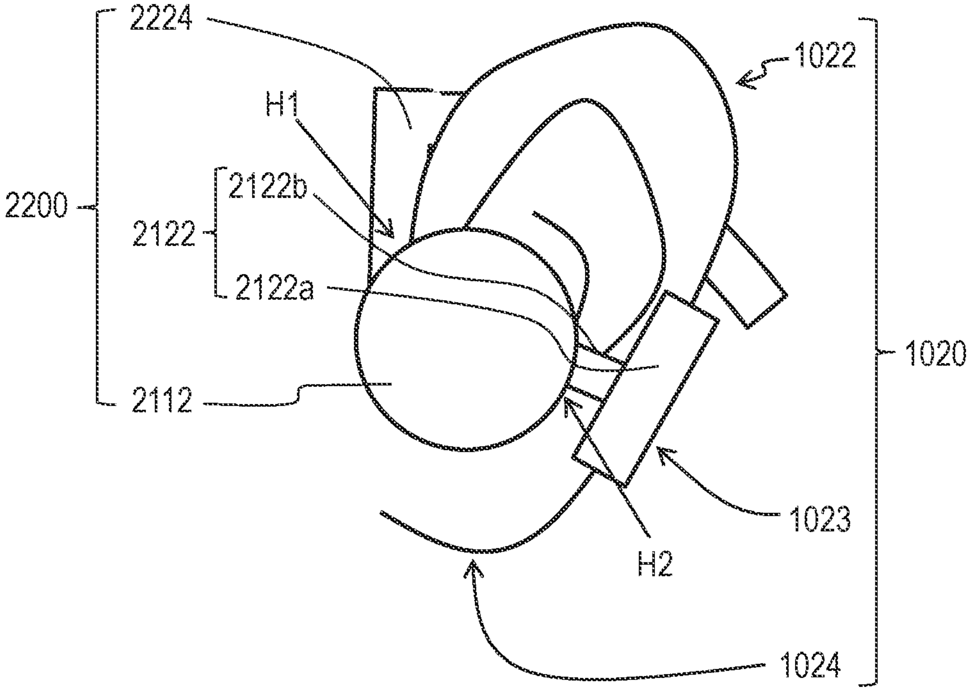
FIG. 38 is a transparent front view for illustrating a modification of the acoustic signal output device according to the fifth embodiment.

As in an acoustic signal output device 2200 illustrated in FIG. 38, the wearable portion 2121 of the acoustic signal output device 2100 of the wearing method 1 may be replaced with a wearable portion 2224 of a type for being hooked on the back side of the upper portion 1022 of the auricle 1020 (temple type of glasses). The wearable portion 2224 is a rod-shaped member. One end side of the wearable portion 2224 is bent so as to be hooked on the back side of the upper portion 1022 of the auricle 1020, and the other end holds the specific region H1 (first holding region) of the wall portion outside the housing 2112. The other end of the wearable portion 2224 may be fixed to the specific region H1 of the wall portion outside the housing 2112, or may be integrated with the wall portion outside the housing 2112 at the specific region H1. Similarly, the wearable portion 2121 of the acoustic signal output device 2100' of the wearing methods 2, 3 may be replaced with the wearable portion 2224 of a type for being hooked on the back side of the upper portion 1022 of the auricle 1020. The material of the wearable portion 2224 is any material.

Wearing Method 5

Figure 39A:
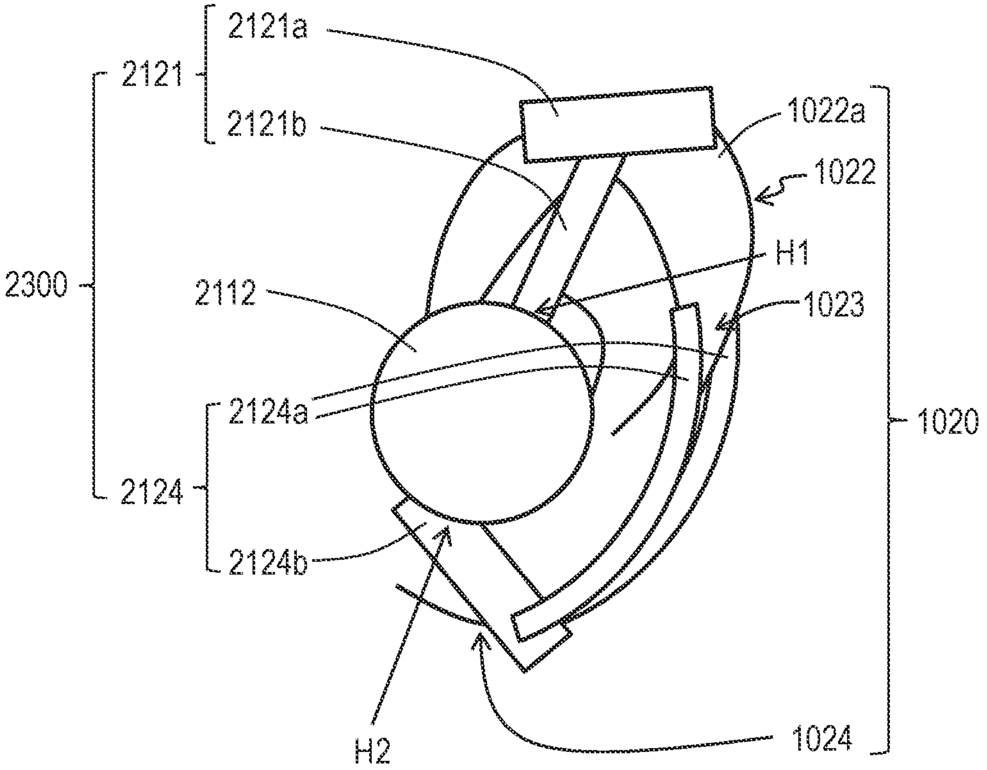
FIGS. 39A and 39B are front views each for illustrating a modification of the acoustic signal output device according to the fifth embodiment.

As in an acoustic signal output device 2300 illustrated in FIG. 39A, the wearable portion 2122 of the acoustic signal output device 2100 of the wearing method 1 may be replaced with a wearable portion 2124 (second wearable portion) that sandwiches the end portion of the intermediate portion 1023 (second auricle portion) of the auricle 1020. The wearable portion 2124 (second wearable portion) includes a fixing portion 2124*a* (second fixing portion) that sandwiches the end portion of the intermediate portion 1023 (second auricle portion) of the auricle 1020, and a support portion 2124*b* that fixes a fixing portion 2124*a* (second fixing portion) to the housing 2112. One end of the support portion 2124*b* holds the end portion of the fixing portion 2124*a*, and the other end of the support portion 2124*b* holds the specific region H2 (second holding region) of the wall portion outside the housing 2112. One end of the support portion 2124*b* may be fixed to the end portion of the fixing portion 2124*a*, or may be integrated with the end portion of the fixing portion 2124*a*. Similarly, the other end of the support portion 2124*b* may be fixed to the specific region H2 of the wall portion outside the housing 2112, or may be integrated with the wall portion outside the housing 2112 at the specific region H2. As described above, the support portion 2124*b* holds the housing 2112 from the outside (second outer side different from the first outer side) of the specific region H2 of the wall portion of the housing 2112. In this manner, the housing 2112 is held by the upper portion 1022 of the auricle 1020 from the outer side (first outer side) of the region H1 by the wearable portion 2121 (first wearable portion) as described above, and is further held by the intermediate portion 1023 of the auricle 1020 from the outer side (second outer side different from the first outer side) of the region H2 by the wearable portion 2124 (second wearable portion). As a result, the position of the housing 2112 worn on the auricle 1020 is stabilized. Also in this case, since the housing 2112 is held at mutually different portions (upper portion 1022 and intermediate portion 1023) of the auricle 1020 by the wearable portion 2121 (first wearable portion) and the wearable portion 2124 (second wearable portion), a load on the auricle 1020 due to wearing can be dispersed. The wearable portions 2121, 2124 do not interfere with a temple of glasses or a string of a mask hooked on the back side of the auricle 1020. The fixing portion 2124*a* (second fixing portion) for sandwiching may be configured to sandwich the lower portion 1024 of the auricle 1020 instead of the intermediate portion 1023 of the auricle 1020. Note that the fixing portion 2124*a* may have any specific shape. For example, the fixing portion 2124*a* may be a clip-like sandwiching mechanism or an integrated leaf spring. The material of the wearable portion 2124 is any material.

Wearing Method 6

Figure 39B:
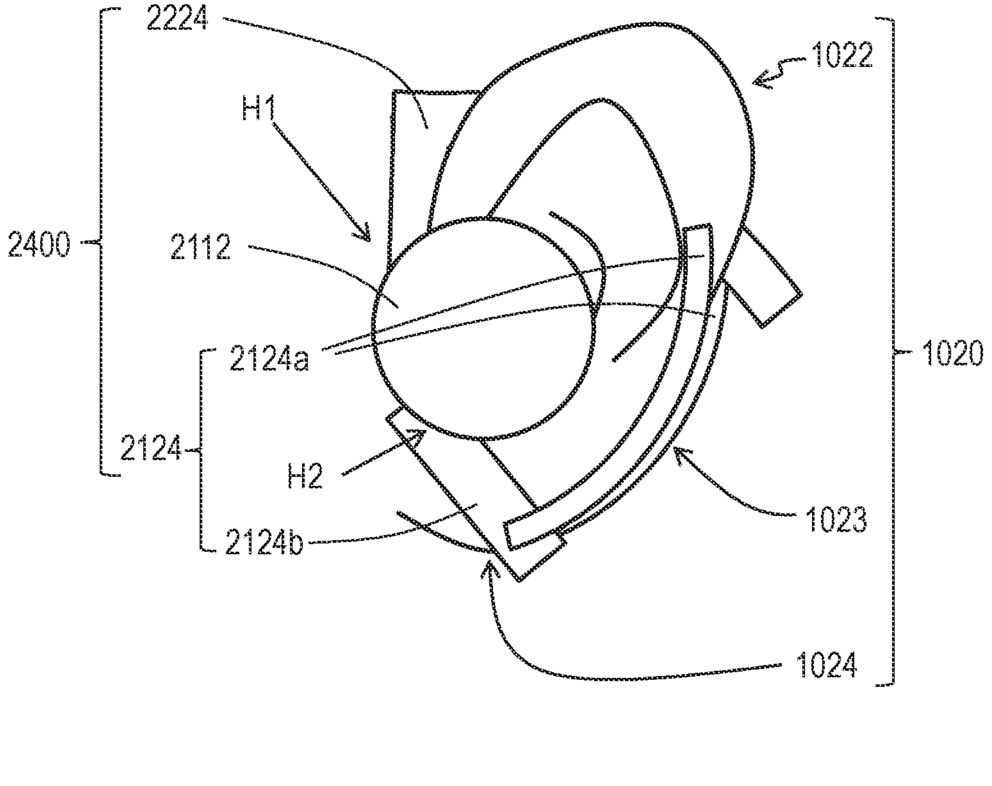

As in an acoustic signal output device 2400 illustrated in FIG. 39B, the wearable portion 2121 of the acoustic signal output device 2300 of the wearing method 5 may be replaced with the wearable portion 2224 of a type for being hooked on the back side of the upper portion 1022 of the auricle 1020. The configuration of the wearable portion 2224 is the same as that of the wearing method 4.

Wearing Method 7

In a case where the housing 2112 is the housing 12, 12", 22 exemplified in the first to fourth embodiments and the modifications thereof, the opening areas of sound holes 123*a*, 223*a* (second sound holes) provided in or in the vicinity of a region where the acoustic signal AC1 (first acoustic signal) emitted from the sound hole 121*a*, 221*a* (first sound hole) of the housing 12, 12", 22 is shielded by the wearable portions 2121, 2122, 2123, 2124, 2224 (the region is a shielded region) may be made smaller than the opening areas of sound holes 123*a*, 223*a* (second sound holes) provided at positions away from the shielded region. As described above, a part of the acoustic signal AC1 (first acoustic signal) emitted from the sound hole 121*a*, 221*a* (first sound hole) of the housing 12, 12", 22 is canceled out by the acoustic signal AC2 (second acoustic signal) emitted from the sound holes 123*a*, 223*a* (second sound holes), thereby reducing sound leakage. Here, the sound pressure of the acoustic signal AC1 (first acoustic signal) leaking to the outside is smaller in the shielded region than in other regions. By the opening areas of the sound holes 123*a*, 223*a* (second sound holes) provided in or in the vicinity of the shielded region being made small in accordance with this, the distribution of the sound pressure of the acoustic signal AC1 (first acoustic signal) leaking to the outside and the distribution of the sound pressure of the acoustic signal AC2 (second acoustic signal) emitted from the sound holes 123*a*, 223*a* (second sound holes) can be balanced. That is, the acoustic signal AC1 (first acoustic signal) is emitted from the sound hole 121*a*, 221*a* (first sound hole), and the acoustic signal AC2 (second acoustic signal) is emitted from the sound holes 123*a*, 223*a* (second sound holes). In this case, the distributions of the sound pressure can be balanced such that an attenuation rate $\eta_{11}$ of the acoustic signal AC1 (first acoustic signal) at a position P2 (second point) with reference to a position P1 (first point) is equal to or less than a predetermined value $\eta_{th}$ smaller than an attenuation rate $\eta_{21}$ due to air propagation of an acoustic signal at the position P2 (second point) with reference to the position P1 (first point). Alternatively, in this case, the distributions of the sound pressure can be balanced such that an attenuation amount $\eta_{12}$ of the acoustic signal AC1 (first acoustic signal) at the position P2 (second point) with reference to the position P1 (first point) is equal to or larger than a predetermined value $\omega_{th}$ larger than an attenuation amount $\eta_{22}$ due to air propagation of an acoustic signal at the position P2 (second point) with reference to the position P1 (first point). Here, the position P1 (first point) is a predetermined point at which the acoustic signal AC1 (first acoustic signal) emitted from the sound hole 221*a* (first sound hole) reaches. Here, the position P2 (second point) is a predetermined point at which the distance from the acoustic signal output device is longer than the position P1 (first point). As a result, sound leakage can be effectively reduced.

Hereinafter, an example is described in which the housing 2112 is the housing 12 of the first embodiment or the modifications thereof, and the housing 12 (housing 2112) is held by the wearable portions 2121, 2122 of the wearing method 1. However, this does not limit the present invention. The housing 2112 may be the housing 12, 12", 22 exemplified in the second to fourth embodiments and the modifications thereof, and the housing 12, 12", 22 may be held by any of the wearable portions 2121, 2122, 2123, 2124, 2224 of the wearing methods 2 to 6. Also in this case, the following configuration can be applied.

Figure 40A:
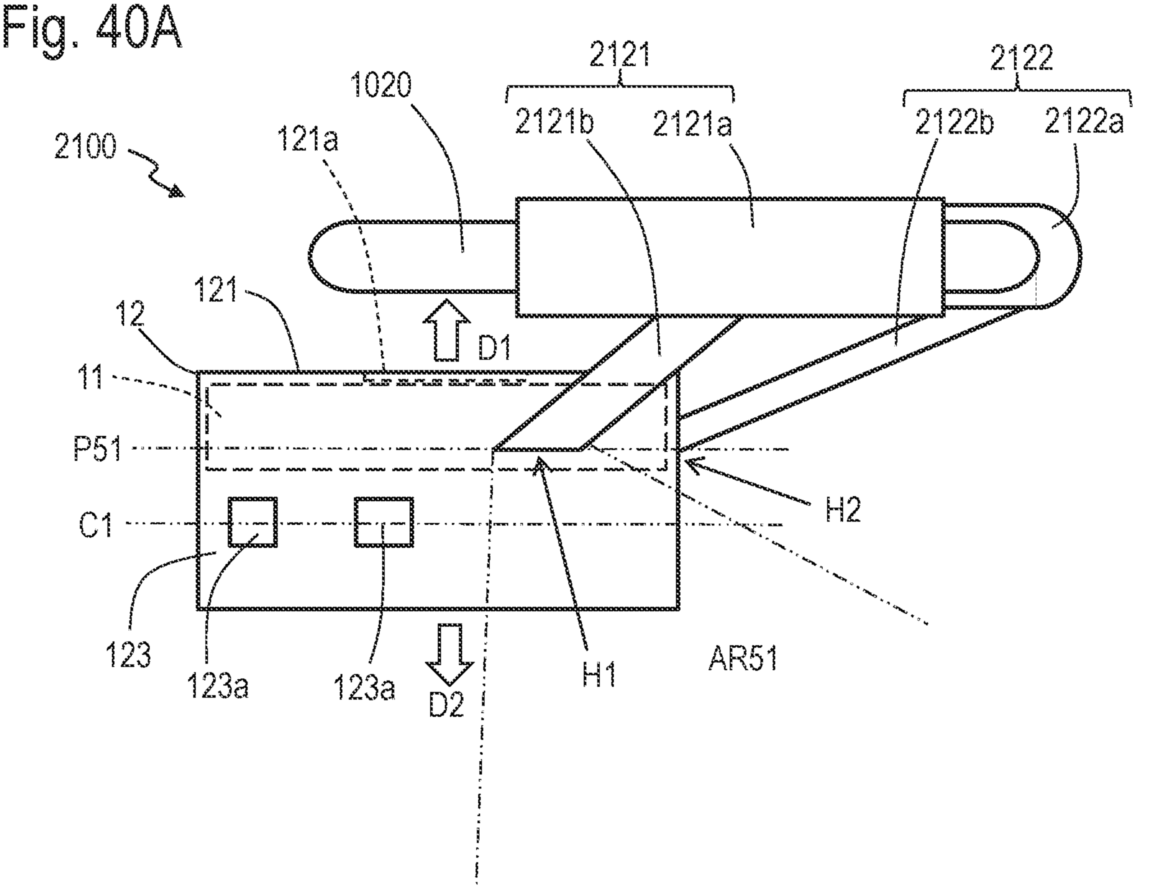
FIG. 40A is a plan view for illustrating a modification of the acoustic signal output device according to the fifth embodiment.
Figure 40B:
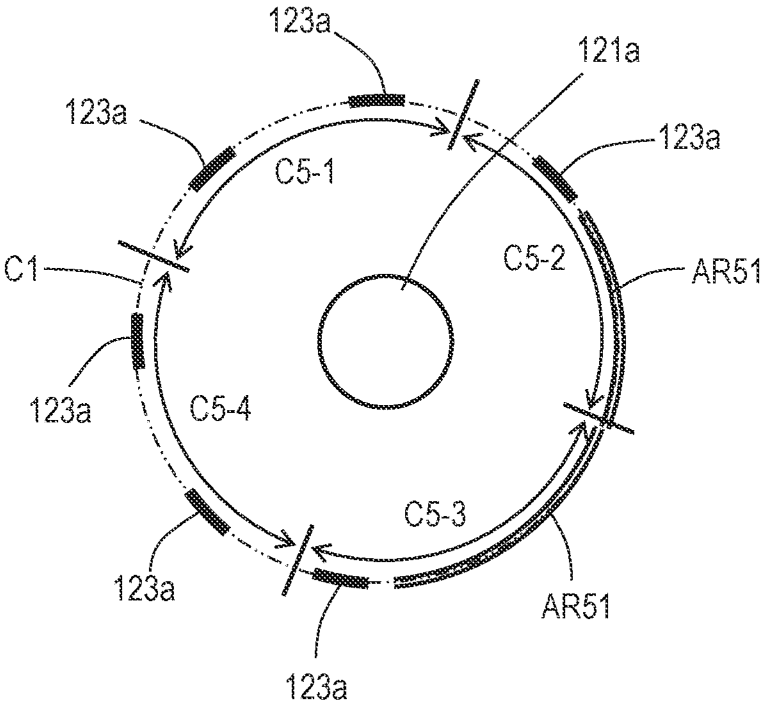
FIG. 40B is a conceptual view for illustrating a modification of arrangement of sound holes.

As illustrated in FIG. 40A, the acoustic signal output device 2100 in this case includes the driver unit 11 that emits the acoustic signal AC1 (first acoustic signal) to one side (D1 direction side), and emits the acoustic signal AC2 (second acoustic signal) that is an antiphase signal of the acoustic signal AC1 (first acoustic signal) or an approximate signal of the antiphase signal to the other side (D2 direction side). As described above, the wall portions 121, 123 of the housing 12 is provided with a single or a plurality of sound holes 121*a* (first sound holes) that leads out the acoustic signal AC1 (first acoustic signal) emitted from the driver unit 11 to the outside and a single or a plurality of sound holes 123*a* (second sound holes) that leads out the acoustic signal AC2 (second acoustic signal) emitted from the driver unit 11 to the outside. As described above, a part of the acoustic signal AC2 (second acoustic signal) emitted from the sound holes 123*a* (second sound holes) cancels out a part of the acoustic signal AC1 (first acoustic signal) emitted from the sound hole 121*a* (first sound hole), thereby reducing sound leakage. As described above, the support portion 2121*b* of the wearable portion 2121 (first wearable portion) holds the region H1 (first holding region) of the wall portion 123 of the housing 12 (housing 2112), and the support portion 2122*b* of the wearable portion 2122 (second wearable portion) holds the region H2 (second holding region) of the wall portion 123 of the housing 12 (housing 2112). Here, the sound hole 121*a* (first sound hole) is arranged on one side (D1 direction side) of a space partitioned by a virtual plane P51 passing through the region H1 (first holding region) and the wearable portion 2122 (second wearable portion). On the other hand, the sound holes 123*a* (second sound holes) are arranged on the other side (D2 direction side) of the space partitioned by the virtual plane P51. Here, the opening areas of sound holes 123*a* (second sound holes) provided in or in the vicinity a shielded region AR51 where the acoustic signal AC1 (first acoustic signal) is shielded by the support portion 2121*b* of the wearable portion 2121 (first wearable portion) or the support portion 2122*b* of the wearable portion 2122 (second wearable portion) are made small. That is, as illustrated in FIG. 40B, it is assumed that the sound holes 123*a* (second sound holes) are provided along the circumference C1 described above. It is assumed that the surface of the wall portion 123 of the housing 12 is equally divided into a plurality of unit area regions (in this example, unit area regions C5-1, C5-2, C5-3, C5-4) along the circumference C1. In this example, the number of sound holes 123*a* (second sound holes) provided in a first unit area region (in this example, unit area region C5-2, C5-3) that is one of unit area regions including the shielded region AR51 is smaller than the number of sound holes 123*a* (second sound holes) provided in a second unit area region (in this example, unit area region C5-1, C5-4) that is one of unit area regions not including the shielded region AR51. In this case, the sum of the opening areas of the sound holes 123*a* (second sound holes) provided in the first unit area region (in this example, unit area region C5-2, C5-3) that is one of unit area regions including the shielded region AR51 is smaller than the sum of the opening areas of the sound holes 123*a* (second sound holes) provided in the second unit area region (in this example, unit area region C5-1, C5-4) that is one of unit area regions not including the shielded region AR51. As a result, sound leakage can be effectively reduced.

Figure 41A:
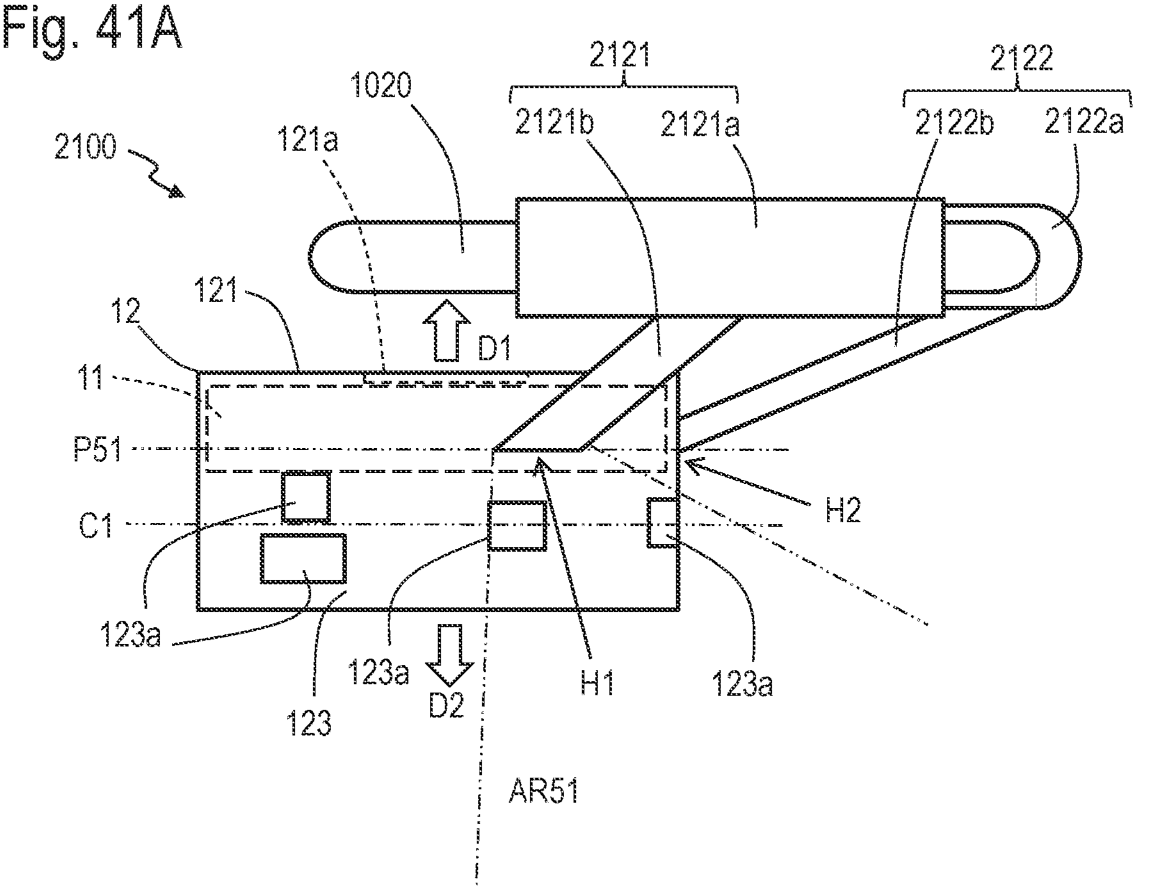
FIG. 41A is a plan view for illustrating a modification of the acoustic signal output device according to the fifth embodiment.
Figure 41B:
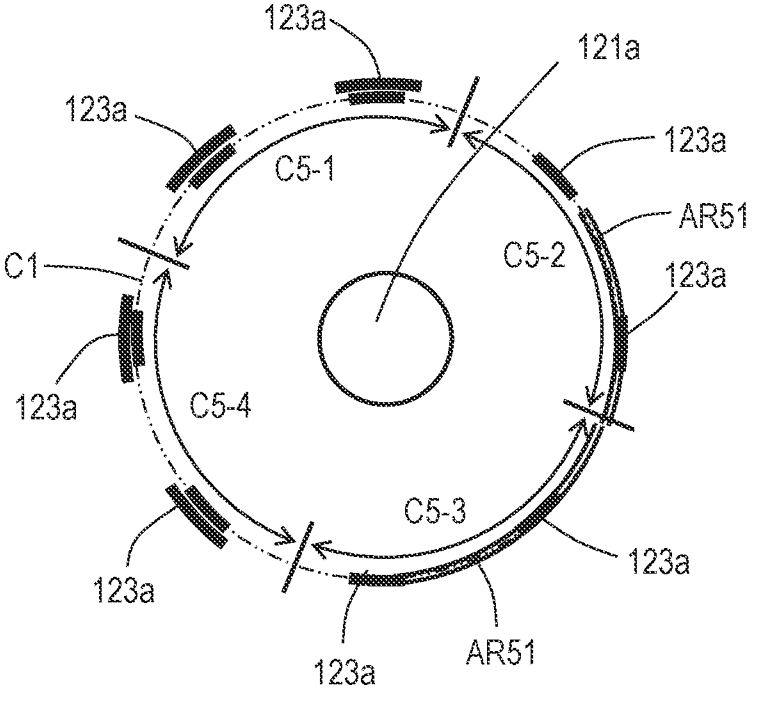
FIG. 41B is a conceptual view for illustrating a modification of the arrangement of sound holes.

As illustrated in FIGS. 41A and 41B, the number of the sound holes 123*a* (second sound holes) provided in the first unit area region including the shielded region AR51 (in this example, unit area region C5-2, C5-3) may be smaller than the number of the sound holes 123*a* (second sound holes) provided in the second unit area region not including the shielded region AR51 (in this example, unit area region C5-1, C5-4), and further, sound holes 123*a* having larger opening areas may be provided in the second unit area region as compared to the first unit area region. The number of sound holes 123*a* may be equal between the first unit area region and the second unit area region, and the opening area of each of the sound holes 123*a* provided in the first unit area region may be smaller than the opening area of each of the sound holes 123*a* provided in the second unit area region. Also in this case, the sum of the opening areas of the sound holes 123*a* (second sound holes) provided in the first unit area region (in this example, unit area region C5-2, C5-3) is smaller than the sum of the opening areas of the sound holes 123*a* (second sound holes) provided in the second unit area region (in this example, unit area region C5-1, C5-4). Even in this case, sound leakage can be effectively reduced.

Wearing Method 8

Figure 42:
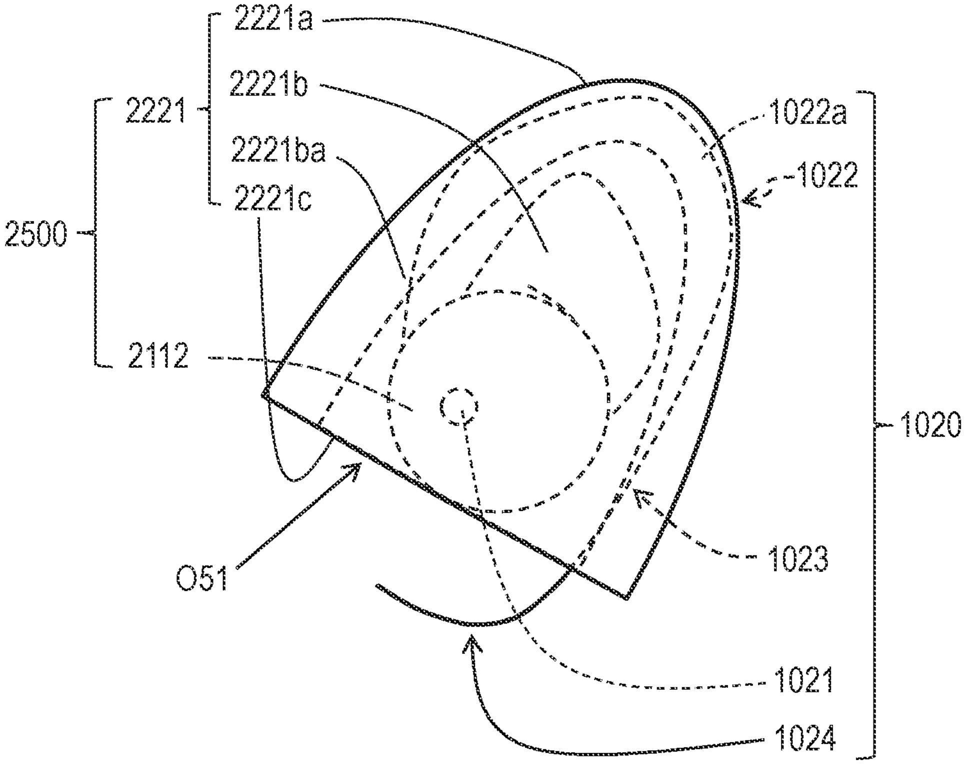
FIG. 42 is a transparent front view for illustrating a configuration of the acoustic signal output device according to the fifth embodiment.
Figure 43A:
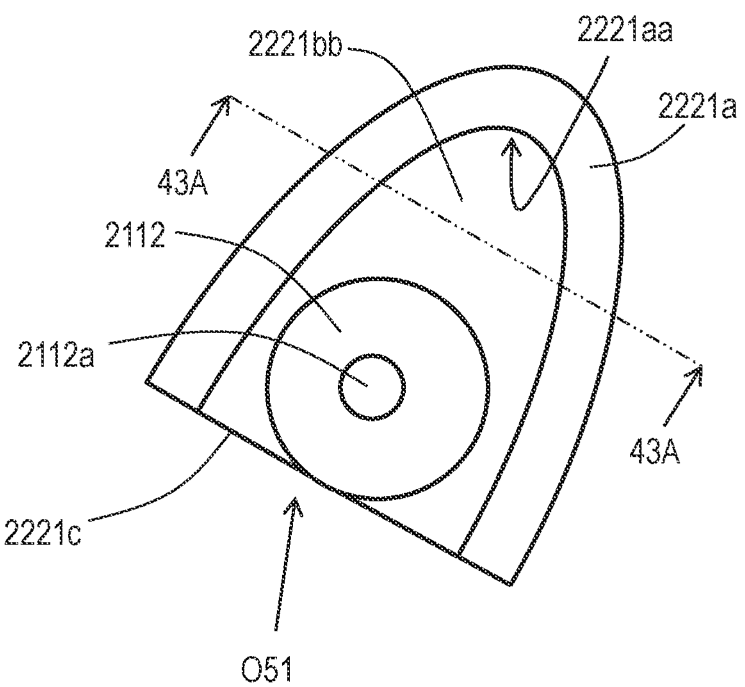
FIG. 43A is a rear view for illustrating the configuration of the acoustic signal output device according to the fifth embodiment.
Figure 43B:
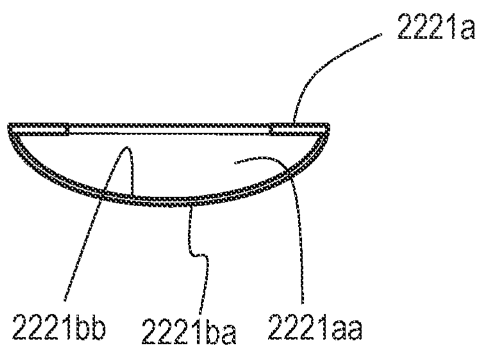
FIG. 43B is a cross-sectional view taken along line 43A-43A in FIG. 43A.

A wearing method 8 will be exemplified with reference to FIGS. 42, 43A, and 43B. As illustrated in FIGS. 42 and 43A, an acoustic signal output device 2500 of the wearing method 8 includes the housing 2112 that emits an acoustic signal, and a wearable portion 2221 that holds the housing 2112 and is configured to be worn on the auricle 1020.

The wearable portion 2221 includes a fixing portion 2221*a* including a concave inner wall surface 2221*aa* configured to be fitted into the upper portion 1022 of the auricle 1020, and a shielding wall 2221*b* configured to cover only a part of the auricle 1020 when the inner wall surface 2221*aa* side of the fixing portion 2221*a* is fitted into the upper portion 1022 of the auricle 1020. The fixing portion 2221*a* in this example includes a hollow structure that houses at least a part of the upper portion 1022 of the auricle 1020 (for example, helix 1022*a*). In consideration of a burden on the auricle 1020, the inner wall surface 2221*aa* of the fixing portion 2221*a* is desirably a curved surface. However, this does not limit the present invention. The shielding wall 2221*b* is a plate including a flat or curved wall surface. The shielding wall 2221*b* of this example is configured to have a shape that opens the lower portion 1024 of the auricle 1020 to the outside while covering the upper portion 1022 of the auricle 1020 when the inner wall surface 2221*aa* side of the fixing portion 2221*a* is fitted into the upper portion 1022 of the auricle 1020. That is, an end portion 2221*c* (end portion opposite to the fixing portion 2221*a*) side of the shielding wall 2221*b* is an opening portion O51. The opening portion O51 is provided at a position where the lower portion 1024 of the auricle 1020 is opened to the outside when the upper portion 1022 of the auricle 1020 is fitted into the inner wall surface 2221*aa* side of the fixing portion 2221*a*. The material of the wearable portion 2221 is any material.

The housing 2112 of this example may be any of the housings 12, 12", 22 exemplified in the first to fourth embodiments and the modifications thereof, or may be a housing of an acoustic signal output device that emits an acoustic signal such as a conventional earphone. The housing 2112 is held on an inner wall surface 2221*bb* side of the shielding wall 2221*b*, and the sound hole 2112*a* that emits an acoustic signal is opened in a direction opposite to the inner wall surface 2221*bb*. When the acoustic signal output device 2500 is worn on the auricle 1020, an outer wall surface 2221*ba* side of the shielding wall 2221*b* faces the outside, the inner wall surface 2221*bb* side of the shielding wall 2221*b* faces the inside (auricle 1020 side), the sound hole 2112*a* of the housing 2112 held by the inner wall surface 2221*bb* faces the ear canal 1021 side, and the housing 2112 is arranged so as not to block the ear canal 1021. At this time, since the sound hole 2112*a* is arranged on the inside of the shielding wall 2221*b*, the influence of external noise can be reduced, and sound leakage of an acoustic signal emitted from the sound hole 2112*a* can also be reduced. Furthermore, since the shielding wall 2221*b* covers only a part of the auricle 1020 (the lower portion 1024 side of the auricle 1020 is not blocked), external sound is not completely blocked, and the user can also listen to the external sound.

Wearing Method 9

Figure 44:
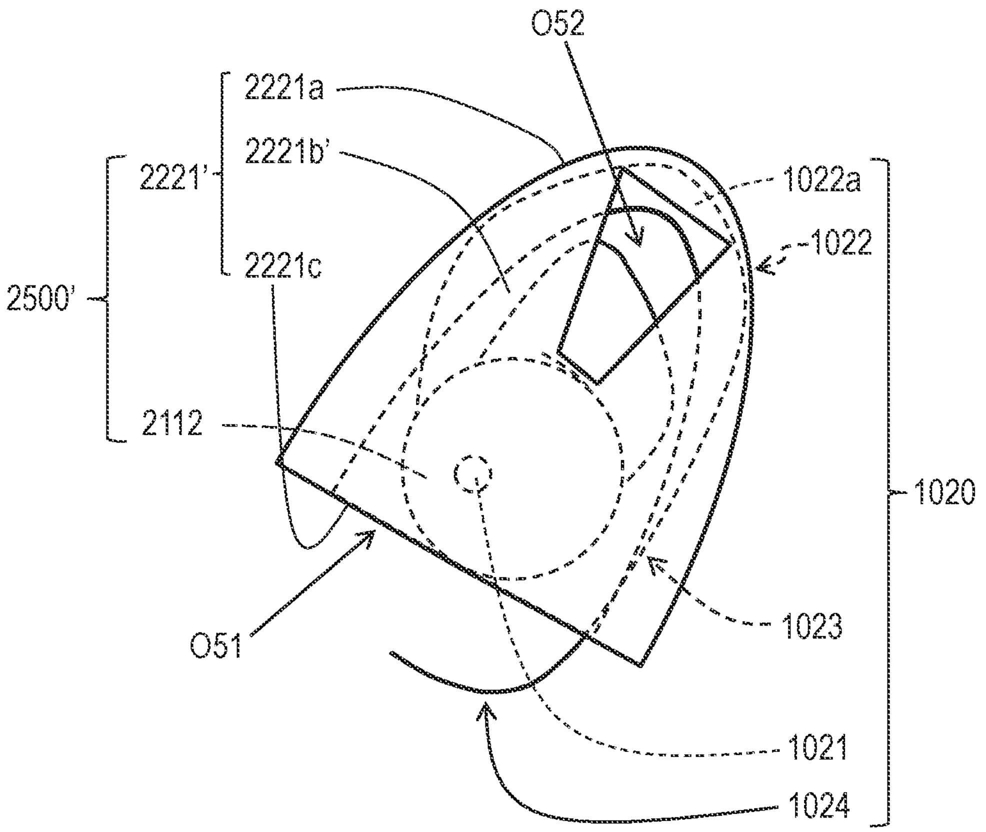
FIG. 44 is a transparent front view for illustrating a modification of the acoustic signal output device according to the fifth embodiment.
Figure 45:
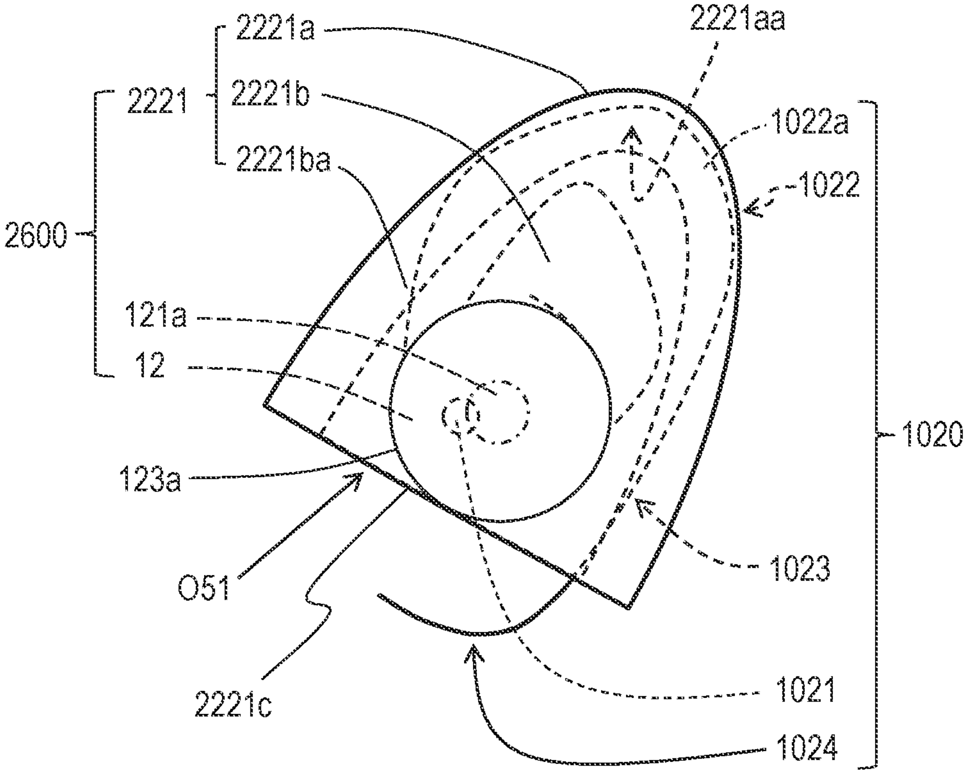
FIG. 45 is a transparent front view for illustrating a modification of the acoustic signal output device according to the fifth embodiment.

As illustrated in FIG. 44, an acoustic signal output device 2500' of a wearing method 9 is a modification of the acoustic signal output device 2500 of the wearing method 8, and the wearable portion 2221 of the acoustic signal output device 2500 is replaced with a wearable portion 2221'. The wearable portion 2221' is obtained by replacing the shielding wall 2221*b* of the wearable portion 2221 with a shielding wall 2221*b*'. The shielding wall 2221*b*' is configured to have a shape that further opens a part of the upper portion 1022 of the auricle 1020 to the outside when the inner wall surface 2221*aa* side of the fixing portion 2221*a* is fitted into the upper portion 1022 of the auricle 1020. That is, the end portion 2221*c* (end portion opposite to the fixing portion 2221*a*) side of the shielding wall 2221*b*' is the opening portion O51, and a part of the shielding wall 2221*b*' on the fixing portion 2221*a* side is also an opening portion O52 (through hole). The opening portion O52 is provided at a position where a part of the upper portion 1022 of the auricle 1020 is opened to the outside. The other aspects are the same as those of the wearing method 8. Since the shielding wall 2221*b*' covers only a part of the auricle 1020 (the lower portion 1024 side of the auricle 1020 and a part of the upper portion 1022 side are not blocked), external sound is not completely blocked, and the user can also listen to the external sound.

Wearing Method 10

In a case where the housing 2112 is the housing 12, 12", 22 exemplified in the first to fourth embodiments and the modifications thereof, desirably, the sound hole 121*a*, 221*a* (first sound hole) of the housing 12, 12", 22 is arranged on the inner side of the shielding wall 2221*b*, and the sound holes 123*a*, 223*a* (second sound holes) are arranged on the outer side of the shielding wall 2221*b*. As a result, a part of the acoustic signal AC1 (first acoustic signal) leaking to the outer side of the shielding wall 2221*b* can be canceled out by a part of the acoustic signal AC2 emitted from the sound holes 123*a*, 223*a* (second sound holes) while the acoustic signal AC1 is prevented from being canceled out by the acoustic signal AC2 on the inner side of the shielding wall 2221*b*. As a result, sound leakage to the outside of the acoustic signal AC1 can be effectively reduced without lowering listening efficiency of the acoustic signal AC1 by the user so much.

In this case, the sound pressure of the acoustic signal AC1 leaking to the outside from the opening portion O51, O52 of the shielding wall 2221*b*, 2221*b*' is larger than the sound pressure of the acoustic signal AC1 leaking to the outside from the shielding wall 2221*b*, 2221*b*' other than the opening portion O51, O52. Therefore, the opening areas per unit area of sound holes 123*a*, 223*a* (second sound holes) arranged on the side where the opening portion O51, O52 is provided are desirably larger than the opening areas per unit area of sound holes 123*a*, 223*a* (second sound holes) arranged on the side where the opening portion O51, O52 is not provided. As a result, the distribution of the sound pressure of the acoustic signal AC2 (second acoustic signal) emitted from the sound holes 123*a*, 223*a* (second sound holes) can be brought close to the distribution of the sound pressure of the acoustic signal AC1 leaking to the outside of the shielding wall 2221*b*, and the acoustic signal AC1 can be appropriately canceled out by the acoustic signal AC2. That is, the acoustic signal AC1 (first acoustic signal) is emitted from the sound hole 121*a*, 221*a* (first sound hole), and the acoustic signal AC2 (second acoustic signal) is emitted from the sound holes 123*a*, 223*a* (second sound holes). In this case, the distributions of the sound pressure can be balanced such that an attenuation rate $\eta_{11}$ of the acoustic signal AC1 (first acoustic signal) at a position P2 (second point) with reference to a position P1 (first point) is equal to or less than a predetermined value $\eta_{th}$ smaller than an attenuation rate $\eta_{21}$ due to air propagation of an acoustic signal at the position P2 (second point) with reference to the position P1 (first point). Alternatively, in this case, the distributions of the sound pressure can be balanced such that an attenuation amount $\eta_{12}$ of the acoustic signal AC1 (first acoustic signal) at the position P2 (second point) with reference to the position P1 (first point) is equal to or larger than a predetermined value $\omega_{th}$ larger than an attenuation amount $\eta_{22}$ due to air propagation of an acoustic signal at the position P2 (second point) with reference to the position P1 (first point). Here, the position P1 (first point) is a predetermined point at which the acoustic signal AC1 (first acoustic signal) emitted from the sound hole 221*a* (first sound hole) reaches. Here, the position P2 (second point) is a predetermined point at which the distance from the acoustic signal output device is longer than the position P1 (first point). As a result, sound leakage can be effectively reduced.

Hereinafter, an example is described in which the housing 2112 is the housing 12 of the first embodiment or the modifications thereof, and the housing 12 (housing 2112) is held by the wearable portion 2221 of the wearing method 8. However, this does not limit the present invention. The housing 2112 may be the housing 12, 12", 22 exemplified in the second to fourth embodiments and the modifications thereof, and the housing 12, 12", 22 may be held by the wearable portion 2221' of the wearing method 9. Also in this case, the following configuration can be applied.

Figure 46A:
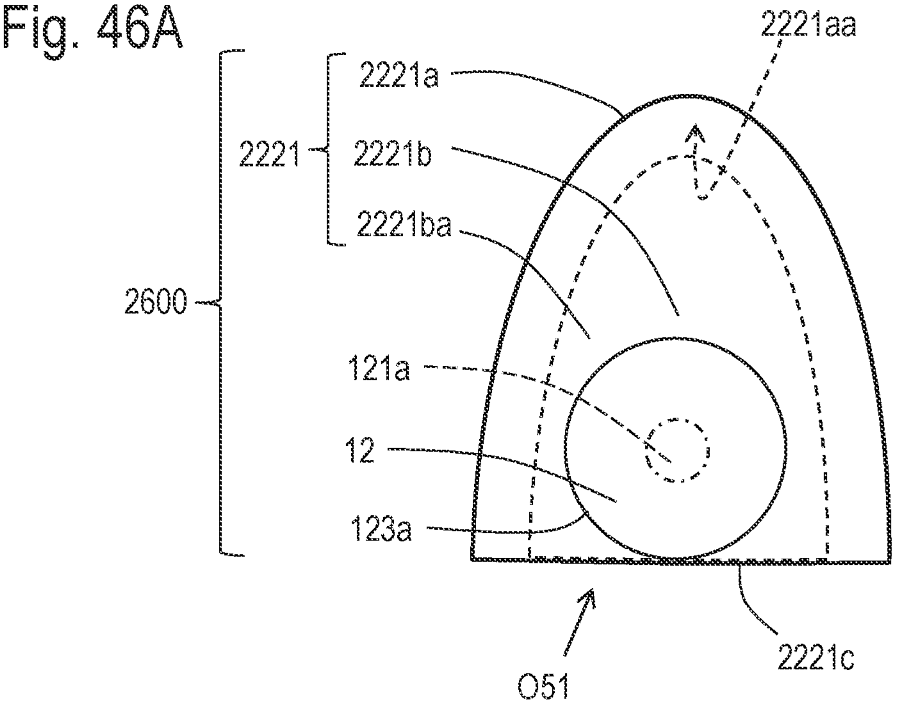
FIG. 46A is a transparent front view for illustrating a modification of the acoustic signal output device according to the fifth embodiment.
Figure 46B:
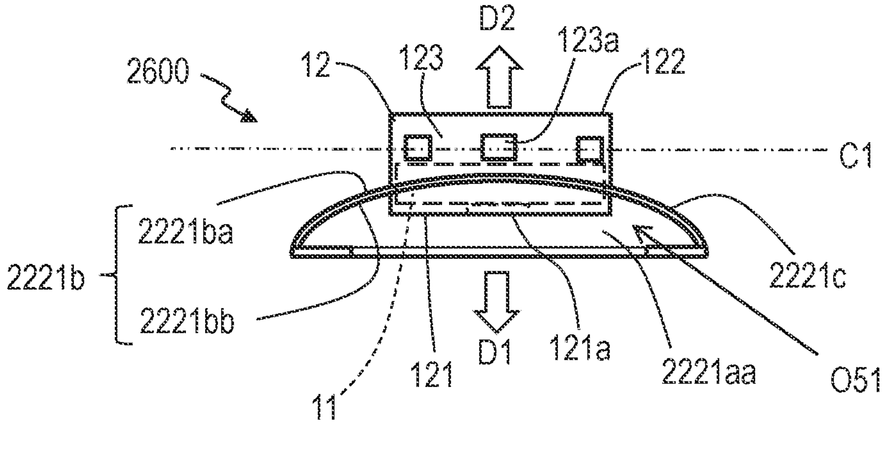
FIG. 46B is a transparent bottom view for illustrating the modification of the acoustic signal output device according to the fifth embodiment.
Figure 46C:
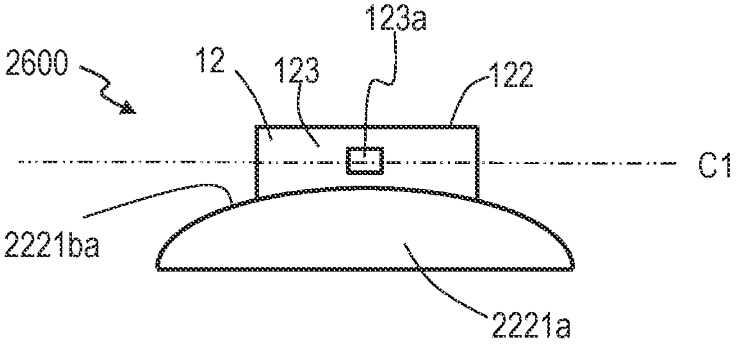
FIG. 46C is a plan view for illustrating the modification of the acoustic signal output device according to the fifth embodiment.

As illustrated in FIG. 46B, an acoustic signal output device 2600 in this case includes the driver unit 11 that emits the acoustic signal AC1 (first acoustic signal) to one side (D1 direction side), and emits the acoustic signal AC2 (second acoustic signal) that is an antiphase signal of the acoustic signal AC1 (first acoustic signal) or an approximate signal of the antiphase signal to the other side (D2 direction side). As described above, the wall portions 121, 123 of the housing 12 include a single or plurality of sound holes 121*a* (first sound holes) for leading out the acoustic signal AC1 (first acoustic signal) emitted from the driver unit 11 to the outside and a single or plurality of sound holes 123*a* (second sound holes) for leading out the acoustic signal AC2 (second acoustic signal) emitted from the driver unit 11 to the outside (FIGS. 46B and 46C). As described above, a part of the acoustic signal AC2 (second acoustic signal) emitted from the sound holes 123*a* (second sound holes) cancels out a part of the acoustic signal AC1 (first acoustic signal) emitted from the sound hole 121*a* (first sound hole), thereby reducing sound leakage. As illustrated in FIG. 46B, the sound hole 121*a* (first sound hole) of the housing 12 is arranged on the inner side (D1 direction side) of the shielding wall 2221*b*, and the sound holes 123*a* (second sound holes) are arranged on the outer side (D2 direction side) of the shielding wall 2221*b*. As a result, a part of the acoustic signal AC1 (first acoustic signal) leaking to the outer side of the shielding wall 2221*b* can be canceled out by a part of the acoustic signal AC2 emitted from the sound holes 123*a* (second sound holes) while the acoustic signal AC1 is prevented from being canceled out by the acoustic signal AC2 on the inner side of the shielding wall 2221*b*. As a result, sound leakage to the outside of the acoustic signal AC1 can be effectively reduced without lowering listening efficiency of the acoustic signal AC1 by the user so much.

Figure 47A:
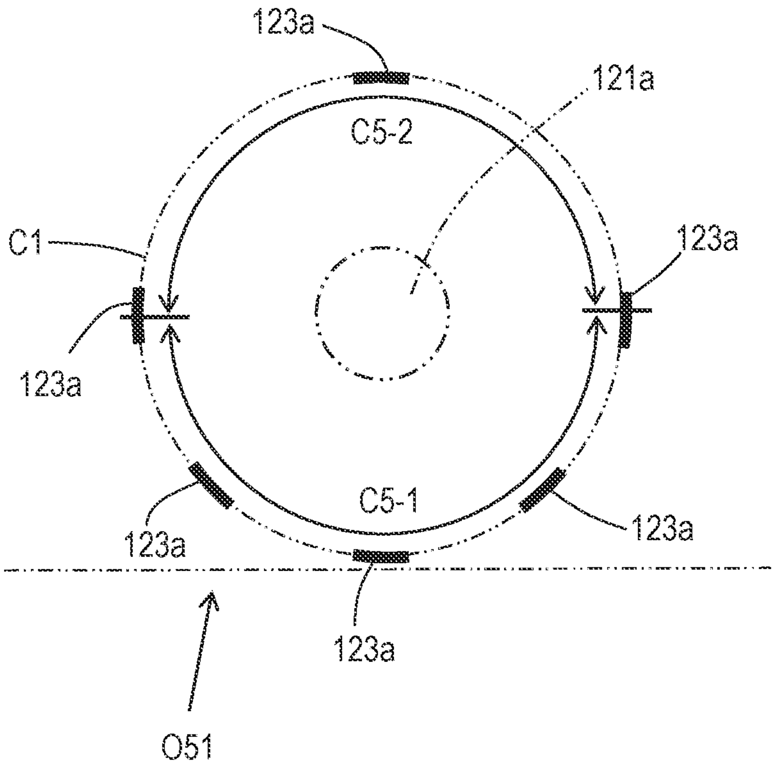
FIGS. 47A and 47B are conceptual views for illustrating a modification of the arrangement of sound holes.

As described above, the opening portion O51 that partially opens a portion (lower portion 1024) of the auricle 1020 to the outside when the upper portion 1022 of the auricle 1020 is fitted into the inner wall surface 2221*aa* side of the fixing portion 2221*a* is provided in a part (end portion 2221*c* side) of the shielding wall 2221*b* (FIGS. 46A and 46B). That is, the opening portion O51 of this example is provided at a position where the lower portion 1024 of the auricle 1020 is opened to the outside when the upper portion 1022 of the auricle 1020 is fitted into the inner wall surface 2221*aa* side of the fixing portion 2221*a*. Here, the opening areas per unit area (FIG. 46B) of sound holes 123*a* (second sound holes) arranged on the side where the opening portion O51 is provided are larger than the opening areas per unit area (FIG. 46C) of sound holes 123*a* (second sound holes) arranged on the side where the opening portion is not provided. That is, as illustrated in FIGS. 46B, 46C, and 47A, the sound holes 123*a* (second sound holes) are provided along the circumference C1 described above. Here, it is assumed that the surface of the wall portion 123 of the housing 12 is equally divided into unit area regions (in this example, unit area regions C5-1, C5-2) along the circumference C1. In this example, the number of the sound holes 123*a* (second sound holes) arranged on the side where the opening portion O51 is provided (unit area region C5-1) is larger than the number of the sound holes 123*a* (second sound holes) arranged on the side where the opening portion is not provided (unit area region C5-2). Therefore, the opening areas per unit area arranged on the side where the opening portion O51 is provided (unit area region C5-1) are larger than the opening areas per unit area of the sound holes 123*a* (second sound holes) arranged on the side where the opening portion is not provided (unit area region C5-2). As a result, the distribution of the sound pressure of the acoustic signal AC2 (second acoustic signal) emitted from the sound holes 123*a*, 223*a* (second sound holes) can be brought close to the distribution of the sound pressure of the acoustic signal AC1 leaking to the outside of the shielding wall 2221*b*, and the acoustic signal AC1 can be appropriately canceled out by the acoustic signal AC2 and sound leakage can be effectively reduced.

Figure 47B:
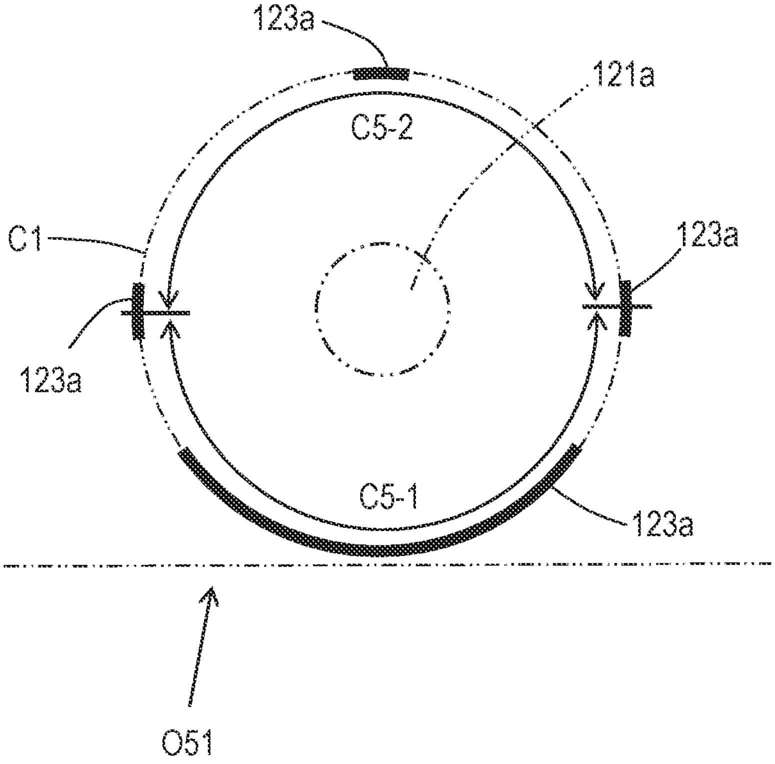
Figure 48A:
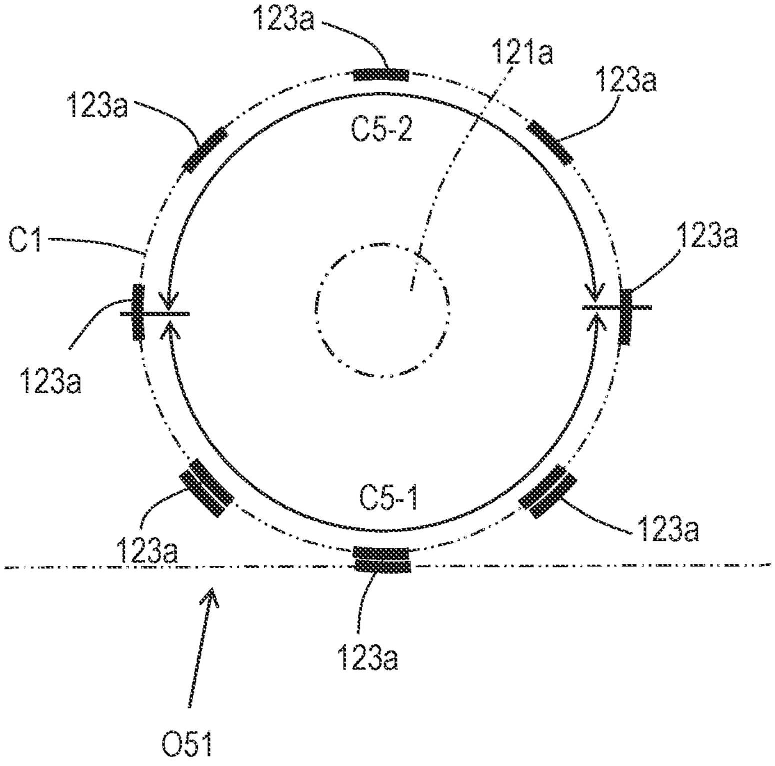
FIGS. 48A and 48B are conceptual views for illustrating a modification of the arrangement of sound holes.
Figure 48B:
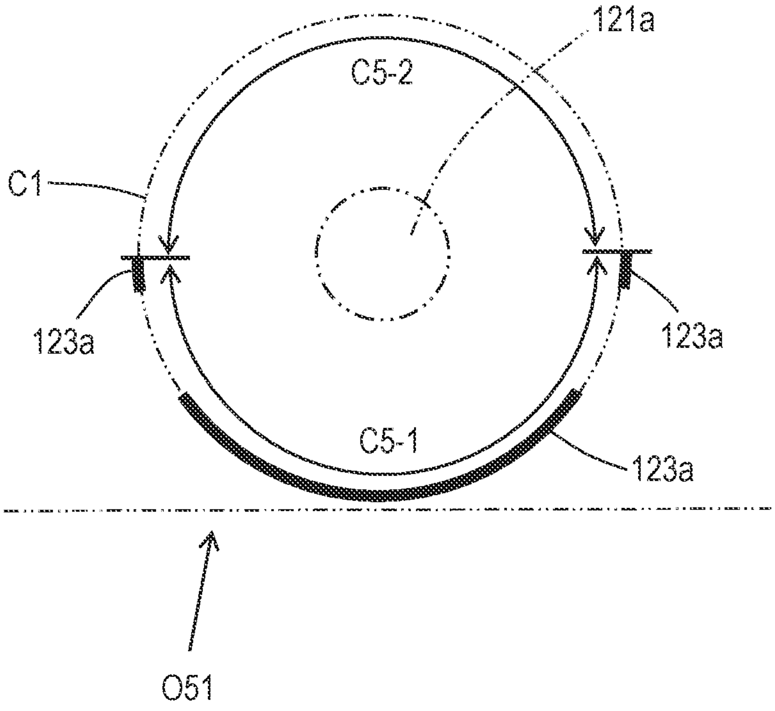

As illustrated in FIG. 47B, the average value of the opening areas of the sound holes 123*a* (second sound holes) arranged on the side where the opening portion O51 is provided (unit area region C5-1) may be larger than the average value of the opening areas of the sound holes 123*a* (second sound holes) arranged on the side where the opening portion is not provided (unit area region C5-2). Alternatively, as illustrated in FIG. 48A, the sound holes 123*a* (second sound holes) arranged two by two in the direction orthogonal to the circumference C1 may be arranged at equal intervals in the circumference C1 direction on the side on which the opening portion O51 is provided (unit area region C5-1), and the sound holes 123*a* (second sound holes) may be arranged one by one at equal intervals in the circumference C1 direction on the side on which the opening portion is not provided (unit area region C5-2). Alternatively, as illustrated in FIG. 48B, sound holes 123*a* (second sound holes) are arranged on the side where the opening portion O51 is provided (unit area region C5-1), but sound holes 123*a* (second sound holes) may not be arranged on the side where the opening portion is not provided (unit area region C5-2). Even in this case, sound leakage can be effectively reduced.

Sixth Embodiment

In a sixth embodiment, wearing methods of other ear-worn acoustic signal output devices will be exemplified.

Wearing Method 11

Figure 49A:
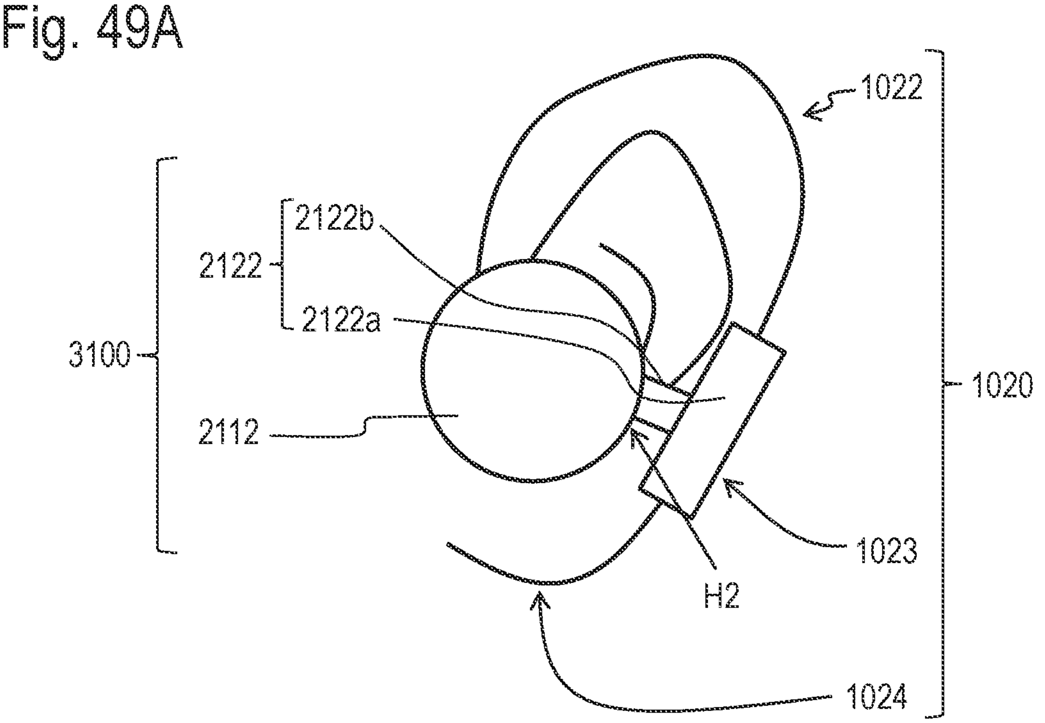
FIG. 49A is a front view for illustrating a modification of an acoustic signal output device according to a sixth embodiment.

As in an acoustic signal output device 3100 illustrated in FIG. 49A, the wearable portion 2121 of the acoustic signal output device 2100 of the wearing method 1 may be omitted.

Wearing Method 12

Figure 49B:
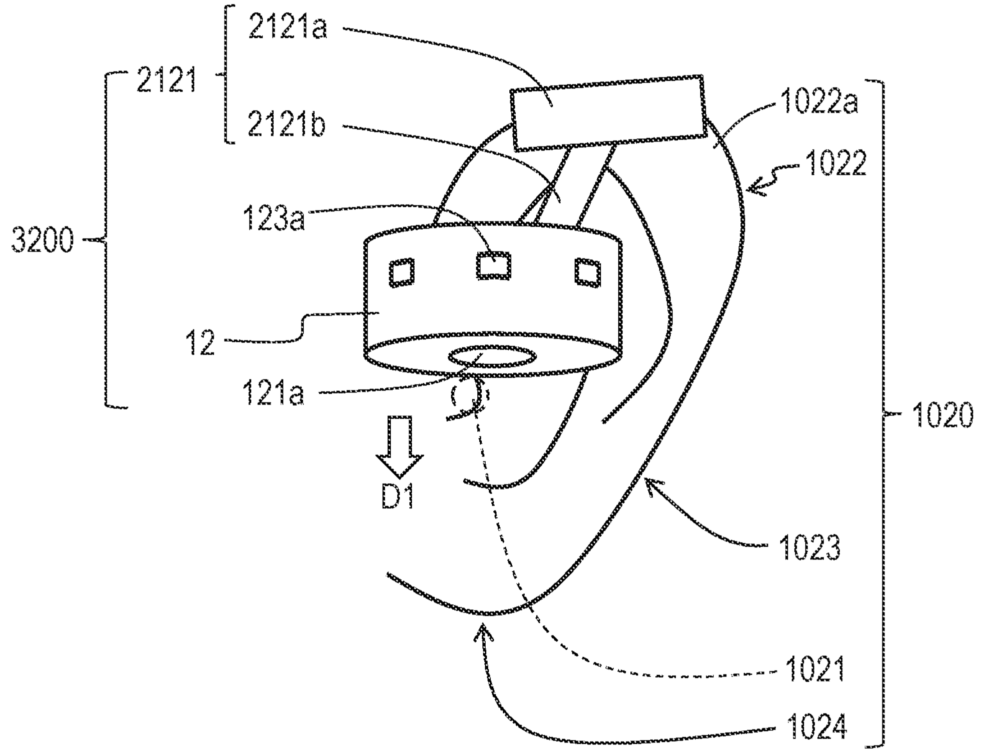
FIG. 49B is a perspective view for illustrating a modification of the acoustic signal output device according to the sixth embodiment.

As in an acoustic signal output device 3200 illustrated in FIG. 49B, the wearable portion 2123 of the acoustic signal output device 2100 of the wearing method 1 may be omitted, and the housing 2112 may be any of the above-described housings 12, 12", 22. However, in this example, when the acoustic signal output device 3200 is worn on the auricle 1020, the opening direction (D1) direction of the sound hole 121*a*, 221*a* of the housing 12, 12", 22 is substantially perpendicular to the direction of the ear canal 1021.

Wearing Method 13

Figure 50A:
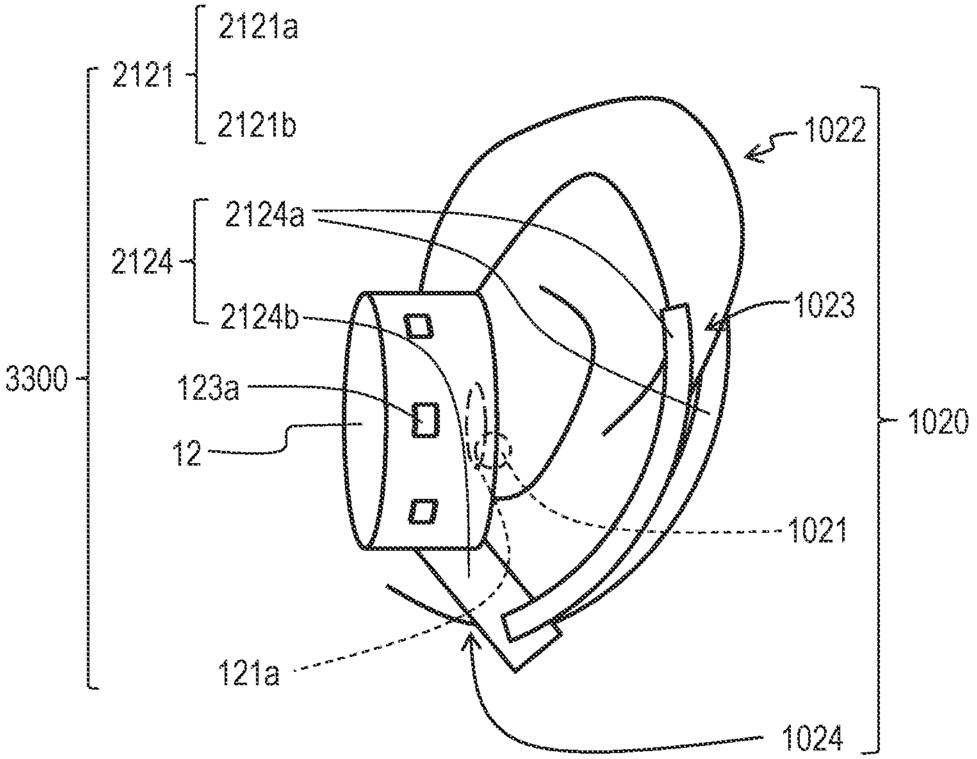
FIG. 50A is a perspective view for illustrating a modification of the acoustic signal output device according to the sixth embodiment.

As in an acoustic signal output device 3300 illustrated in FIG. 50A, the wearable portion 2121 of the acoustic signal output device 2300 of the wearing method 5 may be omitted, and the housing 2112 may be any of the above-described housings 12, 12", 22. In this example, when the acoustic signal output device 3300 is worn on the auricle 1020, the sound hole 121*a*, 221*a* of the housing 12, 12", 22 faces the ear canal 1021 side.

Wearing Method 14

Figure 50B:
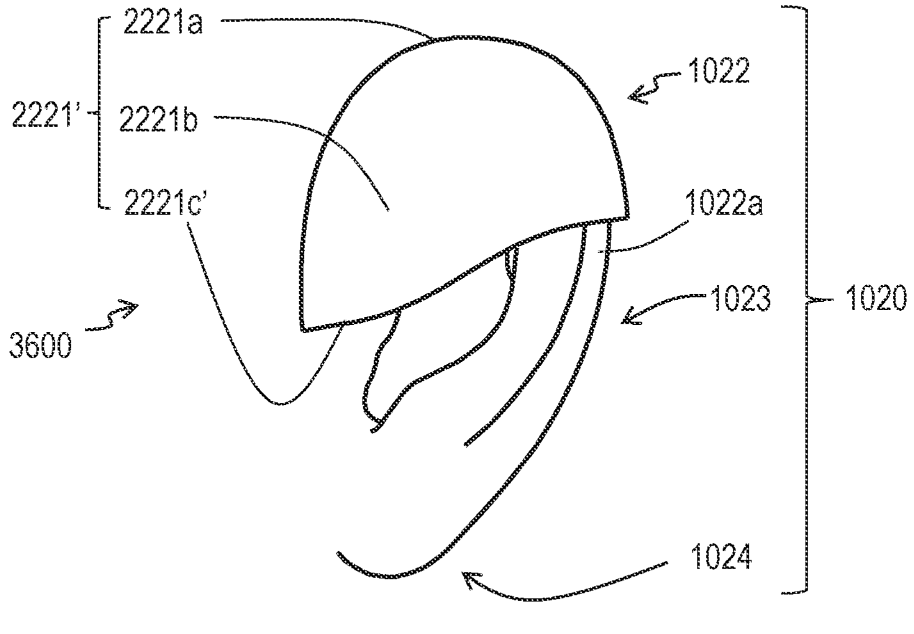
FIG. 50B is a plan view for illustrating a modification of the acoustic signal output device according to the sixth embodiment.

As in an acoustic signal output device 3600 illustrated in FIG. 50B, the wearable portion 2221 of the acoustic signal output device 2500 of the wearing method 8 may be replaced with the wearable portion 2221'. The wearable portion 2221' includes the shielding wall 2221*b* configured to cover the upper portion 1022 of the auricle 1020 when the inner wall surface side of the fixing portion 2221*a* is fitted into the upper portion 1022 of the auricle 1020. An end portion 2221*c*' of the shielding wall 2221*b* is formed in a curved shape, and the region covered with the shielding wall 2221*b* on the helix 1022*a* side of the auricle 1020 is smaller than the region covered with the shielding wall 2221*b* on the base side of the auricle 1020.

Wearing Method 15

Figure 51A:
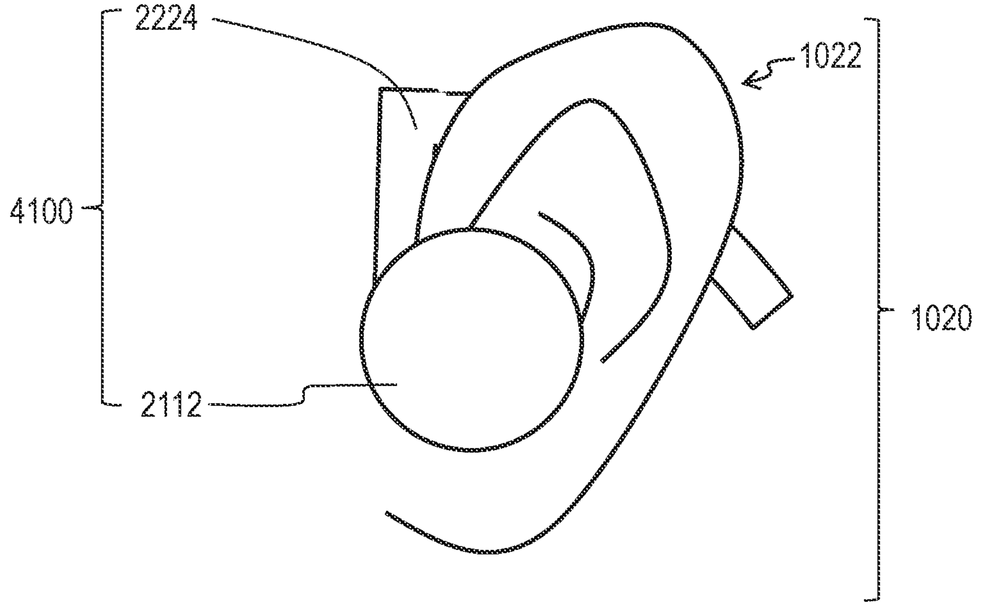
FIG. 51A is a plan view for illustrating a modification of the acoustic signal output device according to the sixth embodiment.

As in an acoustic signal output device 4100 illustrated in FIG. 51A, the wearable portion 2122 of the acoustic signal output device 2200 of the wearing method 4 may be omitted.

Wearing Method 16

Figure 51B:
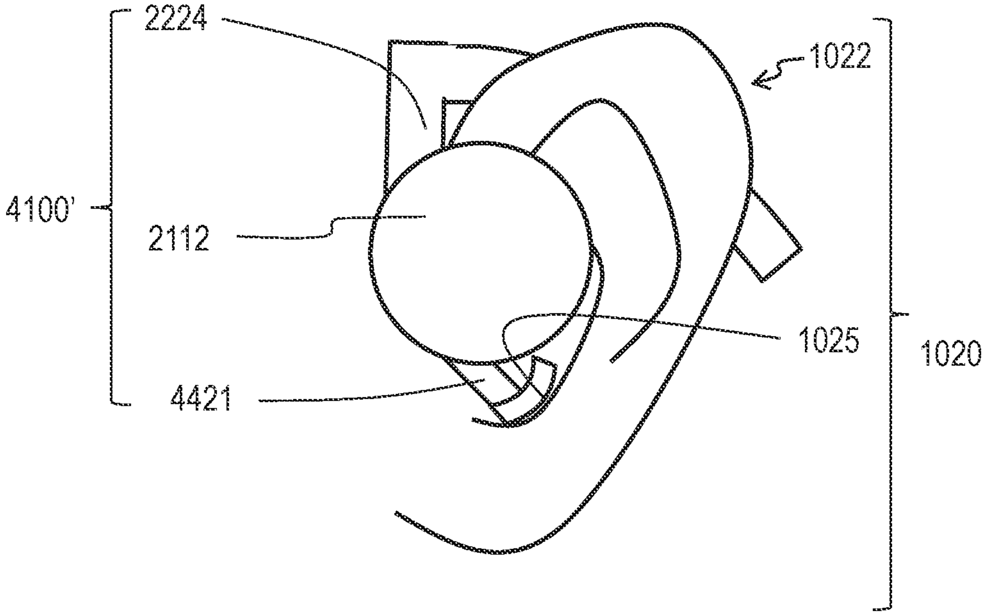
FIG. 51B is a plan view for illustrating a modification of the acoustic signal output device according to the sixth embodiment.

As in an acoustic signal output device 4100' illustrated in FIG. 51B, the wearable portion 2122 of the acoustic signal output device 2200 of the wearing method 4 may be omitted, and a wearable portion 4421 configured to be in contact with a cavum concha 1025 of the auricle 1020 when worn may be further provided. One end of the wearable portion 4421 holds the housing 2112, and the other end of the wearable portion 4421 is configured in a shape capable of supporting the cavum concha 1025 without blocking the ear canal. This enables more stable wearing.

Wearing Method 17

Figure 52A:
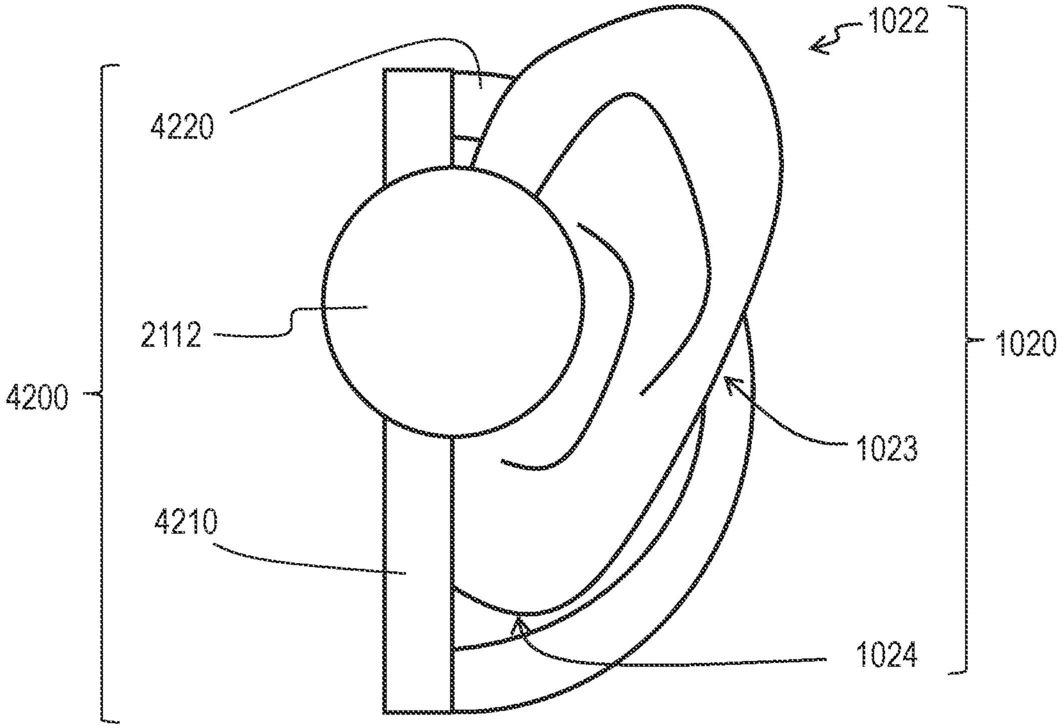
FIG. 52A is a plan view for illustrating a modification of the acoustic signal output device according to the sixth embodiment.

An acoustic signal output device 4200 illustrated in FIG. 52A includes the housing 2112, a columnar wearable portion 4210 that holds the housing 2112 and is configured to be arranged on the base side of the auricle 1020 when worn, and an arc-shaped wearable portion 4220 that is held at both ends of the wearable portion 4210 and is worn on a region from the back side of the upper portion 1022 to the lower portion 1024 of the auricle 1020.

Wearing Method 18

Figure 52B:
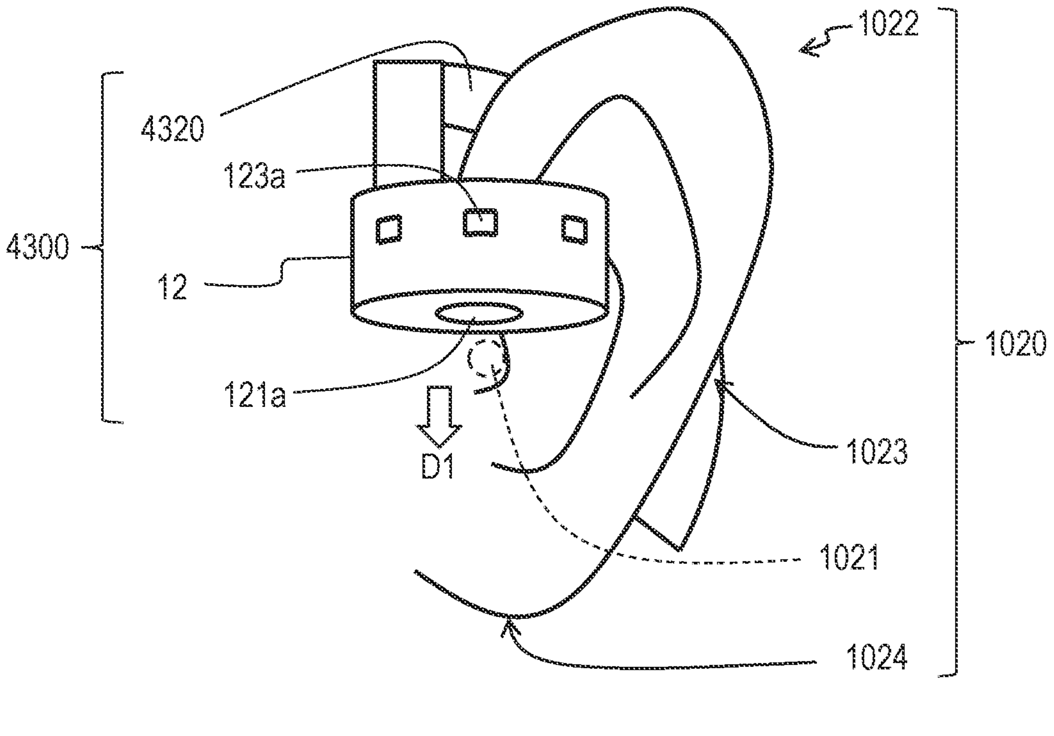
FIG. 52B is a transparent perspective view for illustrating a modification of the acoustic signal output device according to the sixth embodiment.

As in an acoustic signal output device 4300 illustrated in FIG. 52B, the wearable portion 2122 of the acoustic signal output device 2200 of the wearing method 4 may be omitted, and the housing 2112 may be any of the above-described housings 12, 12", 22. However, in this example, when the acoustic signal output device 4300 is worn on the auricle 1020, the opening direction (D1) direction of the sound hole 121*a*, 221*a* of the housing 12, 12", 22 is substantially perpendicular to the direction of the ear canal 1021.

Wearing Method 19

Figure 53A:
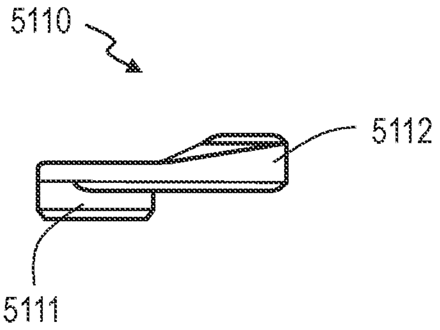
FIG. 53A is a plan view for illustrating a modification of the acoustic signal output device according to the sixth embodiment.
Figure 53B:
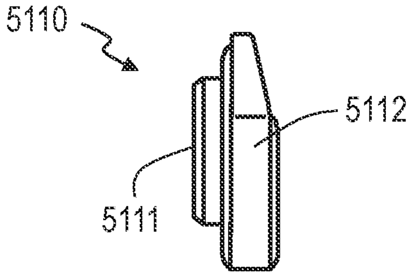
FIG. 53B is a right side view for illustrating the modification of the acoustic signal output device according to the sixth embodiment.
Figure 53C:
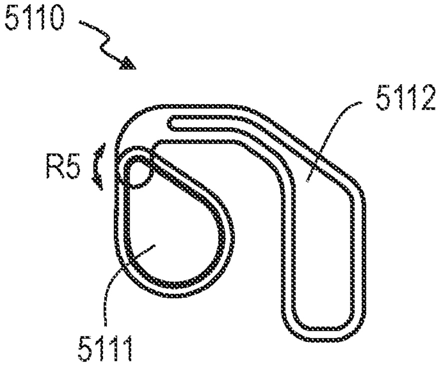
FIG. 53C is a front view for illustrating the modification of the acoustic signal output device according to the sixth embodiment.
Figure 53D:
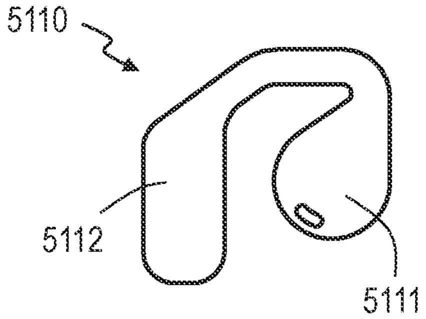
FIG. 53D is a rear view for illustrating the modification of the acoustic signal output device according to the sixth embodiment.
Figure 53E:
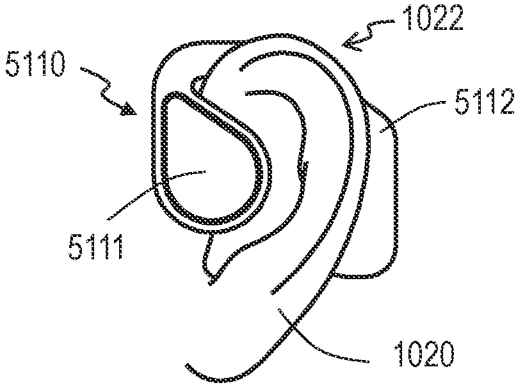
FIG. 53E is a front view for illustrating a use state of the modification of the acoustic signal output device according to the sixth embodiment.

As illustrated in FIGS. 53A to 53E, an acoustic signal output device 5110 of the wearing method 19 includes a housing 5111 that emits an acoustic signal, and a wearable portion 5112 that holds the housing 5111 and is of a type for being hooked on the back side of the upper portion 1022 of the auricle 1020 when worn. The wearable portion 5112 is a bent rod-shaped member, and the housing 5111 is attached to one end thereof so as to be rotatable in an R5 direction. As illustrated in FIG. 53E, the housing 5111 is worn in a state where a sound hole through which an acoustic signal is emitted is directed toward the ear canal without blocking the ear canal. At this time, the auricle 1020 is sandwiched between the housing 5111 and the wearable portion 5112, thereby the acoustic signal output device 5110 is fixed to the auricle 1020. Since the housing 5111 is rotatable in the R5 direction with respect to the one end of the wearable portion 5112, the wearing position and the position of a sound hole can be adjusted according to the size and shape of individual auricle 1020.

Wearing Method 20

Figure 54A:
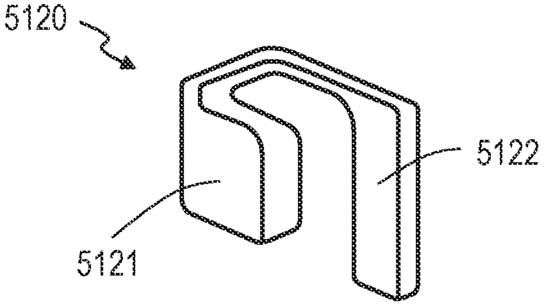
FIG. 54A is a perspective view for illustrating a modification of the acoustic signal output device according to the sixth embodiment.
Figure 54B:
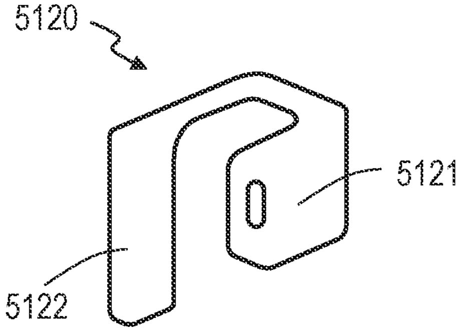
FIG. 54B is a perspective view for illustrating the modification of the acoustic signal output device according to the sixth embodiment.
Figure 54C:
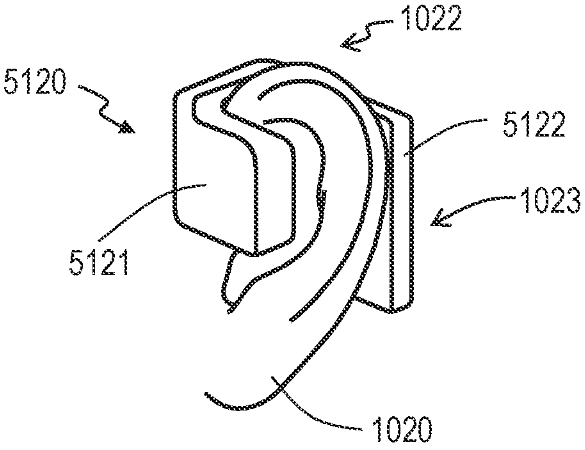
FIG. 54C is a perspective view for illustrating a use state of the modification of the acoustic signal output device according to the sixth embodiment.

As illustrated in FIGS. 54A to 54C, an acoustic signal output device 5120 of the wearing method 20 includes a housing 5121 that emits an acoustic signal, and a wearable portion 5122 that holds the housing 5121 and is of a type for being hooked on the back side of the upper portion 1022 of the auricle 1020 when worn. Unlike the wearing method 19, the housing 5121 is not rotatable to the wearable portion 5122. As illustrated in FIG. 54C, the housing 5121 is worn in a state where a sound hole through which an acoustic signal is emitted is directed toward the ear canal without blocking the ear canal. At this time, the auricle 1020 is sandwiched between the housing 5121 and the wearable portion 5122, thereby the acoustic signal output device 5120 is fixed to the auricle 1020.

Wearing Method 21

Figure 55A:
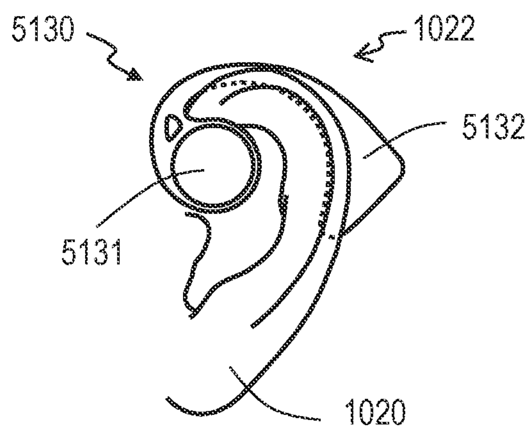
FIGS. 55A and 55B are front views for illustrating use states of modifications of the acoustic signal output device according to the sixth embodiment.
Figure 55B:
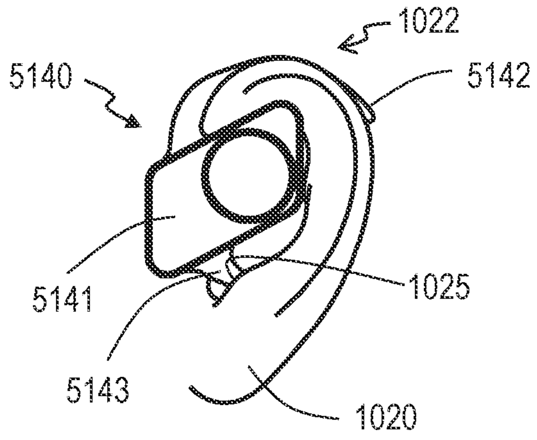

As illustrated in FIGS. 55A and 55B, an acoustic signal output device 5130, 5140 of the wearing method 21 includes a housing 5131, 5141 that emits an acoustic signal, and a wearable portion 5132, 5142 that holds the housing 5131, 5141 and is of a type for being hooked on the back side of the upper portion 1022 of the auricle 1020 when worn. The acoustic signal output device 5140 illustrated in FIG. 55B further includes a wearable portion 5143 configured to be in contact with the cavum concha 1025 of the auricle 1020 when worn. This enables more stable wearing.

Wearing Method 22

Figure 56A:
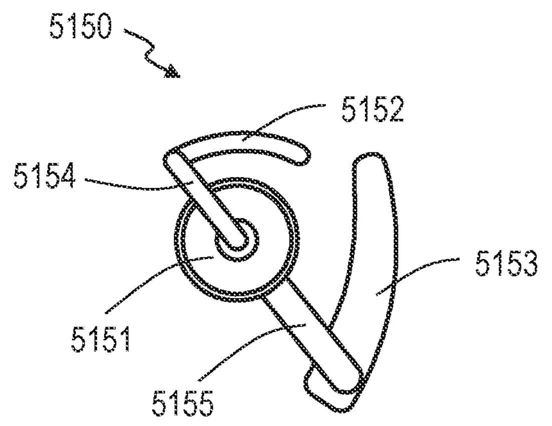
FIG. 56A is a front view for illustrating a modification of the acoustic signal output device according to the sixth embodiment.
Figure 56B:
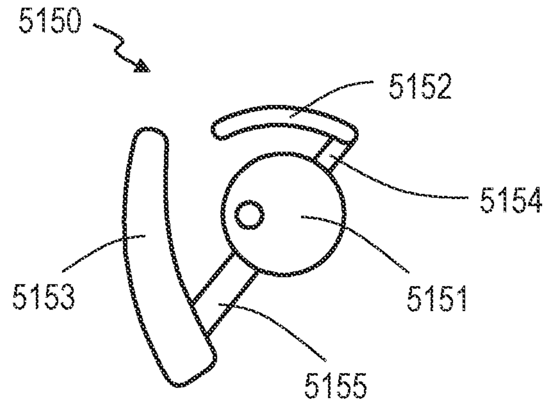
FIG. 56B is a rear view for illustrating the modification of the acoustic signal output device according to the sixth embodiment.
Figure 56C:
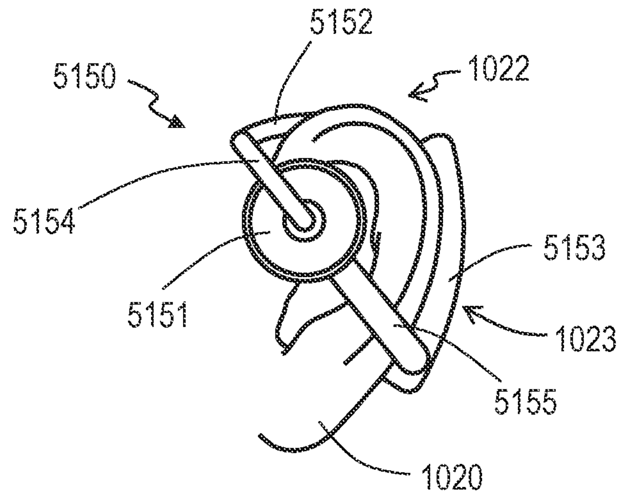
FIG. 56C is a front view for illustrating a use state of the modification of the acoustic signal output device according to the sixth embodiment.

An acoustic signal output device 5150 illustrated in FIGS. 56A, 56B, and 56C includes a housing 5151 that emits an acoustic signal, a rod-shaped wearable portion 5152 that holds the housing 5151 and is of a type for being hooked on the back side of the upper portion 1022 of the auricle 1020 when worn, a columnar support portion 5154 that holds the housing 5151 at one end and holds the wearable portion 5152 at the other end, a rod-shaped wearable portion 5153 of a type for being hooked from the intermediate portion 1023 side on the back side of the intermediate portion 1023 and the upper portion 1022 of the auricle 1020 when worn, and a columnar support portion 5155 that holds the housing 5151 at one end and holds the wearable portion 5153 at the other end. As illustrated in FIG. 56C, the housing 5151 is worn in a state where a sound hole through which an acoustic signal is emitted is directed toward the ear canal without blocking the ear canal. At this time, the auricle 1020 is sandwiched between the housing 5151 and the wearable portions 5152, 5153, thereby the acoustic signal output device 5150 is fixed to the auricle 1020.

Wearing Method 23

Figure 57A:
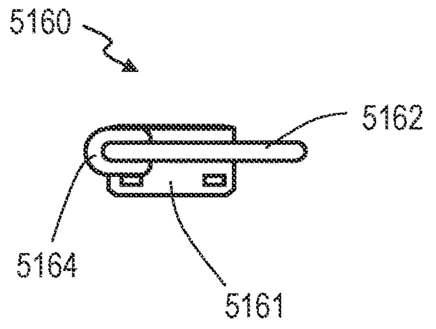
FIG. 57A is a plan view for illustrating a modification of the acoustic signal output device according to the sixth embodiment.
Figure 57B:
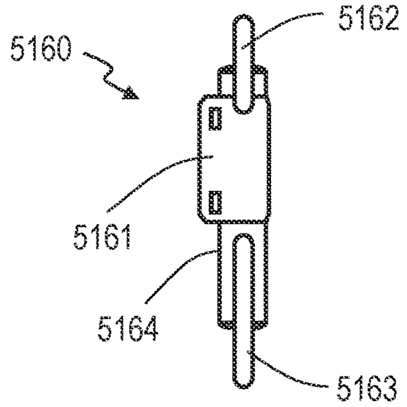
FIG. 57B is a right side view for illustrating the modification of the acoustic signal output device according to the sixth embodiment.
Figure 57C:
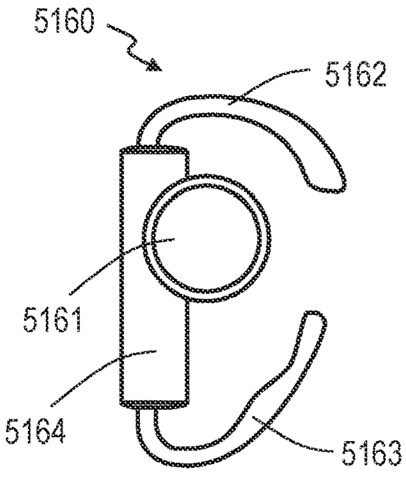
FIG. 57C is a front view for illustrating the modification of the acoustic signal output device according to the sixth embodiment.
Figure 57D:
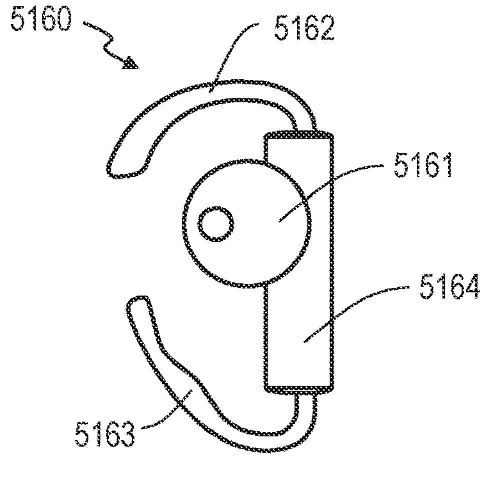
FIG. 57D is a rear view for illustrating the modification of the acoustic signal output device according to the sixth embodiment.
Figure 57E:
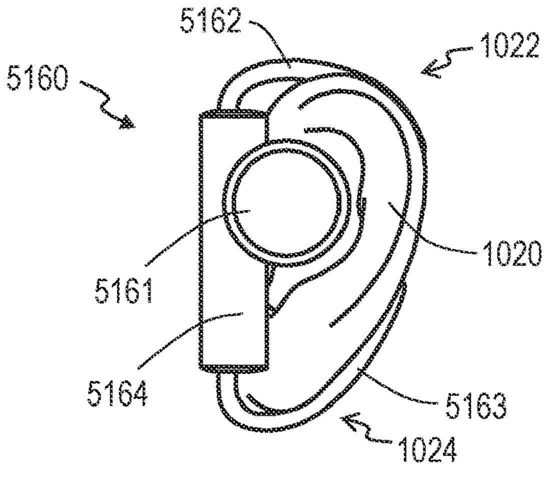
FIG. 57E is a front view for illustrating a use state of the modification of the acoustic signal output device according to the sixth embodiment.

An acoustic signal output device 5160 illustrated in FIGS. 57A to 57E includes a housing 5161 that emits an acoustic signal, a columnar wearable portion 5164 that holds the housing 5161 and configured to be arranged on the base side of the auricle 1020 when worn, a rod-shaped wearable portion 5162 that is held by one end of the wearable portion 5164 and is of a type for being hooked on the back side of the upper portion 1022 of the auricle 1020 when worn, and a rod-shaped wearable portion 5163 that is held by the other end of the wearable portion 5164 and is of a type for being hooked on the back side of lower portion 1024 of the auricle 1020 when worn. As illustrated in FIG. 57E, the housing 5161 is worn in a state where a sound hole through which an acoustic signal is emitted is directed toward the ear canal without blocking the ear canal. At this time, the auricle 1020 is sandwiched between the housing 5161 and the wearable portion 5164 and the wearable portions 5162, 5163, thereby the acoustic signal output device 5160 is fixed to the auricle 1020.

Wearing Method 24

Figure 58A:
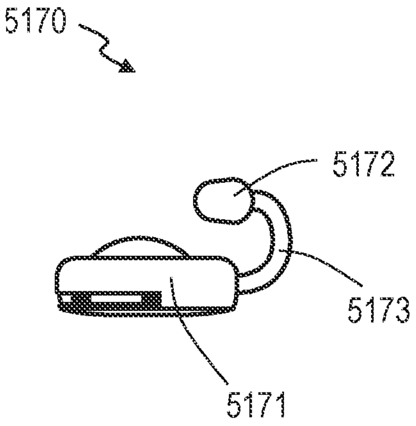
FIG. 58A is a plan view for illustrating a modification of the acoustic signal output device according to the sixth embodiment.
Figure 58B:
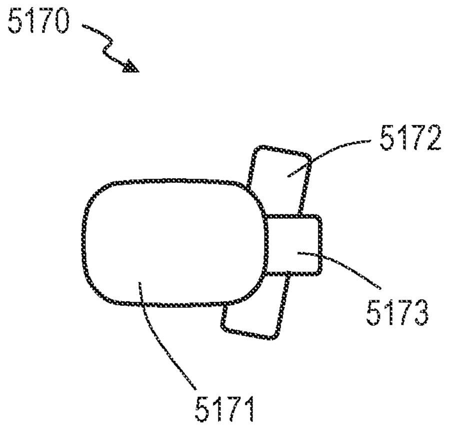
FIG. 58B is a front view for illustrating the modification of the acoustic signal output device according to the sixth embodiment.
Figure 58C:
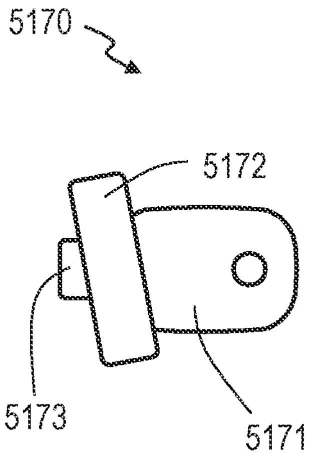
FIG. 58C is a rear view for illustrating the modification of the acoustic signal output device according to the sixth embodiment.
Figure 58D:
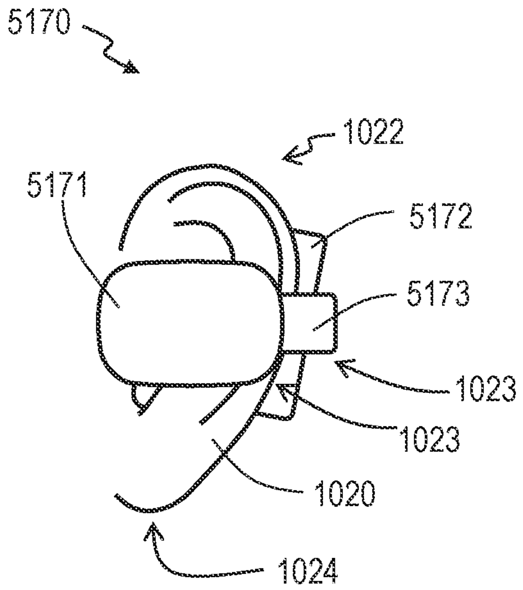
FIG. 58D is a front view for illustrating a use state of the modification of the acoustic signal output device according to the sixth embodiment.
Figure 59A:
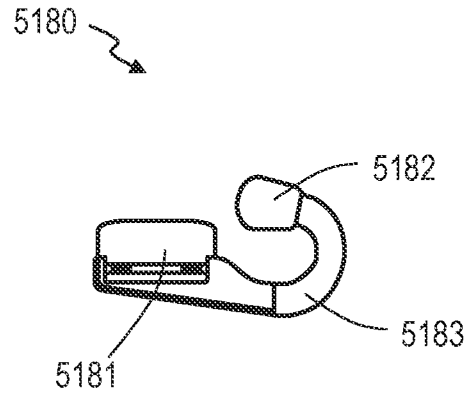
FIG. 59A is a plan view for illustrating a modification of the acoustic signal output device according to the sixth embodiment.
Figure 59B:
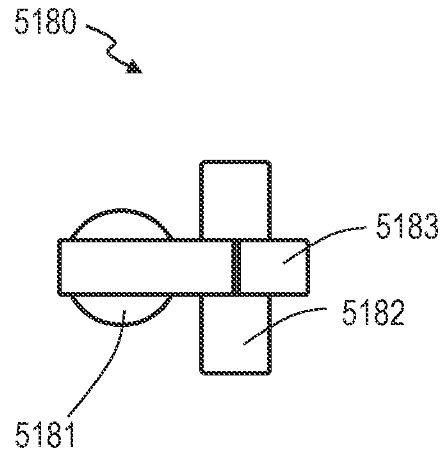
FIG. 59B is a front view for illustrating the modification of the acoustic signal output device according to the sixth embodiment.
Figure 59C:
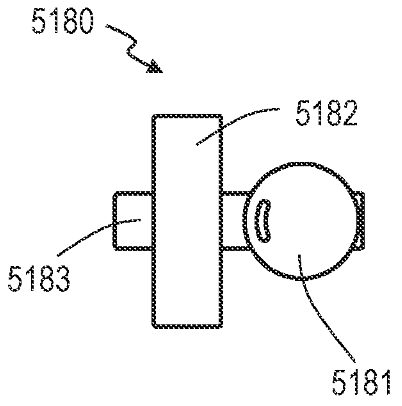
FIG. 59C is a rear view for illustrating the modification of the acoustic signal output device according to the sixth embodiment.
Figure 59D:
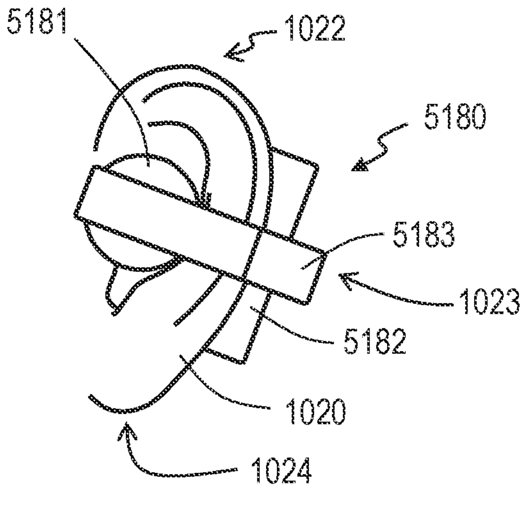
FIG. 59D is a front view for illustrating a use state of the modification of the acoustic signal output device according to the sixth embodiment.

An acoustic signal output device 5170, 5180 illustrated in FIGS. 58A to 58D and FIGS. 59A to 59D includes a housing 5171, 5181 that emits an acoustic signal, a columnar wearable portion 5172, 5182 configured to be arranged on the back side of the intermediate portion 1023 of the auricle 1020 when worn, and a curved belt-shaped support portion 5173, 5183 including one end that holds the housing 5171, 5181 and the other end that holds the wearable portion 5172, 5182. As illustrated in FIGS. 58D and 59D, the housing 5171, 5181 is worn in a state where a sound hole through which an acoustic signal is emitted is directed toward the ear canal without blocking the ear canal. At this time, the auricle 1020 is sandwiched between the housing 5171, 5181 and the wearable portion 5172, 5182, thereby the acoustic signal output device 5170, 5180 is fixed to the auricle 1020.

Wearing Method 25

Figure 60A:
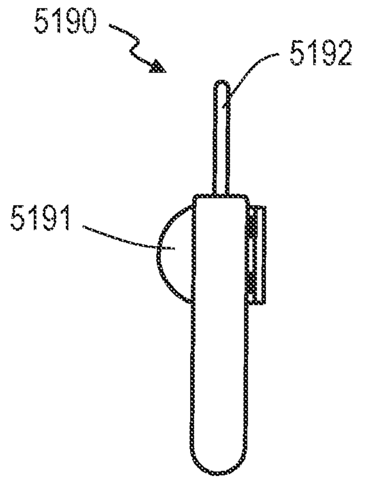
FIG. 60A is a left side view for illustrating a modification of the acoustic signal output device according to the sixth embodiment.
Figure 60B:
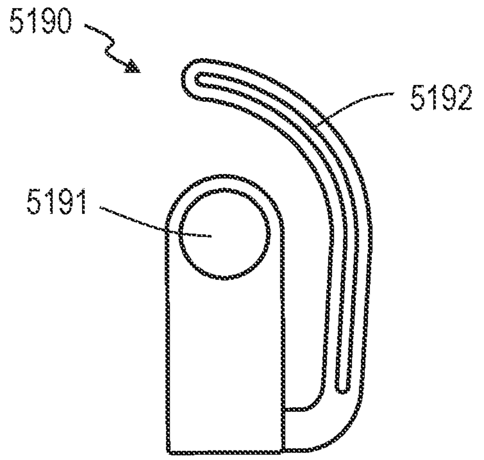
FIG. 60B is a front view for illustrating the modification of the acoustic signal output device according to the sixth embodiment.
Figure 60C:
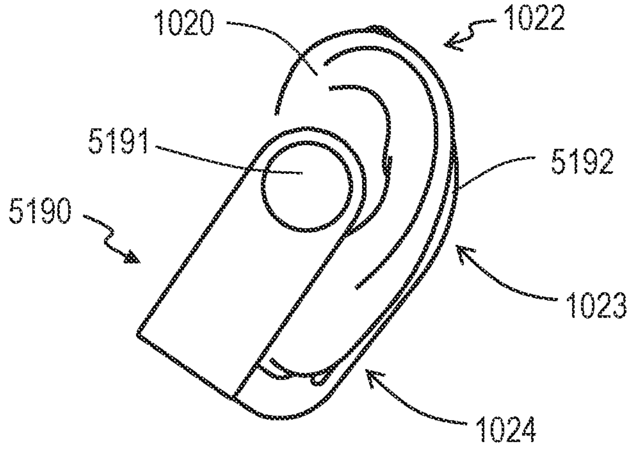
FIG. 60C is a front view for illustrating a use state of the modification of the acoustic signal output device according to the sixth embodiment.

An acoustic signal output device 5190 illustrated in FIGS. 60A to 60C includes a housing 5191 that emits an acoustic signal, and a rod-shaped wearable portion 5192 that holds the housing 5191 and is configured to be arranged on the back side of the auricle 1020 when worn. The wearable portion 5192 holds the housing 5191 at one end on the side arranged on the lower portion 1024 side of the auricle 1020 when worn. As illustrated in FIG. 60C, the housing 5191 is worn in a state where a sound hole through which an acoustic signal is emitted is directed toward the ear canal without blocking the ear canal. At A this time, the auricle 1020 is sandwiched between the housing 5191 and the wearable portion 5192, thereby the acoustic signal output device 5190 is fixed to the auricle 1020.

Wearing Method 26

Figure 61A:
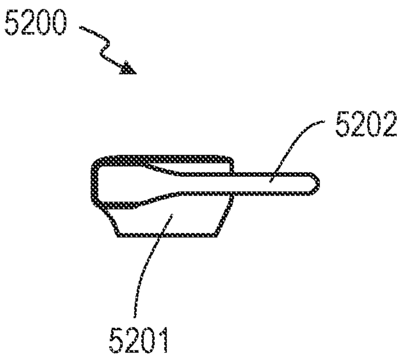
FIG. 61A is a plan view for illustrating a modification of the acoustic signal output device according to the sixth embodiment.
Figure 61B:
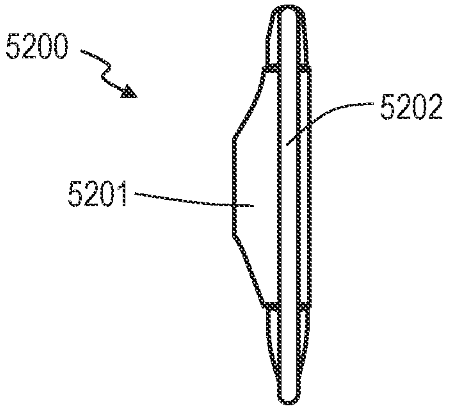
FIG. 61B is a right side view for illustrating the modification of the acoustic signal output device according to the sixth embodiment.
Figure 61C:
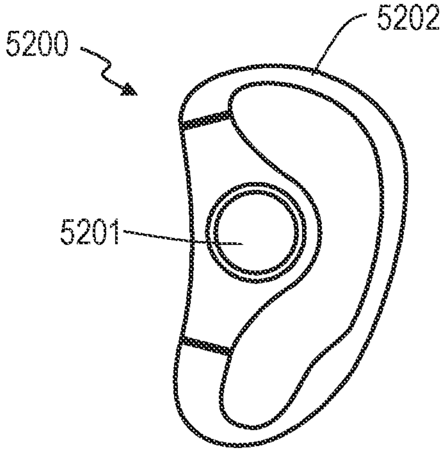
FIG. 61C is a front view for illustrating the modification of the acoustic signal output device according to the sixth embodiment.
Figure 61D:
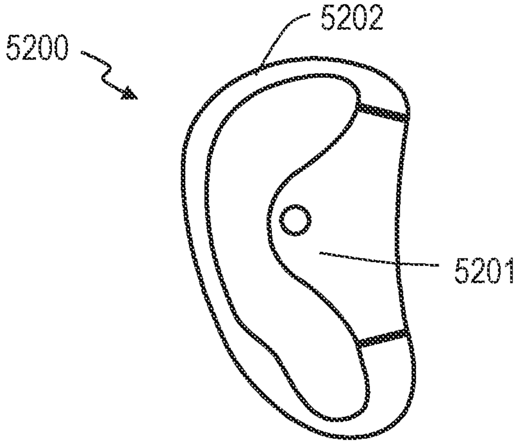
FIG. 61D is a rear view for illustrating the modification of the acoustic signal output device according to the sixth embodiment.
Figure 61E:
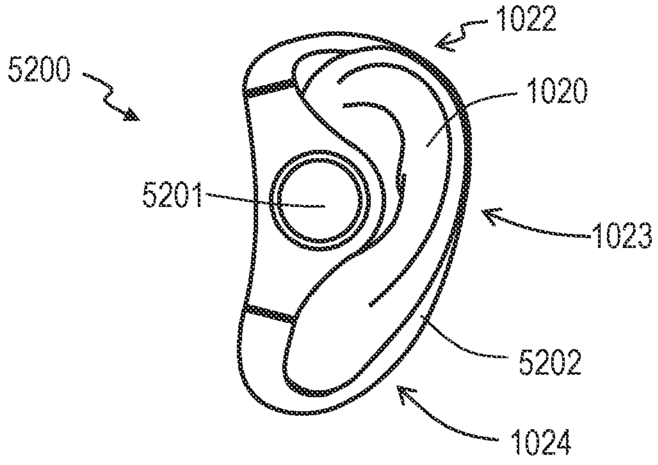
FIG. 61E is a front view for illustrating a use state of the modification of the acoustic signal output device according to the sixth embodiment.

An acoustic signal output device 5200 illustrated in FIGS. 61A to 61E includes a housing 5201 that emits an acoustic signal and an annular wearable portion 5202 that holds the housing 5021. As illustrated in FIG. 61E, the housing 5201 is worn in a state where a sound hole through which an acoustic signal is emitted is directed toward the ear canal without blocking the ear canal. The auricle 1020 is inserted into the annular wearable portion 5202 in wearing, and the wearable portion 5202 is arranged on the back side of the upper portion 1022, the intermediate portion 1023, and the lower portion 1024 of the auricle 1020. At this time, the auricle 1020 is sandwiched between the housing 5201 and the wearable portion 5202, thereby the acoustic signal output device 5200 is fixed to the auricle 1020.

Wearing Method 27

Figure 62A:
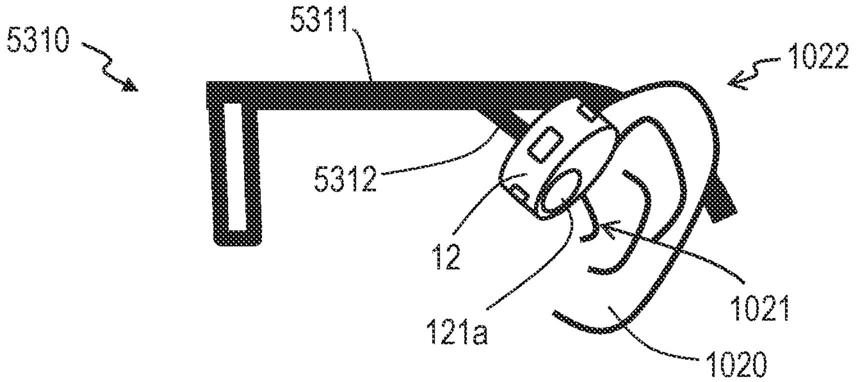
FIGS. 62A and 62B are conceptual views for illustrating a modification of the acoustic signal output device according to the sixth embodiment.
Figure 64A:
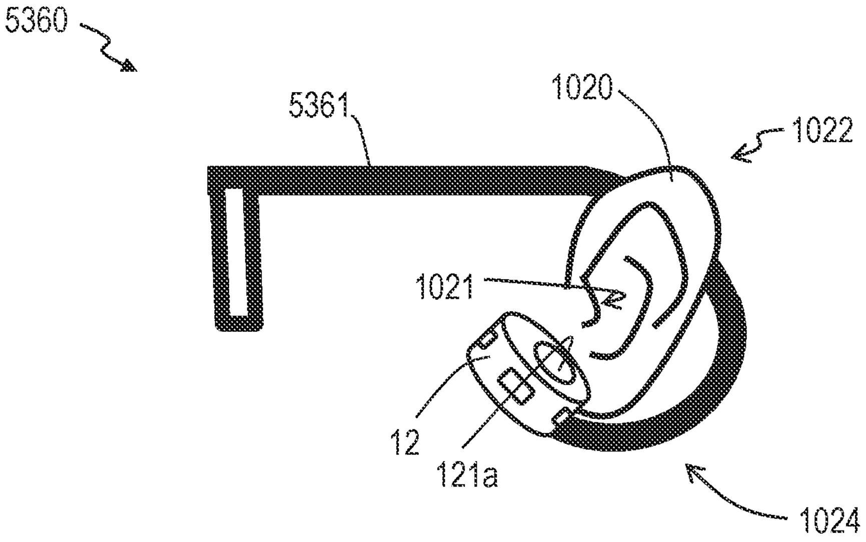
FIGS. 64A and 64B are conceptual views for illustrating a modification of the acoustic signal output device according to the sixth embodiment.
Figure 64B:
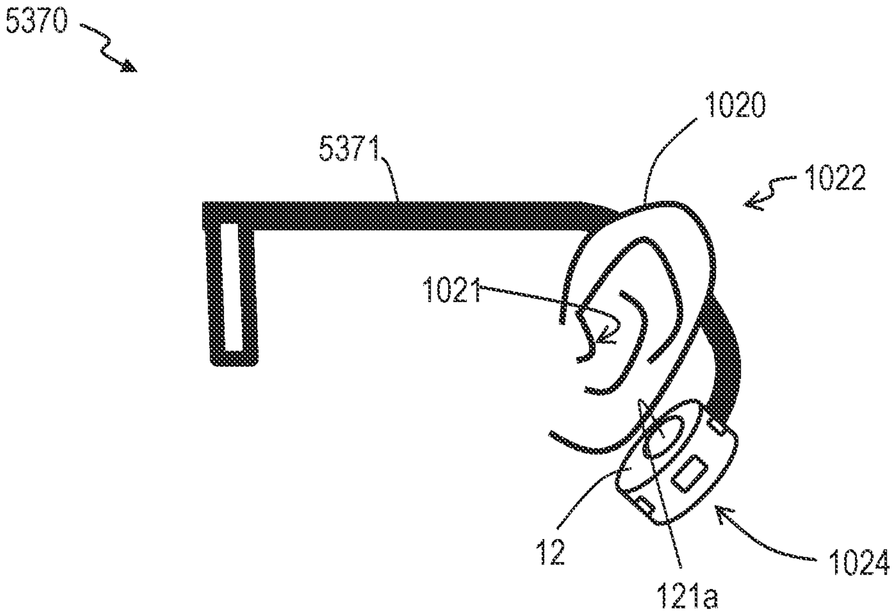

As illustrated in FIGS. 62A and 64B, an acoustic signal output device may be an acoustic signal output device of a type in which any one of the housings 12, 12", 22 illustrated in the first to fourth embodiments and the modifications thereof is fixed to a temple of glasses.

Figure 62B:
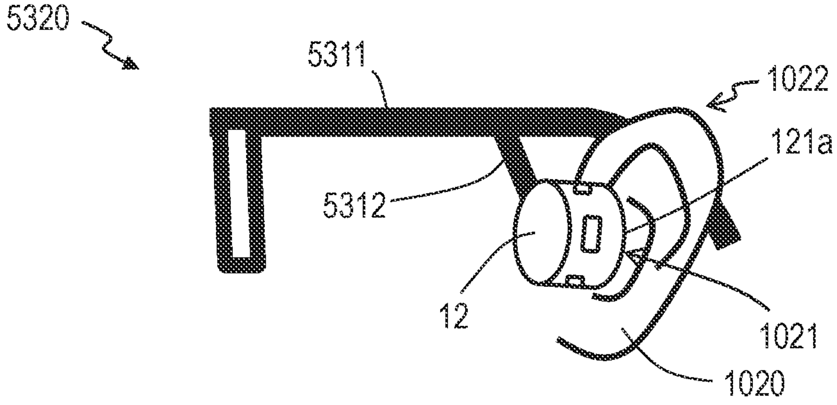

In an acoustic signal output device 5310, 5320 illustrated in FIGS. 62A and 62B, one end of a support portion 5312 is held in a middle portion of a temple 5311 of glasses, and the other end of the support portion 5312 holds the housing 12. In any of the acoustic signal output device 5310, 5320, the temple 5311 of the glasses is arranged on the back side of the upper portion 1022 of the auricle 1020 when worn. However, in the acoustic signal output device 5310 illustrated in FIG. 62A, the opening direction of the sound hole 121*a* of the housing 12 is arranged to be inclined with respect to the ear canal 1021 when worn. On the other hand, in the example of the acoustic signal output device 5320 illustrated in FIG. 62B, the sound hole 121*a* of the housing 12 is arranged toward the ear canal 1021 side when worn.

Figure 63A:
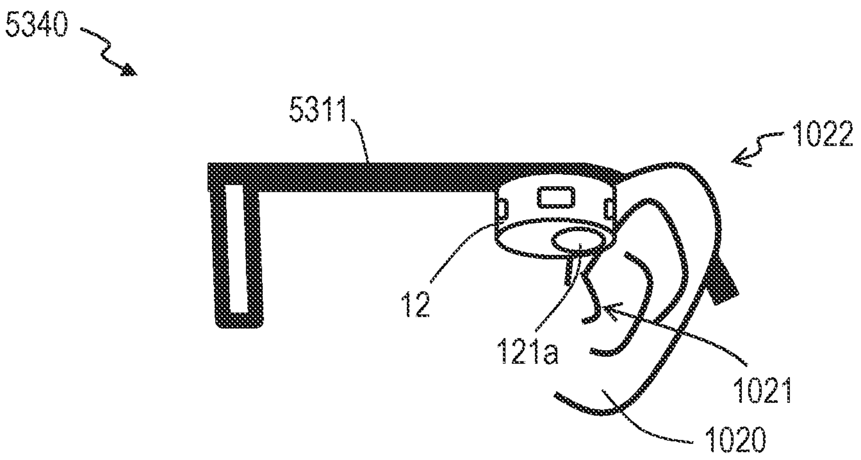
FIGS. 63A and 63B are conceptual views for illustrating a modification of the acoustic signal output device according to the sixth embodiment.
Figure 63B:
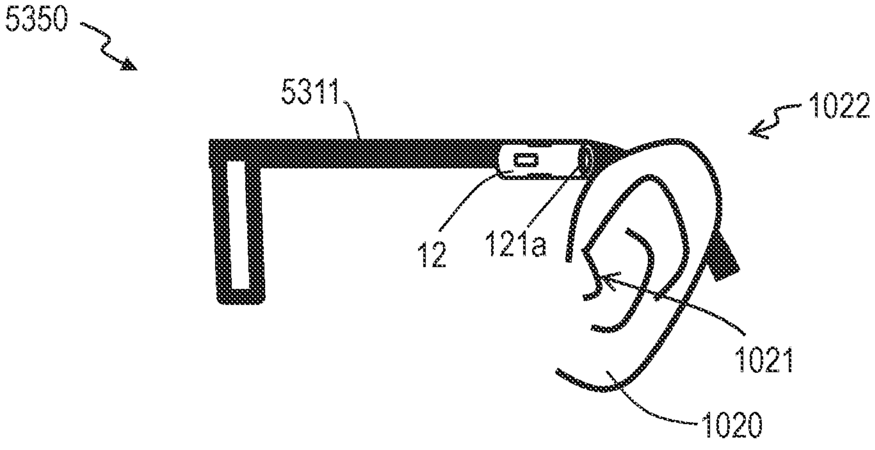

In an acoustic signal output device 5340, 5350 illustrated in FIGS. 63A and 63B, the housing 12 is directly held in a middle portion of the temple 5311 of glasses. In any of the acoustic signal output device 5340, 5350, the temple 5311 of the glasses is arranged on the back side of the upper portion 1022 of the auricle 1020 when worn. However, in the acoustic signal output device 5340 illustrated in FIG. 63A, the housing 12 is held by the temple 5311 such that the opening direction of the sound hole 121*a* of the housing 12 is substantially perpendicular to the temple 5311, and the opening direction of the sound hole 121*a* of the housing 12 is arranged to be substantially perpendicular to the ear canal 1021 when worn. On the other hand, in the acoustic signal output device 5350 illustrated in FIG. 63B, the housing 12 is held by the temple 5311 such that the opening direction of the sound hole 121*a* of the housing 12 is substantially parallel to the temple 5311, and the opening direction of the sound hole 121*a* of the housing 12 is arranged to face the upper portion 1022 of the auricle 1020 when worn.

In an acoustic signal output device 5360, 5370 illustrated in FIGS. 64A and 64B, the housing 12 is directly held at a tip portion of a temple 5361, 5371 of glasses. In any of the acoustic signal output device 5360, 5370, the temple 5361 of the glasses is arranged on the back side of the upper portion 1022 of the auricle 1020 when worn. However, in the acoustic signal output device 5360 illustrated in FIG. 64A, the opening direction of the sound hole 121*a* of the housing 12 is arranged to face the ear canal 1021 side from the base side of the lower portion 1024 of the auricle 1020 when worn. In the acoustic signal output device 5370 illustrated in FIG. 64B, the opening direction of the sound hole 121*a* of the housing 12 is arranged to face the ear canal 1021 side from the outside of the lower portion 1024 of the auricle 1020 when worn.

Wearing Method 28

Figure 65A:
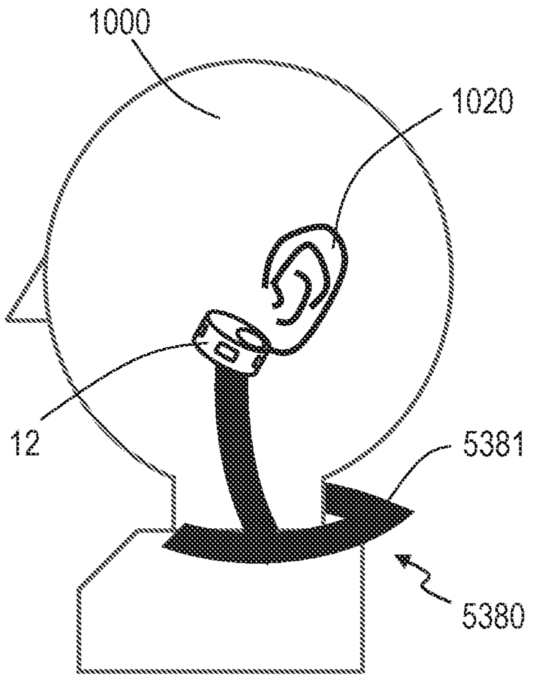
FIGS. 65A to 65C are conceptual views for illustrating a modification of the acoustic signal output device according to the sixth embodiment.
Figure 65B:
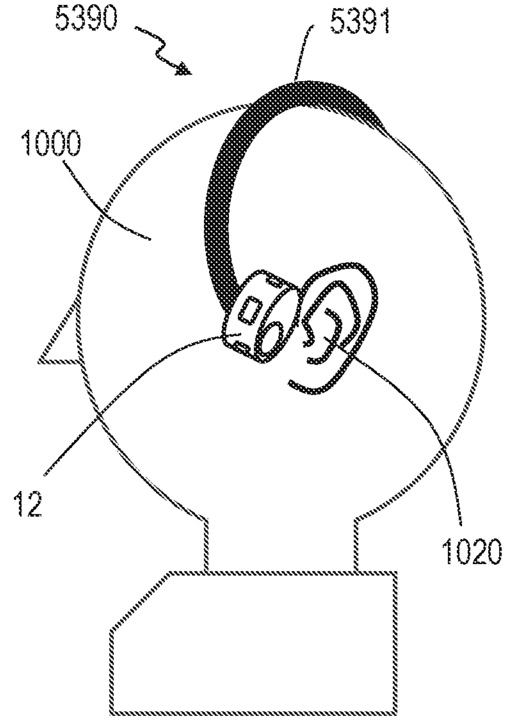
Figure 65C:
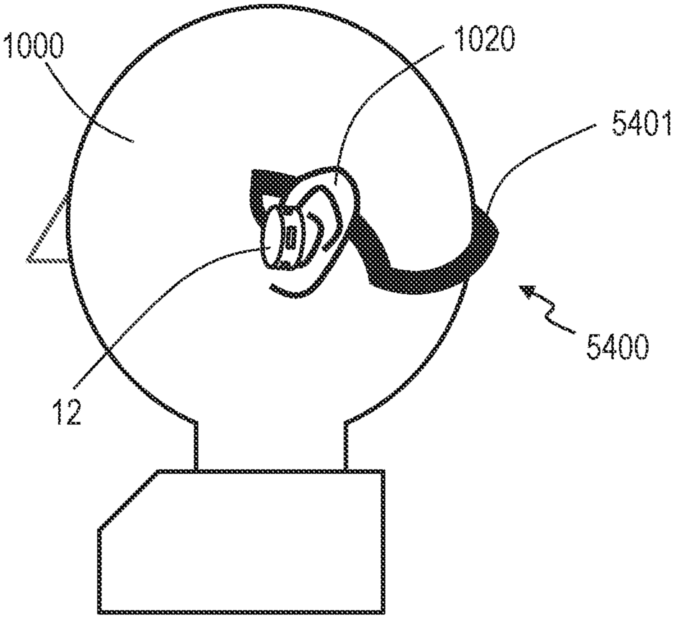

As in the acoustic signal output device 5380 illustrated in FIG. 65A, any one of the housings 12, 12", 22 illustrated in the first to fourth embodiments and the modifications thereof may be fixed to a rod-shaped wearable portion 5381 curved in a shape to be worn on the neck or the shoulder of the user 1000. As in the acoustic signal output device 5390 illustrated in FIG. 65B, any one of the housings 12, 12", 22 may be fixed to a rod-shaped wearable portion 5391 curved in a shape to be worn on the top of the head of the user 1000. As in the acoustic signal output device 5400 illustrated in FIG. 65C, any one of the housings 12, 12", 22 may be fixed to a rod-shaped wearable portion 5401 curved in a shape to be worn on the back of the head and the auricle 1020 of the user 1000.

Other Wearing Methods

An existing wearing method of an open-ear earphone may be applied to the acoustic signal output device 4, 4', 10, 20, 30 exemplified in the first to fourth embodiments and the modifications thereof. For example, as exemplified in Reference Document 1 (https://www.sony.jp/headphone/products/STH40D/feature 1.html), an annular ring body serving as a stopper may be added on the D1 direction side of the housing 12, 12", 22 or the acoustic signal output unit 40-1, 40-2, and a U-shaped wearable portion may be added on the opposite side to the D1 direction of the housing 12, 12", 22 or the acoustic signal output unit 40-1, 40-2. In this case, by the annular ring body being placed on a peripheral portion (for example, concha auriculae) of the external acoustic opening and the lower portion of the auricle being sandwiched by the U-shaped wearable portion, the housing 12, 12", 22 or the acoustic signal output unit 40-1, 40-2 is worn on the auricle. In particular, in a case where the wearing method of Reference Document 1 is applied to the acoustic signal output device 20 of the second embodiment, an annular ring body serving as a stopper is required to be added on the D1 direction side of the housing 22, and the U-shaped wearable portion added on the D2 direction side of the housing 22 is required to also serve as the waveguides 24, 25 and the housing 23 (FIG. 20).

For example, as exemplified in Reference Document 2 (https://www.bose.com/en_us/products/headphones/earbuds/sport-open-earbuds.html#v=sport_open_earbuds_black), the housing 12, 12", 22 or the audio signal output unit 40-1, 40-2 may be formed in a substantially elliptical columnar shape, and a J-shaped wearable portion may be provided in the housing 12, 12", 22 or the acoustic signal output unit 40-1, 40-2. In this case, by the D1 direction side of the housing 12, 12", 22 or the acoustic signal output unit 40-1, 40-2 being placed on the front side (external acoustic opening side) of the upper portion of the auricle, and the J-shaped wearable portion being hooked on the back side of the upper portion of the auricle, the housing 12, 12", 22 or the acoustic signal output unit 40-1, 40-2 is worn on the auricle.

For example, as exemplified in Reference Document 3 (https://ambie.co.jp/soundearcuffs/tws/), the housing 12, 12", 22 or the acoustic signal output unit 40-1, 40-2 may be formed in a substantially spherical shape, and the side opposite to the D1 direction of the housing 12, 12", 22 or the acoustic signal output unit 40-1, 40-2 may be held on one end side of a C-shaped wearable portion. The other end of the C-shaped wearable portion may also be configured in a substantially spherical shape. In this case, by the D1 direction side of the housing 12, 12", 22 or the acoustic signal output unit 40-1, 40-2 being placed on a peripheral portion (for example, concha auriculae) of the external acoustic opening, and the C-shaped wearable portion gripping (sandwiching) the intermediate portion of the auricle, the housing 12, 12", 22 or the acoustic signal output unit 40-1, 40-2 is worn on the auricle.

For example, as exemplified in Reference Document 4 (https://www.jabra.jp/bluetooth-headsets/jabra-elite-active-45e##100-99040000-40), a sound guide tube for directing an acoustic signal emitted from the sound hole 121*a*, 221*a* toward the external acoustic opening may be added to the sound hole 121*a*, 221*a* of the housing 12, 12", 22 or the acoustic signal output unit 40-1, 40-2.

For example, as exemplified in Reference Document 5 (https://www.audio-technica.co.jp/product/ATH-EW9), a semicircular wearable portion (ear hanger) including an adjustment mechanism (slide fit mechanism) for adjusting the position of the worn housing 12, 12", 22 or the acoustic signal output unit 40-1, 40-2 with respect to the auricle may be provided. In this case, by the D1 direction side of the housing 12, 12", 22 or the acoustic signal output unit 40-1, 40-2 being placed on the front side of the upper portion of the auricle, and the semicircular wearable portion being hooked on the back side of the upper portion of the auricle, the housing 12, 12", 22 or the acoustic signal output unit 40-1, 40-2 is worn on the auricle. By the adjustment mechanism being operated in this state, the position of the worn housing 12, 12", 22 or the acoustic signal output unit 40-1, 40-2 with respect to the auricle can be adjusted.

For example, as exemplified in Reference Document 6 (https://www.mu6.live/), a headband type wearable portion may be provided in the housing 12, 12", 22 or the acoustic signal output unit 40-1, 40-2. For example, both ends of the headband type wearable portion may each hold the housing 12, 12", 22 or the acoustic signal output unit 40-1, 40-2. At this time, the housing 12, 12", 22 or the acoustic signal output unit 40-1, 40-2 may be rotatable with respect to each of both ends of the headband type wearable portion. In this case, the D1 direction side of the housing 12, 12", 22 or the acoustic signal output unit 40-1, 40-2 is placed on the auricle in the vicinity of the auricle, and the headband type wearable portion is worn on the head. At this time, by the housing 12, 12", 22 or the acoustic signal output unit 40-1, 40-2 being rotated with respect to the headband type wearable portion, the wearing position of the headband type wearable portion and the position of the housing 12, 12", 22 or the acoustic signal output unit 40-1, 40-2 with respect to the auricle can be adjusted.

Other Modifications and Like

Note that the present invention is not limited to the embodiments described above. For example, in each of the above-described embodiments and modifications thereof, an example has been described in which the present invention is applied to a device for acoustic listening (for example, open-ear earphone, headphone, or the like) worn on the ear without sealing the ear canal of the user. However, this does not limit the present invention, and the present invention may be applied to a device for acoustic listening that is worn on a body part other than the ear without sealing the ear canal of the user, such as a bone conduction earphone or a neck speaker earphone.

For example, the present invention may be used as an acoustic signal output device capable of controlling an attenuation rate of an acoustic signal emitted to the outside without including a sound absorbing material in a sound hole through which an acoustic signal emitted from a driver unit passes. For example, the present invention may also be used as an acoustic signal output device capable of attenuating an acoustic signal emitted from a driver unit such that the acoustic signal cannot be heard at a predetermined position without performing orientation control by a physical shape or signal processing. For example, the present invention may also be used as an acoustic signal output device capable of attenuating an acoustic signal at a point where the acoustic signal is to be attenuated without a speaker being provided at the point. For example, the present invention may also be used as an acoustic signal output device capable of locally reproducing an acoustic signal in a specific local region without the periphery of the local region being covered with a sound absorbing material.

REFERENCE SIGNS LIST

- 4, 4', 10, 20, 30, 2100-2600, 3100-3300, 3600, 4100-4300, 5110-5200, 5310-5400 Acoustic signal output device
- 11 Driver unit
- 113 Diaphragm
- 12, 12", 22, 23, 2112, 5021, 5111, 5121, 5131, 5151, 5161, 5171, 5191, 5201 Housing
- 121*a*, 123*a*, 221*a*, 223*a* Sound hole
- 13 Sound absorbing material
- 24, 25 Waveguide
- 31, 41 Circuit unit
- 40-1, 40-2 Acoustic signal output unit
- AC1, AC2 Acoustic signal
- AR21, AR22 Hollow portion
- C1 Circumference
- C1-1, C1-2, C1-3, C1-4 Unit arc region
- MAC1, MAC2 Monophonic acoustic signal
- 2121, 2122, 2123, 2124, 2221, 2224, 4210, 4220, 4421, 5112, 5122, 5132, 5152, 5153, 5162, 5163, 5164, 5172, 5192, 5202, 5381, 5391, 5401 Wearable portion
- 2121*a*, 2122*a*, 2123*a*, 2124*a*, 2221*a* Fixing portion
- 2221*b* Shielding wall

The invention claimed is:

1. An acoustic signal output device comprising:

a first driver unit that emits a first acoustic signal to one side and emits a second acoustic signal to another side;

a second driver unit that emits a fourth acoustic signal to one side and emits a third acoustic signal to another side;

a first housing portion in which a wall portion is provided with a single or plurality of first sound holes for leading out the first acoustic signal emitted from the first driver unit to an outside and a single or plurality of second sound holes for leading out the second acoustic signal emitted from the first driver unit to an outside; and a second housing portion in which a wall portion is provided with a single or plurality of third sound holes for leading out the third acoustic signal emitted from the second driver unit to an outside and a single or plurality of fourth sound holes for leading out the fourth acoustic signal emitted from the second driver unit to an outside, wherein a frequency bandwidth of the third acoustic signal and the fourth acoustic signal emitted from the second driver unit is narrower than a frequency bandwidth of the first acoustic signal and the second acoustic signal emitted from the first driver unit, in a case where the first acoustic signal is emitted from the first sound holes, the second acoustic signal is emitted from the second sound holes, the third acoustic signal is emitted from the third sound holes, and the fourth acoustic signal is emitted from the fourth sound holes, an attenuation rate of the first acoustic signal at a second point with reference to a predetermined first point, where the first acoustic signal arrives at the first point and the second point is farther from the acoustic signal output device than the first point, is designed to be equal to or less than a predetermined value smaller than an attenuation rate due to air propagation of an acoustic signal at the second point with reference to the first point, or an attenuation amount of the first acoustic signal at the second point with reference to the first point is designed to be equal to or more than a predetermined value larger than an attenuation amount due to air propagation of an acoustic signal at the second point with reference to the first point.

2. The acoustic signal output device according to claim 1, wherein magnitude of a component of a first frequency or higher of the third acoustic signal and the fourth acoustic signal emitted from the second driver unit is smaller than magnitude of a component of the first frequency or higher of the first acoustic signal and the second acoustic signal emitted from the first driver unit.

3. The acoustic signal output device according to claim 1, wherein magnitude of a component of a second frequency or lower of the third acoustic signal and the fourth acoustic signal emitted from the second driver unit is smaller than magnitude of a component of the second frequency or lower of the first acoustic signal and the second acoustic signal emitted from the first driver unit.

4. The acoustic signal output device according to claim 1, wherein the first sound holes open in a first direction, the second sound holes open in a second direction between the first direction and a direction opposite to the first direction, the fourth sound holes open in a fourth direction that is same as or approximate to the first direction, and the third sound holes open in a third direction between the fourth direction and a direction opposite to the fourth direction.

5. The acoustic signal output device according to claim 4, wherein the first sound holes and the fourth sound holes are plane-symmetric or substantially plane-symmetric with respect to a reference plane including a straight line parallel or substantially parallel to a straight line extending in the first direction, and the second sound holes and the third sound holes are plane-symmetric or substantially plane-symmetric with respect to the reference plane.

6. The acoustic signal output device according to claim 5, wherein the first housing portion and the second housing portion are plane-symmetric or substantially plane-symmetric with respect to the reference plane.

7. The acoustic signal output device according to claim 4, wherein a plurality of the second sound holes is provided along a first circumference centered on a first axis parallel or substantially parallel to a straight line extending in the first direction, and a plurality of the third sound holes is provided along a fourth circumference centered on a fourth axis parallel or substantially parallel to a straight line extending in the fourth direction.

8. The acoustic signal output device according to claim 7, wherein, in a case where the first circumference is equally divided into a plurality of first unit arc regions, a sum of an opening area of the second sound holes provided along a first arc region that is one of the first unit arc regions is same as or substantially same as a sum of an opening area of the second sound holes provided along a second arc region that is one of the first unit arc regions excluding the first arc region, and in a case where the fourth circumference is equally divided into a plurality of fourth unit arc regions, a sum of an opening area of the third sound holes provided along a third arc region that is one of the fourth unit arc regions is same as or substantially same as a sum of an opening area of the third sound holes provided along a fourth arc region that is one of the fourth unit arc regions excluding the third arc region.

9. The acoustic signal output device according to claim 7, wherein a position of the first sound holes is biased to a first eccentric position deviated from a first center axis extending in the first direction through a center region of the first housing portion, in a case where the first circumference is equally divided into a plurality of first unit arc regions, a sum of an opening area of the second sound holes provided along a first arc region that is one of the first unit arc regions is smaller than a sum of an opening area of the second sound holes provided along a second arc region that is one of the first unit arc regions closer to the first eccentric position than the first arc region, a position of the fourth sound holes is biased to a fourth eccentric position deviated from a second center axis extending in the fourth direction through a center region of the second housing portion, and in a case where the fourth circumference is equally divided into a plurality of second unit arc regions, a sum of an opening area of the fourth sound holes provided along a third arc region that is one of the second unit arc regions is smaller than a sum of an opening area of the fourth sound holes provided along a fourth arc region that is one of the second unit arc regions closer to the fourth eccentric position than the third arc region.

10. The acoustic signal output device according to claim 1, wherein the first sound holes are arranged in a direction of an ear canal, and the second sound holes, the third sound holes, and the fourth sound holes are arranged in a direction of other than the ear canal when the acoustic signal output device is worn on an ear.

* * * * *